US012679311B2

(12) United States Patent　　(10) Patent No.: US 12,679,311 B2
Matsunaga et al.　　(45) Date of Patent: Jul. 14, 2026

(54) CONTROL PEDAL DEVICE

(71) Applicant: DENSO CORPORATION, Kariya-city (JP)

(72) Inventors: Yuki Matsunaga, Kariya-city (JP); Kenichiro Takenaka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/904,851

(22) Filed: Oct. 2, 2024

(65) Prior Publication Data

US 2025/0018904 A1　　Jan. 16, 2025

Related U.S. Application Data

(63) Continuation of application No. PCT/JP2023/016857, filed on Apr. 28, 2023.

(30) Foreign Application Priority Data

Apr. 29, 2022　(JP) ................................. 2022-075558
Apr. 29, 2022　(JP) ................................. 2022-075559
Dec. 7, 2022　(WO) .................. PCT/JP2022/045140

(51) Int. Cl.
　　B60T 7/04　　　　(2006.01)
　　B60T 7/06　　　　(2006.01)
　　　　　(Continued)

(52) U.S. Cl.
　　CPC ................ B60T 7/042 (2013.01); B60T 7/06 (2013.01); G05G 1/38 (2013.01); G05G 1/44 (2013.01);
　　　　　(Continued)

(58) Field of Classification Search
　　CPC ........ B60T 7/042; B60T 7/06; B60T 2220/04; B60T 7/02; G05G 1/38; G05G 1/44;
　　　　　(Continued)

(56) References Cited

U.S. PATENT DOCUMENTS 6,330,838 B1　　12/2001　Kalsi
6,412,364 B1 *　7/2002　Berglar ................... F02D 11/02
　　　　　　　　　　　　　　　　　74/514
　　　　　(Continued)

FOREIGN PATENT DOCUMENTS

EP　　　　3889462 A1　　10/2021
JP　　　2007102393 A　　4/2007
　　　　　(Continued)

OTHER PUBLICATIONS

U.S. Appl. No. 18/904,909 to Takenaka, filed Oct. 2, 2024 (93 pages).

*Primary Examiner* — Thomas C Diaz
(74) *Attorney, Agent, or Firm* — Nixon & Vanderhye P.C.

(57) ABSTRACT

A control pedal device includes: a pedal configured to receive an operation; a pedal arm attached to the pedal to be movable with the pedal; a rotating shaft fixed to the pedal arm; a reaction force generating mechanism exerting a reaction force against the operation of the pedal; multiple targets attached to the rotating shaft and rotating together with the rotating shaft; and multiple sensor elements configured to detect a rotation of the multiple targets.

19 Claims, 55 Drawing Sheets

(51) Int. Cl.

| | | |
|---|---|---|
| *G05G 1/38* | | (2008.04) |
| *G05G 1/44* | | (2008.04) |
| *G05G 5/03* | | (2008.04) |
| *B60K 26/02* | | (2006.01) |

(52) U.S. Cl.
CPC .............. *G05G 5/03* (2013.01); *B60K 26/021* (2013.01); *B60T 2220/04* (2013.01); *G05G 2505/00* (2013.01)

(58) Field of Classification Search
CPC ........ G05G 5/03; G05G 2505/00; G05G 1/30; G01B 7/30
See application file for complete search history.

(56) References Cited

U.S. PATENT DOCUMENTS

| 11,079,291 B2 * | 8/2021 | Bertin | ..................... G01L 3/105 |
| 11,614,765 B2 * | 3/2023 | Miller | ..................... G01D 3/08 |
| | | | 74/514 |

| 2006/0231074 A1 | 10/2006 | Ueno et al. | |
| 2008/0276749 A1 * | 11/2008 | Stewart | .................... G05G 5/03 |
| | | | 74/512 |
| 2019/0310148 A1 | 10/2019 | Bertin | |
| 2022/0297645 A1 | 9/2022 | Yanagida et al. | |
| 2022/0348171 A1 | 11/2022 | Yanagida et al. | |
| 2022/0379852 A1 * | 12/2022 | O'Neill | .................... G05G 1/44 |
| 2024/0069586 A1 * | 2/2024 | Leem | ....................... G05G 5/03 |

FOREIGN PATENT DOCUMENTS

| JP | 2012-82725 | 4/2012 |
| JP | 2018165891 A | 10/2018 |
| JP | 6747282 B2 | 8/2020 |
| JP | 2021029092 A | 2/2021 |
| JP | 2021158894 A | 10/2021 |
| WO | 2020152024 A1 | 7/2020 |

* cited by examiner

FIG. 53

ONE ROTATION
DIRECTION

OTHER ROTATION
DIRECTION p21a  pR  p32 p31a p20, p21 p31 p10 pJ p32a p22a p31 p20, p22 p32 p7  CL pS

CONTROL PEDAL DEVICE

CROSS REFERENCE TO RELATED APPLICATION

The present application is a continuation application of International Patent Application No. PCT/JP2023/016857 filed on Apr. 28, 2023, which designated the U.S. and claims the benefit of priority from Japanese Patent Application No. 2022-075559 filed on Apr. 29, 2022, Japanese Patent Application No. 2022-075558 filed on Apr. 29, 2022, and International Application No. PCT/JP2022/045140 filed on Dec. 7, 2022. The entire disclosures of all of the above applications are incorporated herein by reference.

TECHNICAL FIELD

The present disclosure relates to a control pedal device.

BACKGROUND

Conventionally, a control pedal device is provided with two displacement sensors that detect displacement of a pedal. Specifically, a first stroke sensor is provided at a fulcrum of a brake pedal, and a second stroke sensor is provided in a stroke simulator. The second stroke sensor is connected to a pedal arm via multiple components such as the stroke simulator, an operation rod and the like.

SUMMARY

According to an aspect of the present disclosure, a control pedal device for a vehicle includes: a pedal configured to receive an operation; a pedal arm attached to the pedal to be movable with the pedal; a rotating shaft fixed to the pedal arm; a reaction force generating mechanism configured to exert a reaction force against the operation of the pedal; multiple targets attached to the rotating shaft and rotating together with the rotating shaft; and multiple sensor elements configured to detect a rotation of the targets.

According to another aspect of the present disclosure, a control pedal device for a vehicle, includes: a pedal configured to receive an operation; a pedal arm attached to the pedal to be movable with the pedal; a rotating shaft fixed to the pedal arm; a reaction force generating mechanism configured to exert a reaction force against the operation of the pedal; a sensing member including (i) multiple targets attached to the rotating shaft and rotating together with the rotating shaft, and (ii) multiple sensor elements configured to detect a rotation of the multiple targets; and an attachable structure to which the sensing member is attachable.

BRIEF DESCRIPTION OF THE DRAWINGS

The above and other objects, features and advantages of the present disclosure will become more apparent from the following detailed description made with reference to the accompanying drawings. In the drawings:

FIG. 53 is a cross-sectional view showing a portion corresponding to FIG. 52 in a brake pedal device having an inductive sensor of the third comparative example, and showing a state in which the rotating shaft is eccentric when the brake pedal is in the initial position;

DESCRIPTION OF EMBODIMENTS

Figure 1:
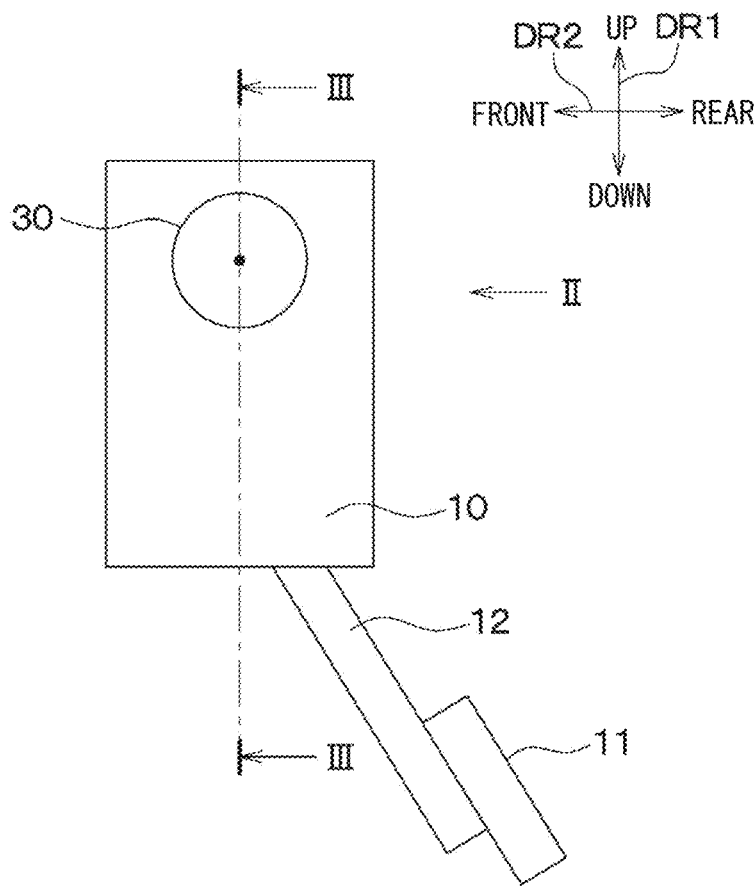
FIG. 1 is a side view of a brake pedal device according to a first embodiment.

A control pedal device may include a first stroke sensor provided at a fulcrum of a brake pedal, and a second stroke sensor provided in a stroke simulator. The second stroke sensor is connected to a pedal arm via multiple components such as the stroke simulator. According to a study by the inventors of the present application, the second stroke sensor detects a pedal displacement using the stroke simulator that is connected to the pedal arm via multiple components, and therefore detection accuracy of the displacement may be insufficient. That is, an output signal of the second stroke sensor may have a value that is different from an actual amount of pedaling of a pedal pad by a driver. This is because the components are subject to dimensional and assembly variations.

It is an object of the present disclosure to reduce the possibility of lowering of a detection accuracy of a pedal displacement due to dimensional variations and assembly variations of multiple components in a control pedal device.

According to an aspect of the present disclosure, a control pedal device for a vehicle includes: a pedal configured to receive an operation; a pedal arm attached to the pedal to be movable with the pedal; a rotating shaft fixed to the pedal arm; a reaction force generating mechanism configured to exert a reaction force against the operation of the pedal; multiple targets attached to the rotating shaft and rotating together with the rotating shaft; and multiple sensor elements configured to detect a rotation of the targets.

In such manner, the multiple targets are attached to the rotating shaft to rotate with the rotating shaft, and the multiple sensor elements are configured to detect the rotation of the targets. Thus, detection can be performed using multiple targets that directly reflect the rotation of the rotating shaft, thereby reducing the possibility that deterioration factors such as dimensional variations and assembly variations of multiple components will intervene in a detection process of the rotation of the rotating shaft. Therefore, the possibility of lowering the detection accuracy of the pedal displacement can be reduced.

According to another aspect of the present disclosure, a control pedal device for a vehicle, includes: a pedal configured to receive an operation; a pedal arm attached to the pedal to be movable with the pedal; a rotating shaft fixed to the pedal arm; a reaction force generating mechanism configured to exert a reaction force against the operation of the pedal; a sensing member including (i) multiple targets attached to the rotating shaft and rotating together with the rotating shaft, and (ii) multiple sensor elements configured to detect a rotation of the multiple targets; and an attachable structure to which the sensing member is attachable.

In such manner, the control pedal device is provided with the attachable structure, to which (i) the multiple targets attached to the rotating shaft to rotate together with the rotating shaft and (ii) the multiple sensor elements that detect the rotation of those targets are attachable. Therefore, in the control pedal device having those components attached thereto, the possibility that deterioration factors such as dimensional variations and assembly variations of the multiple components will intervene in the detection process of the rotation of the rotating shaft can be reduced. As a result, the possibility of lowering the detection accuracy of the pedal displacement can be reduced.

Hereinafter, an embodiment of the present disclosure will be described. In the following embodiments, parts that are the same as or equivalent to those described in the preceding embodiments are given the same reference symbols, and descriptions thereof may be omitted. In the following embodiments, when only partial configuration is described in one embodiment, remaining configuration may adopt same configurations as that described in the preceding embodiments. The following embodiments may be partially combined with each other even if such a combination is not explicitly described as long as there is no disadvantage with respect to such a combination.

First Embodiment

First, the first embodiment will be described. FIGS. 1 to 4 show a pendant-type brake pedal device 1 for a vehicle according to the present embodiment. A vehicle is a vehicle that runs on wheels. Examples of a vehicle include a passenger car, a commercial vehicle, an agricultural and construction machinery, a small mobility vehicle, and the like. The brake pedal device 1 is mounted on a vehicle and receives a brake operation (for example, a pedaling operation and a releasing operation with a foot) for braking the vehicle by a driver of the vehicle. The brake pedal device 1 then outputs an operation amount signal corresponding to the amount of the received brake operation to a brake control circuit (not shown). The brake control circuit controls a brake actuator (not shown) (for example, an electric pump that adjusts a hydraulic pressure in a hydraulic brake circuit) in response to such operation amount signal. As described above, the brake pedal device 1 is a device for realizing a brake-by-wire system.

As shown in FIGS. 1 to 4, the brake pedal device 1 has a housing 10, a pedal 11, a pedal arm 12, a rotating shaft 13, a reaction force generating mechanism 15, a first sensing unit 20, and a second sensing unit 30.

Figure 2:
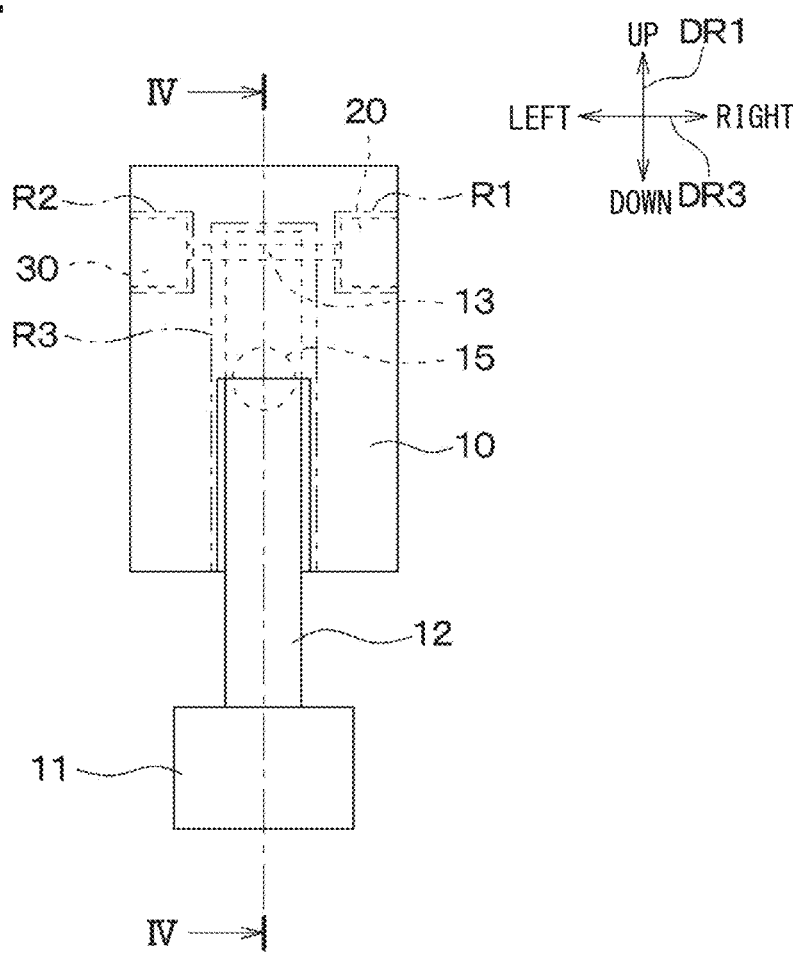
FIG. 2 is a view of the brake pedal device taken along an arrow II.

The housing 10 is a casing that accommodates the rotating shaft 13 and the reaction force generating mechanism 15. The brake pedal device 1 is installed in the vehicle by fixing the housing 10 to a dash panel or the like, which is a partition separating the interior and outside of the vehicle compartment, with fastening members such as bolts (not shown). When the brake pedal device 1 is installed in a vehicle, a vehicle top-bottom direction DR1, a vehicle front-rear direction DR2, and a vehicle width direction DR3 are as shown in FIGS. 1 and 2. The housing 10 is also formed with surrounding portions 10a and 10b that rotatably surround the rotating shaft 13. The surrounding portions 10a and 10b rotatably support the rotating shaft 13. Therefore, the surrounding portions 10a and 10b are bearing portions.

The pedal 11 is a plate-shaped member that receives a brake operation by the driver of the vehicle. The pedal 11 is fixed to the pedal arm 12. The pedal arm 12 is made of a highly-rigid material such as resin, and is fixed to the pedal 11 at one end in a longitudinal direction, and is fixed to the rotating shaft 13 at the other end. The pedal 11 and the pedal arm 12 may be formed separately and then fixed to each other, or may be formed integrally.

The rotating shaft 13 is a rod-shaped member extending along an axis line CL, and is supported at both longitudinal ends by the surrounding portions 10a, 10b of the housing 10, thereby enabling it to rotate about the axis line CL relative to the housing 10. The axis line CL extends generally along the vehicle width direction DR3.

With such structure, when the driver performs a brake operation such as pedaling and releasing the pedal 11, the pedal 11, the pedal arm 12, and the rotating shaft 13 swing together about the axis line CL in accordance with the content of brake operation.

The reaction force generating mechanism 15 is a mechanism that generates a force (i.e., a reaction force) that resists the brake operation of pedaling the pedal 11. As described above, since the brake pedal device 1 is used for the brake-by-wire system, the pedal 11 does not receive a reaction force from the master cylinder of the brake hydraulic circuit. The reaction force generating mechanism 15 generates a reaction force in place of the reaction force from the master cylinder. The reaction force generating mechanism 15 has one end attached to a bottom wall of the housing 10 and the other end attached to the pedal arm 12, is disposed at a position between the bottom wall of the housing 10 and the pedal arm 12, and generates a reaction force when compressed. The reaction force generating mechanism 15 may include a metallic elastic member (for example, a spring such as a coil spring) for generating a reaction force. Alternatively, the reaction force generating mechanism 15 may include an elastic member made of rubber for generating a reaction force. Alternatively, the reaction force generating mechanism 15 may have a fluid damper when it generates a reaction force. The fluid damper has a cylinder filled with a viscous fluid, a piston that slides relative to the cylinder while receiving the pressure of the viscous fluid, and a rod connected to the piston and the pedal arm 12. Alternatively, the reaction force generating mechanism 15 may have multiple members that slide against each other to realize friction hysteresis when a reaction force is generated, that is, a friction hysteresis mechanism. When the reaction force generating mechanism 15 generates a reaction force, sliding occurs in the reaction force generating mechanism 15. For example, a portion of a metallic elastic member slides against another portion of the elastic member. Further, for example, sliding occurs in a fluid damper or a friction hysteresis mechanism as described above. Such sliding may generate foreign matter such as metal wear powder, rubber wear powder, and the like. In such manner, the reaction force generating mechanism 15 is a mechanism that generates a reaction force as well as a sliding motion.

The first sensing unit 20 is a unit that constitutes an inductive sensor. The first sensing unit 20 has a target 21 that rotates relative to the housing 10 and a fixed member 22 that is fixed to the housing 10. The fixed member 22 is disposed on an opposite side of the surrounding portion 10a with respect to the target 21.

The target 21 is a plate-shaped member made of a conductor such as a metal. The target 21 is fixed to one end of the rotating shaft 13 in the longitudinal direction such that a plate surface of the target 21 intersects (for example, is perpendicular to) the axis line CL. In such manner, the target 21 is allowed to rotate together with the rotating shaft 13.

The outer edge of the target 21 is asymmetrical with respect to the axis line CL. For example, the outer edge of the target 21 may have a shape in which multiple convex portions protruding radially outward about the axis line CL and multiple concave portions recessed radially inwardly are arranged alternately in a circumferential direction about the axis line CL.

The fixed member 22 is a member fixed to the housing 10, and includes a base portion 22a, a sensor element 22b, and a transceiver circuit (not shown).

The base portion 22a is a plate-shaped member. The base portion 22a is made of, for example, resin. A facing surface of the base portion 22a, which is a plate surface on one side closer to the target 21, is disposed to face the target 21.

The sensor element 22b is a coil for detecting magnetic fluctuations in a direction along the axis line CL. Specifically, the sensor element 22b is a planar coil fixed inside or on the facing surface of the base portion 22a. The sensor element 22b is disposed to face the target 21. For example, the sensor element 22b extends in the circumferential direction about the axis line CL in a shape that exhibits a sine wave to surround the axis line CL.

The transceiver circuit is an electronic circuit (e.g., an integrated circuit) connected to the sensor element 22b. The transceiver circuit may be fixed to the base portion 22a, or may be disposed at a position separate from the base portion 22a and connected to the sensor element 22b via a wire harness. The transceiver circuit detects a change in inductance of the sensor element 22b while an alternating current is applied to the sensor element 22b, and outputs a signal corresponding to the change.

In the first sensing unit 20 configured as above, the rotational position of the target 21 changes in accordance with the change in the rotational position of the rotating shaft 13. Such change in the rotational position of the target 21 causes mutual induction between the sensor element 22b and the target 21, and thereby it causes a change in inductance of the sensor element 22b. The transceiver circuit outputs a signal corresponding to such change to the outside of the first sensing unit 20. Based on such output signal, the rotational position of the rotating shaft 13 is identified.

The second sensing unit 30 is a unit that constitutes a Hall sensor. The second sensing unit 30 has a rotating member 31 that rotates relative to the housing 10 and a fixed member 32 that is fixed to the housing 10. The fixed member 32 is disposed on an opposite side of the surrounding portion 10b with respect to the rotating member 31. The rotating member 31 has a base portion 31a and a target 31b.

The base portion 31a is a plate-shaped (for example, disc-shaped) member and is made of resin or the like. The base portion 31a is fixed to the other longitudinal end of the rotating shaft 13 such that a plate surface of the base portion 31a intersects (for example, is perpendicular to) the axis line CL. In such manner, the base portion 31a is allowed to rotate together with the rotating shaft 13.

The target 31b is fixed inside or on a surface of the base portion 31a and rotates integrally with the base portion 31a. The target 31b is composed of a permanent magnet or the like that forms a magnetic field around it. Such magnetic field varies with the rotation of the target 31b about the axis line CL.

The fixed member 32 is a member fixed to the housing 10, and has a base portion 32a and a sensor element 32b. In the present specification, "fixed" includes a state in which an object is attached so that displacement is restricted, with some play remaining in spite of such restriction.

The base portion 32a is a plate-shaped member. The base portion 32a is made of, for example, resin. A facing surface of the base portion 32a, which is a plate surface closer to the target 31b, is disposed to face the target 31b.

The sensor element 32b is a Hall element, and is disposed inside or on a surface of the base portion 31a. At such time, the position and orientation of the sensor element 32b are determined so that the magnetic field generated by the target 31b penetrates a magnetic sensing surface of the sensor element 32b. When the target 31b rotates, magnetic flux penetrating the magnetic sensing surface of the sensor element 32b changes. A voltage or electric current is applied to the sensor element 32b as an input, and, when the magnetic flux penetrating the magnetic sensing surface of the sensor element 32b changes in such state, an electromotive force generated as an output by the sensor element 32b changes. Based on such change in output, the rotational position of the rotating shaft 13 is identified.

In the brake pedal device 1 having such a configuration, when a driver performs a brake operation such as pedaling and releasing the pedal 11, the pedal 11 is displaced and the rotating shaft 13 rotates about the axis line CL. Then, signals corresponding to the rotation of the rotating shaft 13 are output from the sensor element 22b of the first sensing unit 20 and the sensor element 32b of the second sensing unit 30. Such output signal is input to a brake ECU (not shown), and the brake ECU controls the brake actuator based on the input signal to apply a braking force to the vehicle wheels according to the rotational position of the rotating shaft 13.

When a brake operation is performed on the brake pedal device 1, the reaction force generating mechanism 15 expands and contracts. Specifically, when the pedal is pedaled, it contracts, generating a stronger reaction force, and when the pedal is released, it extends, reducing the reaction force. Such a movement of the reaction force generating mechanism 15 may cause sliding in the reaction force generating mechanism 15 as described above, which may result in the generation of foreign matter. If a large amount of metallic foreign matter reaches the vicinity of the sensor elements 22b, 32b and the targets 21, 31b, the detection accuracy of the rotational position of the rotating shaft 13 may deteriorate. In particular, if a large amount of metallic foreign matter reaches a space between the sensor element 22b and the target 21 and a space between the sensor element 32b and the target 31b, the detection accuracy of the rotational position of the rotating shaft 13 may be significantly deteriorated. Further, even if the foreign matter is not made of metal but is made of rubber or resin, and is generated from the reaction force generating mechanism 15, it may possibly have an adverse effect on the sensor element 22b and the target 21. Further, foreign matter (e.g., fine particles of metal, water, salt, sand, etc.) entering the interior of the housing 10 through an opening in the housing 10 described later may also adversely affect the sensor element 22b and the target 21.

Therefore, as described below, the brake pedal device 1 is configured to reduce the amount of foreign matter generated by the movement of the reaction force generating mechanism 15 that reaches the space between the sensor element 22b and the target 21, and the space between the sensor element 32b and the target 31b.

Figure 3:
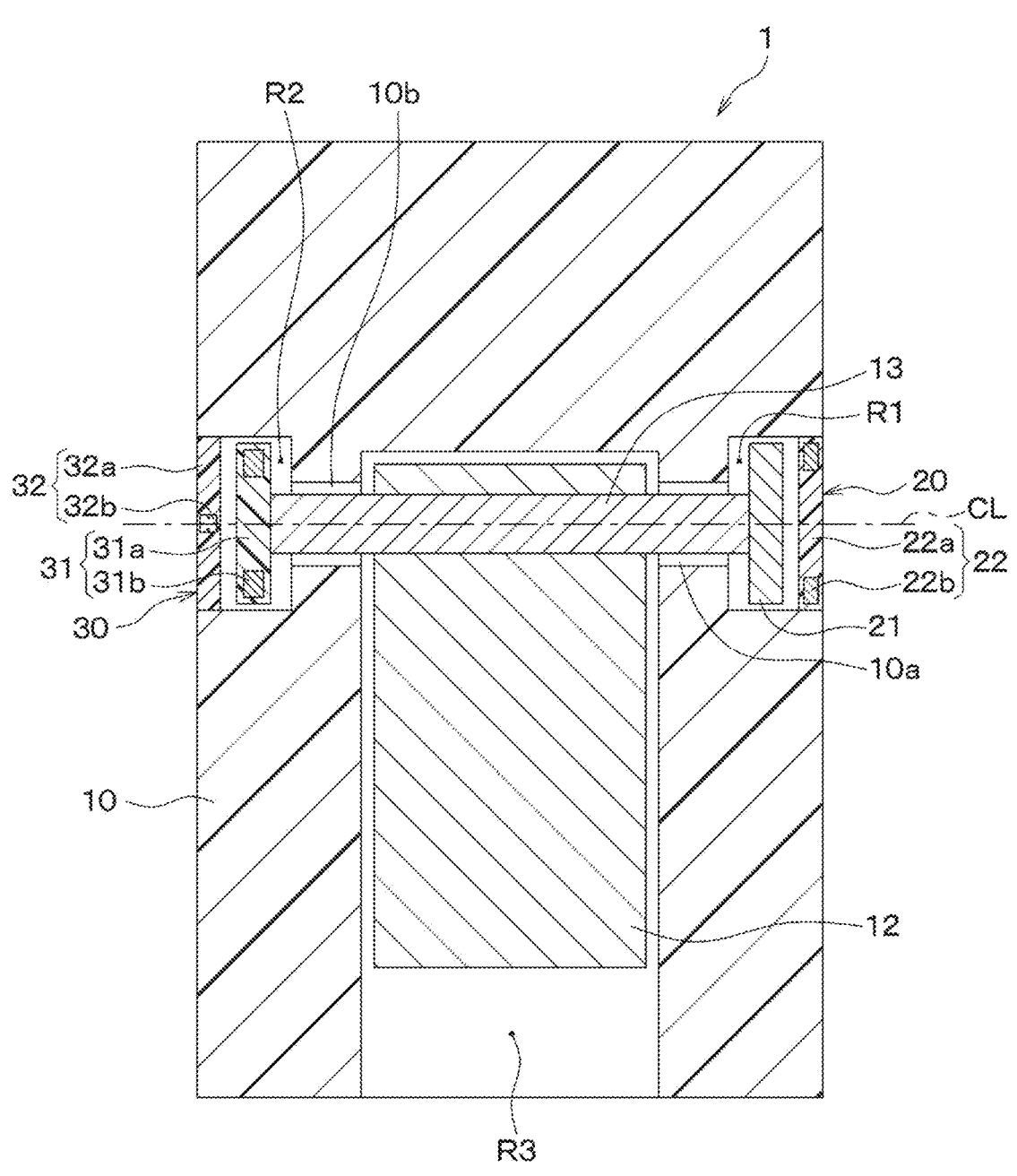
FIG. 3 is a cross-sectional view taken along a III-III line in FIG. 1.
Figure 4:
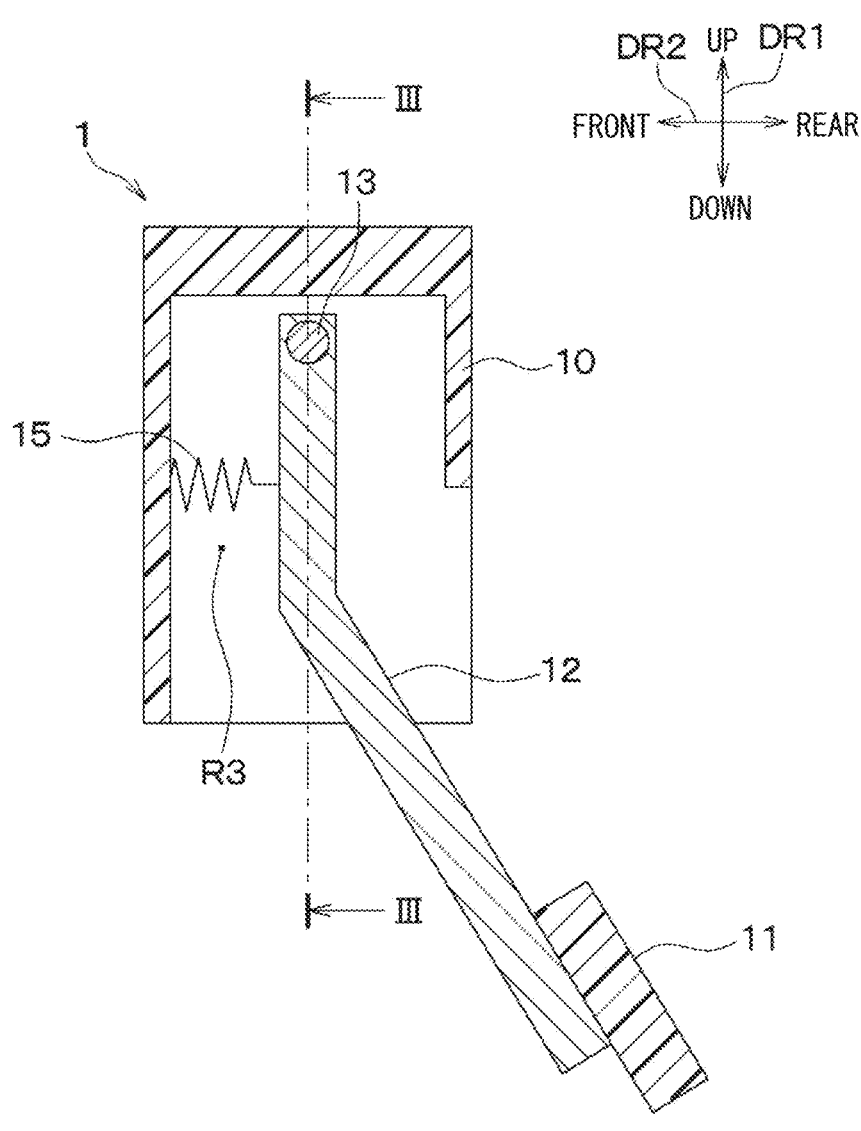
FIG. 4 is a cross-sectional view taken along IV-IV line of FIG. 2.

Here, the arrangement of each part inside the housing 10 will be described. As shown in FIGS. 2 to 4, the housing 10 includes a first sensor chamber R1, a second sensor chamber R2, and a mechanism chamber R3. In other words, the housing 10 separates the first sensor chamber R1, the second sensor chamber R2, and the mechanism chamber R3 from one another.

In the first sensor chamber R1, the first sensing unit 20 and an end of the rotating shaft 13 on a first sensing unit 20 side are disposed. The entire first sensing unit 20 may be housed in the first sensor chamber R1, or only a portion of the first sensing unit 20 may be disposed in the first sensor chamber R1. In the first sensor chamber R1, the base portion 22a of the fixed member 22 serves as a lid, thereby separating a space within the first sensor chamber R1 from the outside of the housing 10.

The base portion 22a may be fixed to the housing 10 by a fastening member such as a bolt, or may be fixed by press fitting. In the latter case, the base portion 22a may air-tightly separate the space within the first sensor chamber R1 from the outside of the housing 10. When the housing 10 is air-tightly separated, the possibility of foreign matter (for example, metal, liquids such as water, and fine particles such as salt and sand) from the outside of the housing 10 entering the first sensor chamber R1 can be reduced.

The second sensing unit 30 and an end of the rotating shaft 13 on a second sensing unit 30 side are disposed in the second sensor chamber R2. The second sensing unit 30 may be entirely housed in the second sensor chamber R2, or only a portion of the second sensing unit 30 may be disposed in the second sensor chamber R2. In the second sensor chamber R2, the base portion 32a of the fixed member 32 serves as a lid, thereby separating a space within the second sensor chamber R2 from the outside of the housing 10.

The base portion 32a may be fixed to the housing 10 by a fastening member such as a bolt, or may be fixed by press fitting. In the latter case, the base portion 32a may air-tightly separate the space within the second sensor chamber R2 from the outside of the housing 10. When the second sensor chamber R2 is air-tightly separated, the possibility of foreign matter from the outside of the housing 10 entering the second sensor chamber R2 can be reduced.

The rotating shaft 13, the pedal arm 12, and the reaction force generating mechanism 15 are arranged in the mechanism chamber R3. As for the rotating shaft 13, a portion located between the surrounding portion 10a and the surrounding portion 10b is disposed in the mechanism chamber R3. As for the pedal arm 12, a portion including the end on a rotating shaft 13 side is disposed in the mechanism chamber R3, and a portion including the end on a pedal 11 side is disposed outside the mechanism chamber R3. The mechanism chamber R3 has opening that is open to the outside of the housing 10. The pedal arm 12 rotates about the axis line CL while protruding from the inside of the mechanism chamber R3 through the opening to the outside. Therefore, the opening of the housing 10 is large enough to allow displacement of the pedal arm 12 due to rotation. The reaction force generating mechanism 15 is disposed in its entirety in the mechanism chamber R3, but as another example, only a portion of the reaction force generating mechanism 15 may be disposed in the mechanism chamber R3.

The first sensor chamber R1 and the second sensor chamber R2 are disposed on one side and the other side, respectively, of the mechanism chamber R3 in the vehicle width direction DR3.

The first sensor chamber R1 and the mechanism chamber R3 are positioned apart from each other with the surrounding portion 10a interposed therebetween. Similarly, the second sensor chamber R2 and the mechanism chamber R3 are positioned apart from each other with the surrounding portion 10b interposed therebetween.

Further, a space inside the first sensor chamber R1 and a space inside the mechanism chamber R3 are in communication with each other via a space formed at a position between the surrounding portion 10a and the rotating shaft 13. Specifically, the space between the target 21 and the sensor element 22b that separates the target 21 and the sensor element 22b communicates with the mechanism chamber R3 via the space formed at a position between the surrounding portion 10a and the rotating shaft 13.

Similarly, a space inside the second sensor chamber R2 and a space inside the mechanism chamber R3 communicate with each other via a space formed at a position between the surrounding portion 10b and the rotating shaft 13. Specifically, the space between the target 31b and the sensor element 32b, which is positioned between the target 31b and the sensor element 32b, communicates with the mechanism chamber R3 via the space formed at a position between the surrounding portion 10b and the rotating shaft 13.

In such manner, since the first sensing unit 20 and the second sensing unit 30 are attached to the rotating shaft 13, the sensor chambers R1 and R2 communicate with the mechanism chamber R3 via the surrounding portions 10a and 10b, respectively.

However, a cross-sectional area size of the space at the end of the first sensor chamber R1 on a surrounding portion 10a side is far larger (for example, 10 times or more) than the maximum cross-sectional area size of the space in the surrounding portion 10a. Further, a cross-sectional area size of the space at the end of the mechanism chamber R3 on a surrounding portion 10a side is far larger (for example, 10 times or more) than the maximum cross-sectional area size of the space in the surrounding portion 10a. Here, the cross-sectional area size of the space refers to a size of an area of the space in a cross section perpendicular to the axis line CL (i.e., the passage cross-sectional area size of the space). With such configuration, the surrounding portion 10a narrows the space between the mechanism chamber R3 and the first sensor chamber R1.

Similarly, the cross-sectional area size of the space at the end of the second sensor chamber R2 on a surrounding portion 10b side is much larger (for example, 10 times or more) than the maximum cross-sectional area size of the space in the surrounding portion 10b. Further, the cross-sectional area size of the space at the end of the mechanism chamber R3 on a surrounding portion 10b side is far larger (for example, 10 times or more) than the maximum cross-sectional area size of the space in the surrounding portion 10b. With such configuration, the surrounding portion 10b narrows the space between the mechanism chamber R3 and the second sensor chamber R2 with respect to the mechanism chamber R3 and the second sensor chamber R2.

In such manner, the space between surrounding portions 10a, 10b is sufficiently narrowed relative to the space between the adjacent chambers, so that each of the sensor chambers R1, R2 is a substantially closed space. Therefore, foreign matter generated by the reaction force generating mechanism 15 is less likely to reach the first sensor chamber R1 and the second sensor chamber R2. More specifically, foreign matter generated by the reaction force generating mechanism 15 is less likely to reach (a) the space separating the target 21 and the sensor element 22b and (b) the space separating the target 31b and the sensor element 32b.

(1) As described above, the brake pedal device 1 of the present embodiment includes multiple sensor elements 22b, 32*b* that detect the displacement of the targets 21, 31*b* that are attached to the rotating shaft 13 and rotate together with the rotating shaft 13.

In such manner, the multiple targets 21, 31*b* are attached to the rotating shaft 13 and rotate together with the rotating shaft 13, and the multiple sensor elements 22*b*, 32*b* detect the rotation of the targets 21, 31*b*, respectively. In such manner, detection is performed using the multiple targets 21, 31*b* that directly reflect the rotation of the rotating shaft 13, thereby reducing the possibility that factors such as dimensional variations and assembly variations of multiple components will intervene in the detection process of the rotation of the rotating shaft 13. Therefore, the possibility that the detection accuracy of the displacement of the pedal 11 will lower can be reduced.

(2) Also, as shown in FIGS. 2 and 3, when the brake pedal device 1 is attached to a vehicle, the targets 21, 31*b* and the sensor elements 22*b*, 32*b* are positioned in an upper part of the vehicle than a part of the reaction force generating mechanism 15 where sliding occurs. Further, the surrounding portions 10*a* and 10*b* are also positioned in an upper part of the vehicle than a part of the reaction force generating mechanism 15 where sliding occurs. Such configuration makes it difficult for foreign matter generated by the reaction force generating mechanism 15 to reach the targets 21 and 31*b* and the sensor elements 22*b* and 32*b*.

(3) Further, the mechanism chamber R3 and the sensor chambers R1 and R2 are separated by the surrounding portions 10*a* and 10*b*, and the space within the mechanism chamber R3 and the spaces within the sensor chambers R1 and R2 are connected to each other via the spaces between the surrounding portions 10*a* and 10*b* and the rotating shaft 13, respectively.

The space between the surrounding portions 10*a*, 10*b* and the rotating shaft 13 is often set smaller than the space of the chamber adjacent to that space. In fact, that is the case in the present embodiment. In other words, the space between the surrounding portion 10*a* and the rotating shaft 13 is narrowed relative to the space in the mechanism chamber R3 and the space in the first sensor chamber R1. Further, the space between the surrounding portion 10*b* and the rotating shaft 13 is narrowed relative to the space in the mechanism chamber R3 and the space in the second sensor chamber R2. Such configuration makes it difficult for foreign matter generated by the reaction force generating mechanism 15 to reach the sensor chambers R1 and R2.

(4) Further, the sensor elements 22*b*, 32*b* include the sensor element 32*b* in the Hall sensor and the sensor element 22*b* in the inductive sensor. In such manner, the two sensor elements 22*b*, 32*b* detect the rotation of the targets 21, 31*b* using different detection principles, namely, a detection principle utilizing a physical phenomenon known as the Hall effect and a detection principle utilizing a physical phenomenon known as mutual induction. In such manner, the possibility that the first sensing unit 20 and the second sensing unit 30 will fail due to a common cause can be reduced.

Second Embodiment

Figure 5:
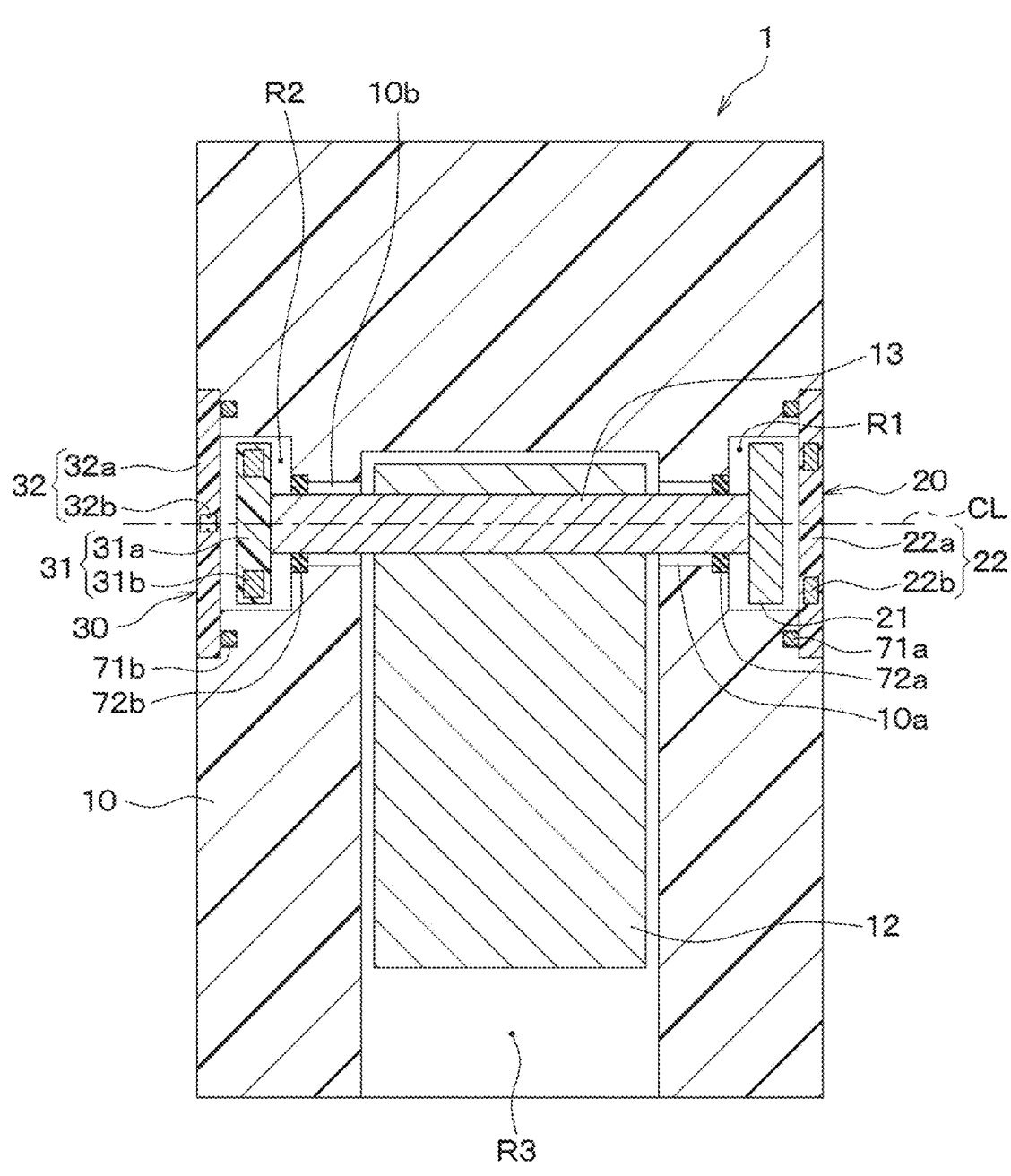
FIG. 5 is a cross-sectional view taken along the same line as FIG. 3 according to a second embodiment.

Next, the second embodiment will be described with reference to FIG. 5. A brake pedal device 1 of the present embodiment is configured by adding O-rings 71*a*, 71*b* and dust seals 72*a*, 72*b* to the brake pedal device 1 of the first embodiment. The other configuration is the same as in the first embodiment.

An O-ring 71*a* is an annular sealing member that is disposed at a position sandwiched between a base portion 22*a* of a first sensing unit 20 and a housing 10 and that air-tightly seals a space between the base portion 22*a* and the housing 10. An O-ring 71*b* is an annular sealing member that is disposed at a position sandwiched between a base portion 32*a* of a second sensing unit 30 and the housing 10, and that air-tightly seals the space between the base portion 32*a* and the housing 10.

The O-rings 71*a* and 71*b* are made of, for example, rubber, resin, silicon or the like. The O-rings 71*a*, 71*b* reduce the possibility of foreign matter entering sensor chambers R1, R2 from outside of the housing 10, respectively.

A dust seal 72*a* is an annular sealing member that air-tightly seals a space between the surrounding portion 10*a* and a rotating shaft 13. As shown in FIG. 5, the dust seal 72*a* may seal the space between the surrounding portion 10*a* and the rotating shaft 13 at an end of the surrounding portion 10*a* on a first sensing unit 20 side, but it may also seal a space between the surrounding portion 10*a* and the rotating shaft 13 at another position in the longitudinal direction of the surrounding portion 10*a*.

A dust seal 72*b* is an annular sealing member that air-tightly seals a space between the surrounding portion 10*b* and the rotating shaft 13. As shown in FIG. 5, the dust seal 72*b* may seal the space between the surrounding portion 10*b* and the rotating shaft 13 at an end of the surrounding portion 10*b* on a second sensing unit 30 side, but it may also seal a space between the surrounding portion 10*b* and the rotating shaft 13 at another position in the longitudinal direction of the surrounding portion 10*b*.

The dust seals 72*a*, 72*b* are made of, for example, rubber, resin, silicon or the like. The dust seals 72*a* and 72*b* reduce the possibility of foreign matter originating from a reaction force generating mechanism 15 entering the sensor chambers R1 and R2 from a mechanism chamber R3, respectively. The O-rings 71*a*, 71*b* and the dust seals 72*a*, 72*b* form the first sensor chamber R1 and the second sensor chamber R2 as closed spaces.

(1) As described above, the spaces between the surrounding portions 10*a*, 10*b* and the rotating shaft 13 are sealed. In such manner, the possibility of foreign matter originating from the reaction force generating mechanism 15 entering the sensor chambers R1 and R2 from the mechanism chamber R3 can be reduced. Thus, it is possible to reduce the possibility that the detection accuracy of the first sensing unit 20 and the second sensing unit 30 will deteriorate. Further, the spaces between the outside of the housing 10 and the sensor chambers R1, R2 (i.e., the spaces between the base portions 22*a*, 32*a* and the housing 10) are sealed. In such manner, the possibility of foreign matter entering the sensor chambers R1, R2 from the outside of the housing 10 can be reduced. Thus, it is possible to reduce the possibility that the detection accuracy of the first sensing unit 20 and the second sensing unit 30 will deteriorate. Further, the same effects as those of the first embodiment can be obtained from the configuration of the present embodiment that is similar to that of the first embodiment.

Third Embodiment

Figure 6:
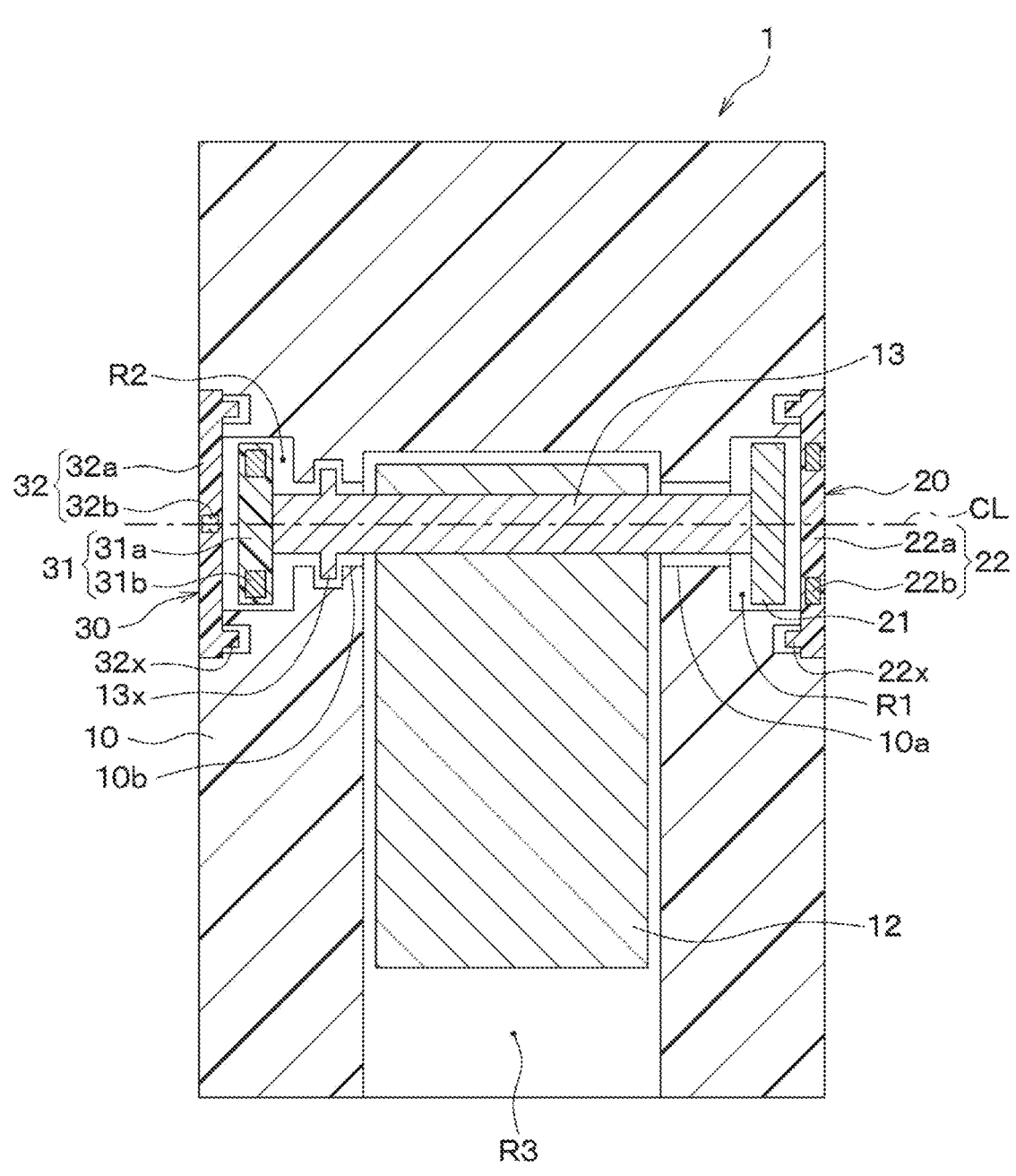
FIG. 6 is a cross-sectional view taken along the same line as FIG. 3 according to a third embodiment.

Next, the third embodiment will be described with reference to FIG. 6. In the present embodiment, labyrinth projections 13*x*, 22*x*, and 32*x* are further added to the first embodiment.

A labyrinth projection 13*x* projects from a side surface of a rotating shaft 13 in a direction away from an axis line CL at a portion of the rotating shaft 13 that is rotatably supported by the surrounding portion 10*b*. The labyrinth projection 13*x* has a flange shape that annularly surrounds the axis line CL. Further, a portion of the surrounding portion 10*b* that faces the labyrinth projection 13*x* is recessed to receive the labyrinth projection 13*x*.

In such manner, a labyrinth structure is formed by the labyrinth projection 13*x* and a portion of the surrounding portion 10*b* that faces the labyrinth projection 13*x*. A path from a mechanism chamber R3 to a second sensor chamber R2 through the space between the rotating shaft 13 and the surrounding portion 10*b* bends three or more times (specifically, four times) in order to pass through the labyrinth structure. Such configuration reduces the possibility of foreign matter originating from a reaction force generating mechanism 15 entering the second sensor chamber R2 from the mechanism chamber R3.

A labyrinth projection 22*x* protrudes from a surface of a base portion 22*a* on a rotating shaft 13 side. The labyrinth projection 22*x* has a collar shape that annularly surrounds a first sensor chamber R1. Further, a portion of a housing 10 that faces the labyrinth projection 22*x* is recessed to receive the labyrinth projection 22*x*.

In such manner, a labyrinth structure is formed by the labyrinth projection 22*x* and a portion of the housing 10 that faces the labyrinth projection 22*x*. The path from the outside of the housing 10 to the first sensor chamber R1 through the space between the base portion 22*a* and the housing 10 bends three or more times (specifically, four times) in order to pass through the labyrinth structure. Such configuration reduces the possibility of foreign matter entering the first sensor chamber R1 from the outside of the housing 10.

The labyrinth projection 32*x* projects from a surface of a base portion 32*a* facing the rotating shaft 13. The labyrinth projection 32*x* has a collar shape that annularly surrounds the second sensor chamber R2. Further, a portion of the housing 10 that faces the labyrinth projection 32*x* is recessed to receive the labyrinth projection 32*x*.

In such manner, a labyrinth structure is formed by the labyrinth projection 32*x* and a portion of the housing 10 that faces the labyrinth projection 32*x*. The path from the outside of the housing 10 to the second sensor chamber R2 passing through the space between the base portion 32*a* and the housing 10 bends three or more times (specifically, five times) in order to pass through the labyrinth structure. Such configuration reduces the possibility of foreign matter entering the first sensor chamber R1 from the outside of the housing 10. The other configurations are the same as those of the first embodiment.

(1) As described above, in the path from the mechanism chamber R3 to the second sensor chamber R2 passing through the space between the rotating shaft 13 and the surrounding portion 10*b*, a labyrinth structure is formed by the rotating shaft 13 and the surrounding portion 10*b*. In such manner, the possibility of foreign matter originating from the reaction force generating mechanism 15 entering the second sensor chamber R2 from the mechanism chamber R3 can be reduced. Thus, it is possible to reduce the possibility that the detection accuracy of the second sensing unit 30 will deteriorate. Further, a labyrinth structure is formed in the spaces from the outside of the housing 10 to the first sensor chamber R1 and the second sensor chamber R2. In such manner, the possibility of foreign matter entering the first sensor chamber R1 and the second sensor chamber R2 from the outside of the housing 10 can be reduced.

For example, a projection having a structure similar to that of the labyrinth projection 13*x* may also be formed on the rotating shaft 13 at a position that is rotatably supported by the surrounding portion 10*a*. In such case, a portion of the surrounding portion 10*a* that faces the projection may be recessed to receive the projection. In such manner, a labyrinth structure is formed by the rotating shaft 13 and the surrounding portion 10*a*. Therefore, in such case, the possibility of foreign matter originating from the reaction force generating mechanism 15 entering the first sensor chamber R1 from the mechanism chamber R3 can be reduced. It, in turn, reduces the possibility that the detection accuracy of the first sensing unit 20 will deteriorate.

The modifications to the first embodiment as described in the present embodiment are also applicable to the second embodiment. Further, the same effects can be obtained from the configuration of the present embodiment that is similar to that of the first and second embodiments.

Fourth Embodiment

Figure 7:
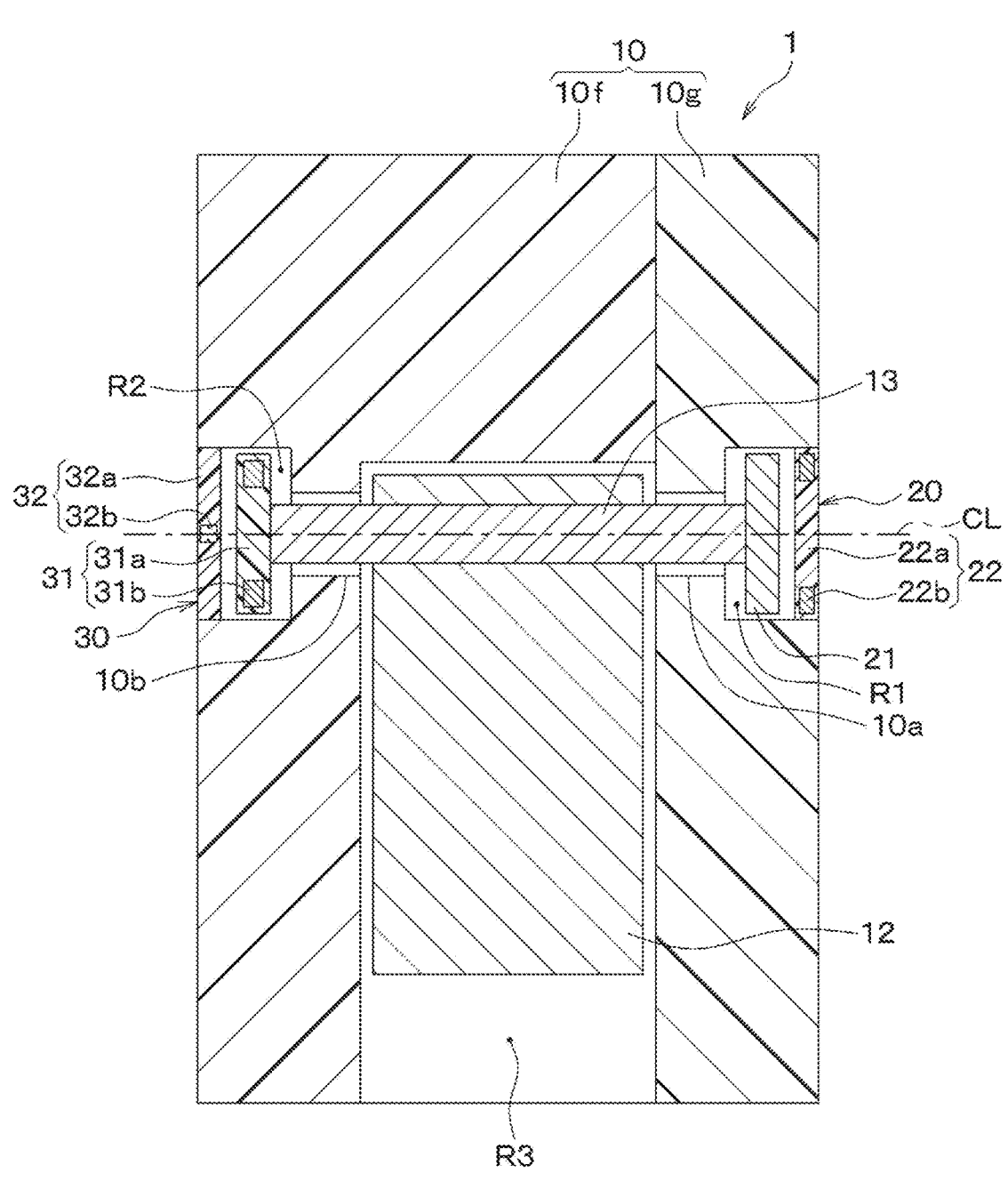
FIG. 7 is a cross-sectional view taken along the same line as FIG. 3 according to a fourth embodiment.

Next, the fourth embodiment will be described with reference to FIG. 7. A brake pedal device 1 of the present embodiment is different from the brake pedal device 1 of the first embodiment in the configuration of a housing 10. Specifically, the housing 10 of the present embodiment has a body portion 10*f* and a cover portion 10*g* that is separate from the body portion 10*f*. The other configurations are the same as those of the first embodiment.

A second sensor chamber R2 and a mechanism chamber R3 are formed in the body portion 10*f*, and a first sensor chamber R1 is formed in the cover portion 10*g*. The body portion 10*f* and the cover portion 10*g* may be assembled by a fastening member such as a bolt, or may be assembled in another manner.

The modifications to the first embodiment as shown in the present embodiment are also applicable to the second and third embodiments. Further, the same effects can be obtained from the configuration of the present embodiment that is similar to that of the first to third embodiments.

Fifth Embodiment

Figure 8:
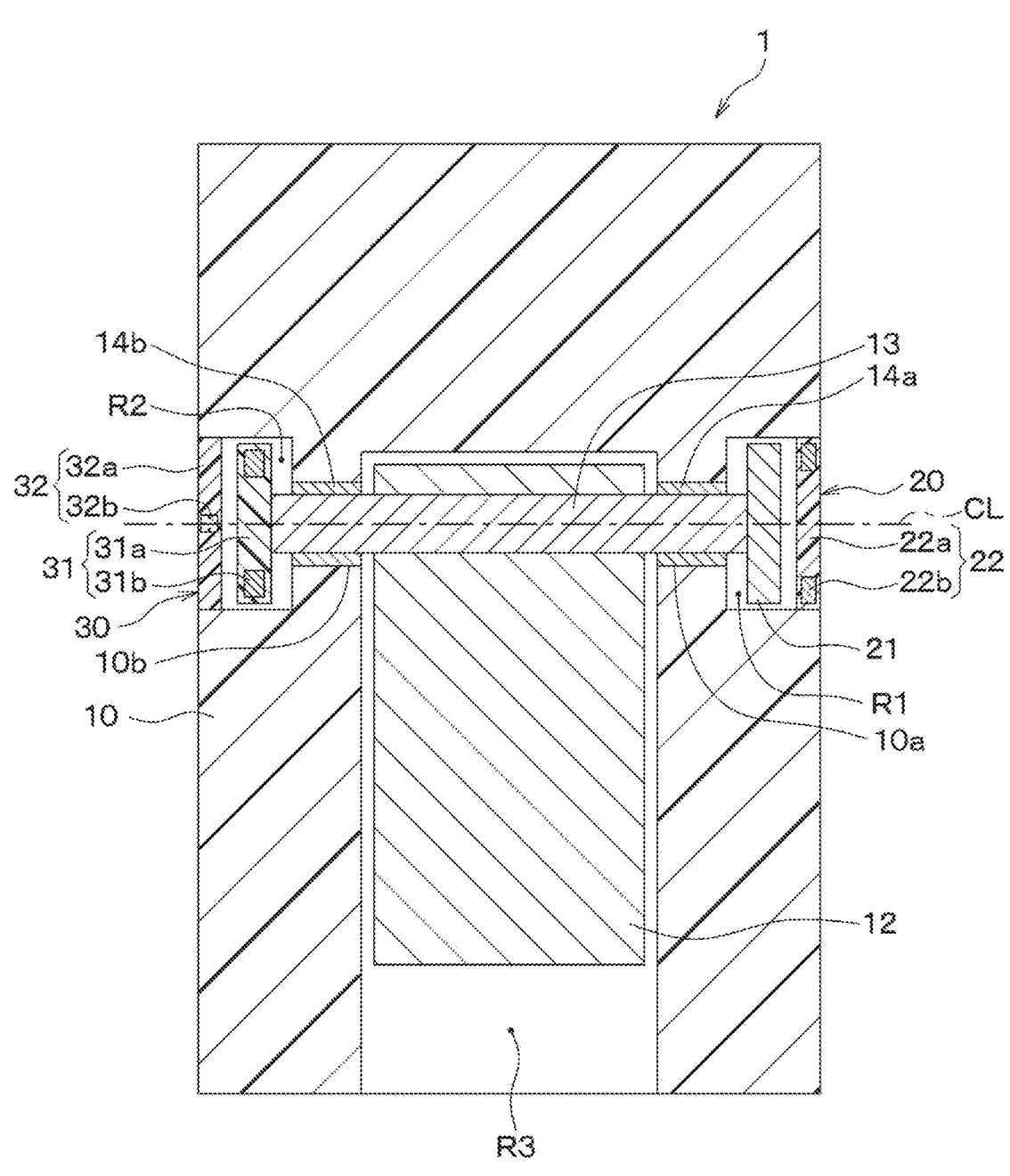
FIG. 8 is a cross-sectional view taken along the same line as FIG. 3 according to a fifth embodiment.

Next, the fifth embodiment will be described with reference to FIG. 8. A brake pedal device 1 of the present embodiment is provided with collars 14*a*, 14*b* in comparison with the brake pedal device 1 of the first embodiment. The other configurations are the same as those of the first embodiment.

A collar 14*a* is a cylindrical member that is accommodated within a surrounding portion 10*a* of a housing 10. A collar 14*b* is a cylindrical member that is accommodated within a surrounding portion 10*b* of the housing 10. The collars 14*a*, 14*b* are fixed to the housing 10 by adhesive, press fitting, or the like. The collar 14*a* may be made of resin or metal. A rotating shaft 13 passes through a through hole formed by an inner circumferential surfaces of the collars 14*a*, 14*b*. In such manner, the collars 14*a*, 14*b* annularly surround the periphery (for example, the entire circumference, or approximately the entire circumference) of the rotating shaft 13 and rotatably support the rotating shaft 13. Therefore, in the present embodiment, the collars 14*a*, 14*b* correspond to a bearing portion instead of the surrounding portions 10*a*, 10*b*. Further, a member having a structure in which a portion is missing in the direction in which it extends annularly, such as a split bush, also falls under the category of a cylindrical member.

A mechanism chamber R3 and a first sensor chamber R1 are in communication with each other through a space between the collar 14a and the rotating shaft 13. The mechanism chamber R3 and a second sensor chamber R2 are in communication with each other through a space between the collar 14b and the rotating shaft 13. By providing such collars 14a, 14b, it is easy to adjust the space around the rotating shaft 13 in the surrounding portion 10a to be narrower. Further, the possibility of foreign matter originating from the reaction force generating mechanism 15 entering the sensor chambers R1 and R2 from the mechanism chamber R3 can be reduced.

The modifications to the first embodiment as shown in the present embodiment are also applicable to the second to fourth embodiments. Further, the same effects can be obtained from the configuration of the present embodiment that is similar to that of the first to fourth embodiments.

Sixth Embodiment

Figure 9:
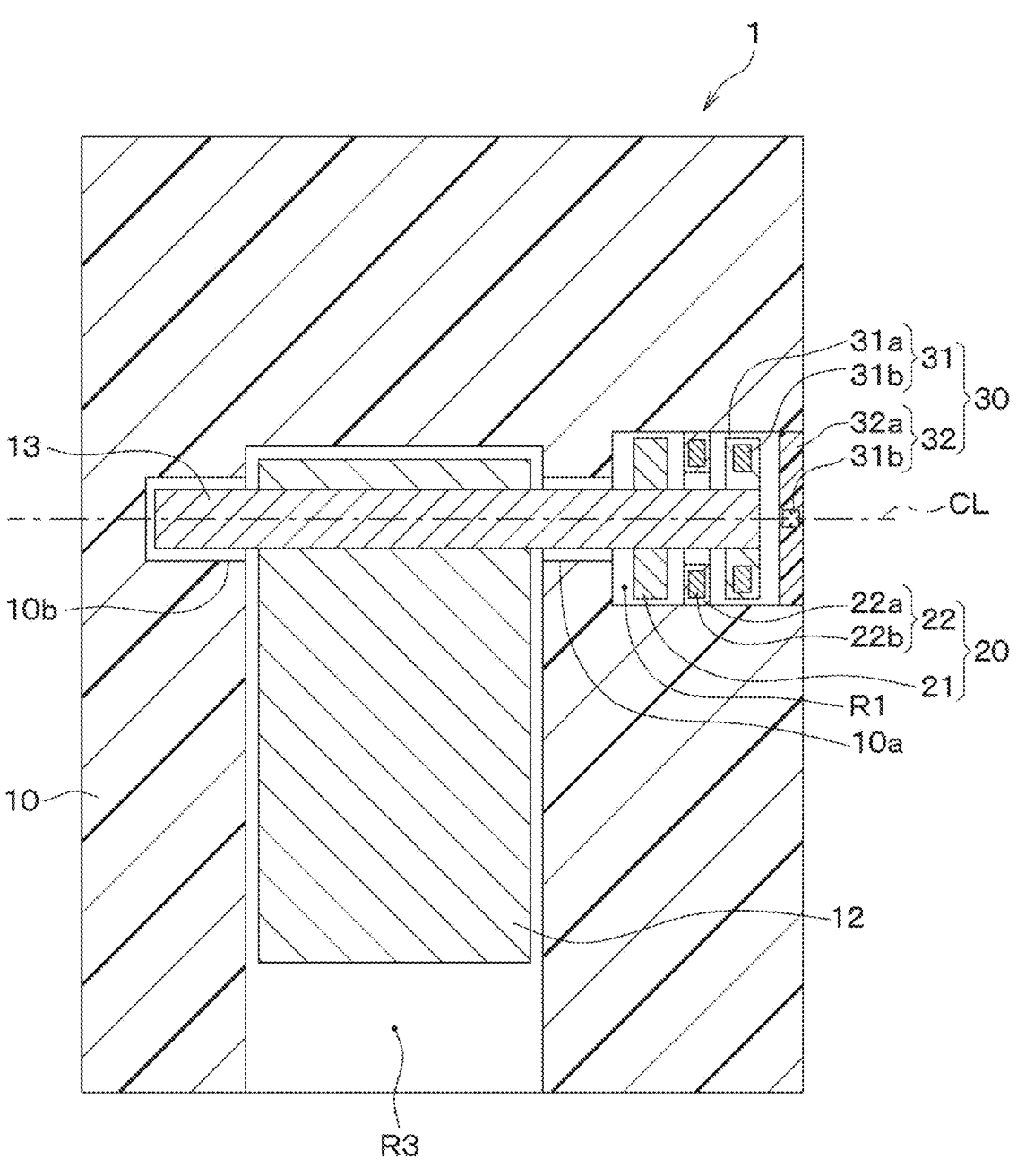
FIG. 9 is a cross-sectional view taken along the same line as FIG. 3 according to a sixth embodiment.

Next, the sixth embodiment will be described with reference to FIG. 9. A brake pedal device 1 of the present embodiment is different from the brake pedal device 1 of the first embodiment in the position of the second sensing unit 30. That is, the second sensor chamber R2 is eliminated, and both the first sensing unit 20 and the second sensing unit 30 are disposed in the first sensor chamber R1. Therefore, the first sensor chamber R1 is larger than that in the first embodiment. The other configuration is the same as in the first embodiment.

In the present embodiment, a second sensing unit 30 is disposed on the same side as a first sensing unit 20 with respect to a pedal arm 12 in a direction along the axis line CL. The second sensing unit 30 is positioned on the opposite side of a surrounding unit 10a with respect to the first sensing unit 20.

A rotating member 31 of the second sensing unit 30 is disposed in the first sensor chamber R1 on the opposite side of the surrounding unit 10a with respect to a fixed member 22, and is fixed to a rotating shaft 13. The fixed member 32 of the second sensing unit 30 is disposed on the opposite side of the surrounding portion 10a with respect to the rotating member 31, and is fixed to a housing 10 (for example, by press-fitting or bolting).

To achieve such configuration, a through hole is formed in the center of a base portion 22a of the present embodiment, and the rotating shaft 13 passes through the through hole, thereby connecting the base portion 31a and the rotating shaft 13.

The modifications to the first embodiment as shown in the present embodiment are also applicable to the second to fifth embodiments. Further, the same effects can be obtained from the configuration of the present embodiment that is similar to that of the first to fifth embodiments.

Seventh Embodiment

Figure 10:
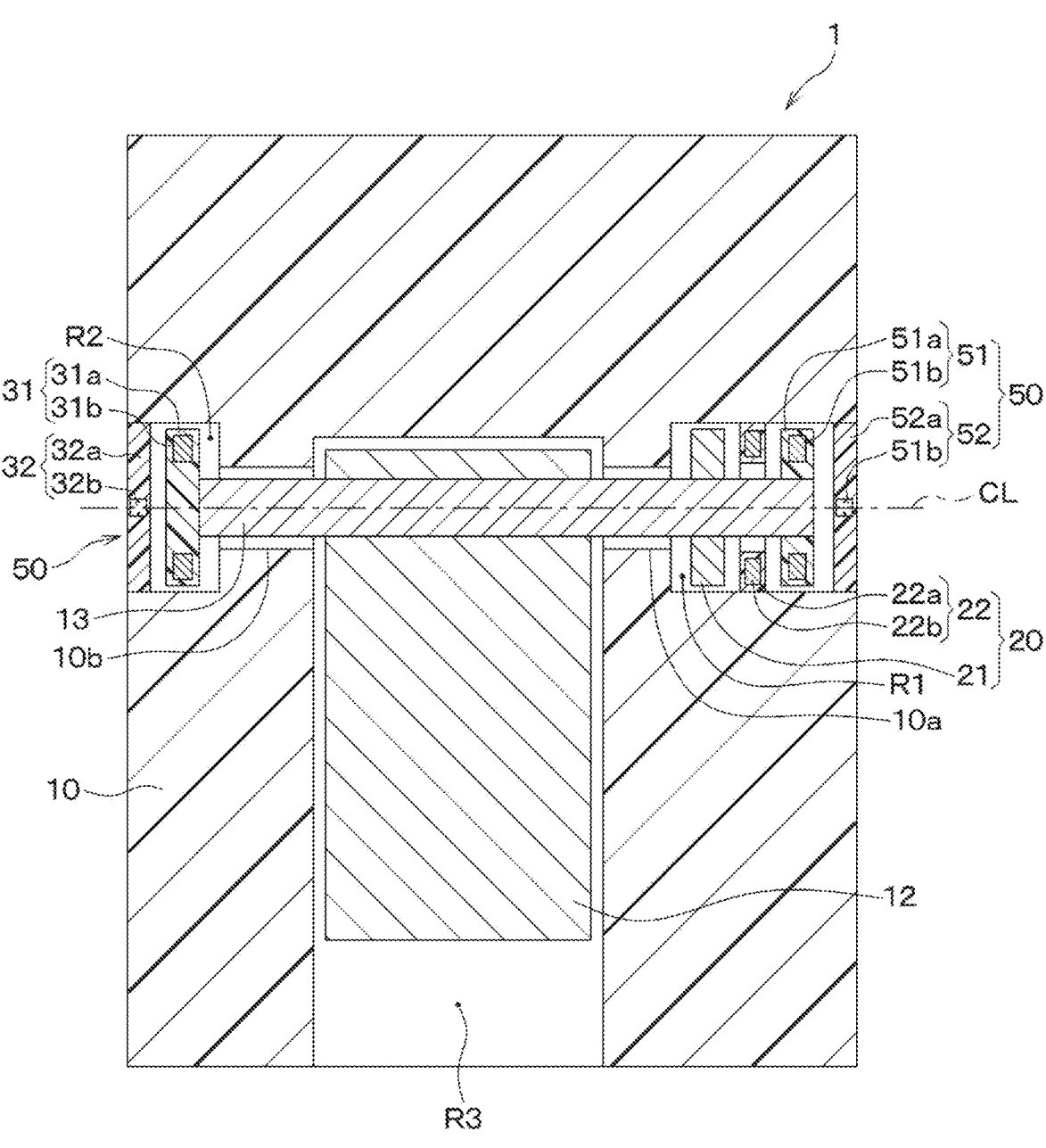
FIG. 10 is a cross-sectional view taken along the same line as FIG. 3 according to a seventh embodiment.

Next, the seventh embodiment will be described with reference to FIG. 10. A brake pedal device 1 of the present embodiment is configured by adding a third sensing unit 50 to the brake pedal device 1 of the first embodiment. The third sensing unit 50 is disposed in a first sensor chamber R1 together with a first sensing unit 20. Therefore, the first sensor chamber R1 is larger than that in the first embodiment. The other configuration is the same as in the first embodiment.

The third sensing unit 50, like a second sensing unit 30, is a unit that constitutes a Hall sensor, and has a rotating member 51 that rotates relative to a housing 10 and a fixed member 52 that is fixed to the housing 10.

The rotating member 51 is disposed in the first sensor chamber R1 on the opposite side of a surrounding portion 10a with respect to a fixed member 22, is fixed to a rotating shaft 13, and has a base portion 51a and a target 51b. The fixed member 52 is disposed on the opposite side of the surrounding portion 10a with respect to the rotating member 51, and is fixed (for example, by press-fitting or bolt-fastening) to the housing 10, and has a base portion 52a and a sensor element 52b.

The base portion 51a, the target 51b, the base portion 52a, and the sensor element 52b have the same shape, structure, relative arrangement, and function as the base portion 31a, the target 31b, the base portion 32a, and the sensor element 32b of the second sensing unit 30, respectively.

To achieve such configuration, a through hole is formed in the center of the base portion 22a of the present embodiment, and the rotating shaft 13 passes through the through hole, thereby connecting the base portion 51a and the rotating shaft 13.

In such manner, the brake pedal device 1 of the present embodiment has three sensor elements 22b, 32b, and 52b that detect the rotation of the three targets 21, 31b, and 51b that rotate together with the rotating shaft 13, respectively. The sensor elements 32b and 52b detect the rotation of the targets 31b and 51b using the same detection principle, that is, a detection principle that utilizes a physical phenomenon called the Hall effect. However, the sensor element 22b detects the rotation of the target 21 based on a detection principle that utilizes a physical phenomenon called mutual induction. That is, any two of the three sensor elements 22b, 32b, and 52b (for example, the sensor element 22b and the sensor element 32b) detect the rotation of the target using detection principles different from each other. In such manner, the possibility of all the sensing units failing due to a common reason can be reduced.

The modifications to the first embodiment as described in the present embodiment are also applicable to the second to fifth embodiments. Further, the same effects can be obtained from the configuration of the present embodiment that is similar to that of the first to fifth embodiments.

Eighth Embodiment

Figure 11:
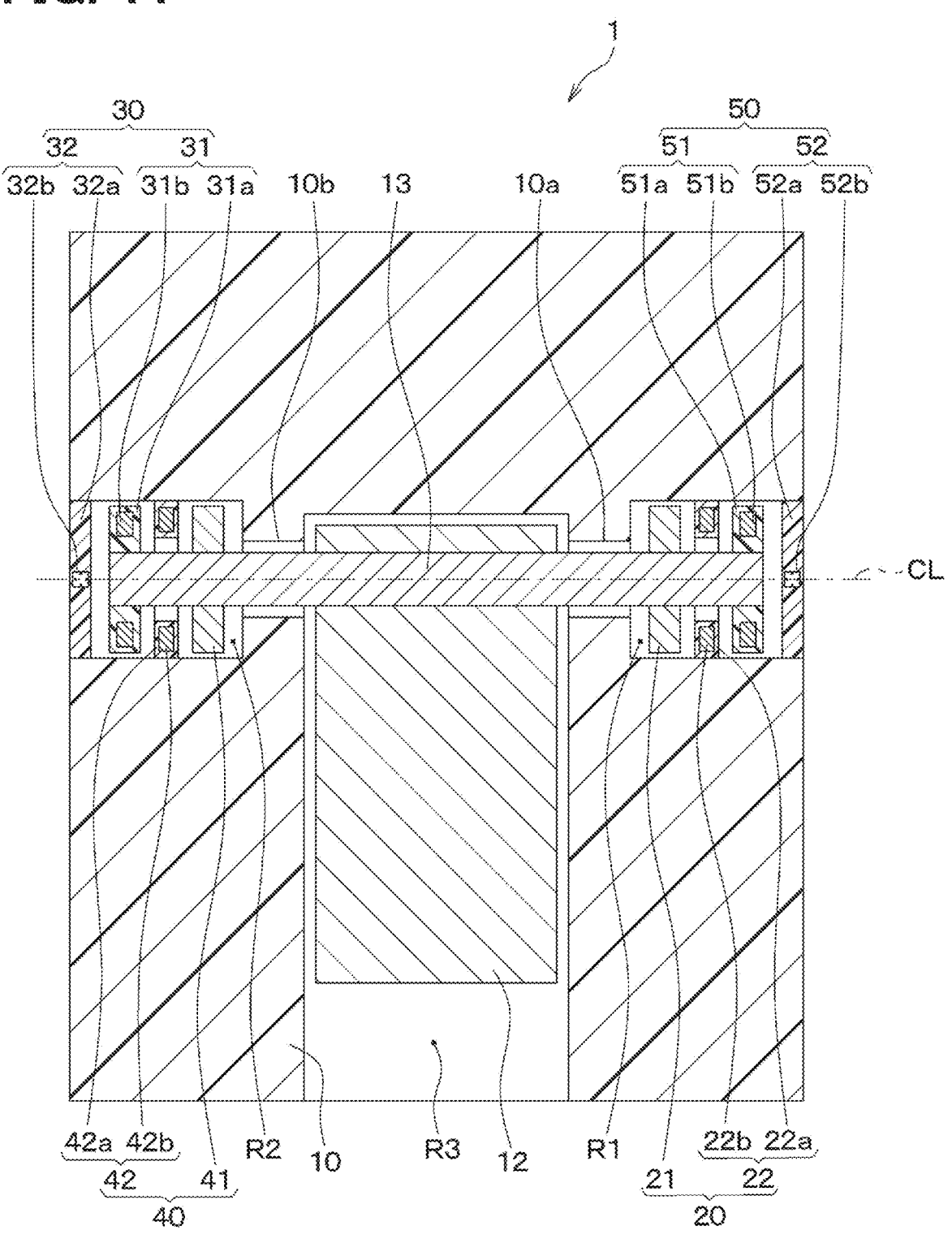
FIG. 11 is a cross-sectional view taken along the same line as FIG. 3 according to an eighth embodiment.

Next, the eighth embodiment will be described with reference to FIG. 11. A brake pedal device 1 of the present embodiment is configured by adding an additional sensing unit 40 to the brake pedal device 1 of the seventh embodiment. The additional sensing unit 40 is disposed in a second sensor chamber R2 together with a second sensing unit 30. Therefore, the second sensor chamber R2 is larger than that in the seventh embodiment. The other configurations are the same as those in the seventh embodiment.

Similar to a first sensing unit 20, the additional sensing unit 40 is a unit that constitutes an inductive sensor, and has a target 41 that rotates relative to a housing 10 and a fixed member 42 that is fixed to the housing 10.

The target 41 is disposed in the second sensor chamber R2 on the same side as a surrounding portion 10b with respect to a rotating member 31 as a reference, and is fixed to a rotating shaft 13. The fixed member 42 is disposed at a position between the rotating member 31 and the target 41 and is fixed to the housing 10, and has a base portion 42a and a sensor element 42b.

The target 41, the base portion 42a, and the sensor element 42b have the same shape, structure, relative arrangement, and function as the target 21, the base portion 22a, and the sensor element 22b of the first sensing unit 20, respectively. However, in the present embodiment, a through hole is formed in the center of the base portion 42a, and the rotating shaft 13 passes through the through hole, thereby connecting the rotating member 31 and the rotating shaft 13.

In such manner, the brake pedal device 1 of the present embodiment has four sensor elements 22b, 32b, 42b, and 52b that detect the rotation of the four targets 21, 31b, 41, and 51b that rotate together with the rotating shaft 13, respectively. The sensor elements 32b and 52b detect the rotation of the targets 31b and 51b using the same detection principle, that is, a detection principle that utilizes a physical phenomenon called the Hall effect. Further, the sensor elements 22b and 42b detect the rotation of the targets 21 and 41 using the same detection principle, that is, a detection principle that utilizes a physical phenomenon called mutual induction. That is, any two of the four sensor elements 22b, 32b, 42b, and 52b (for example, the sensor element 22b and the sensor element 32b) detect the rotation of the target using detection principles different from each other. In such manner, the possibility of all the sensing units failing due to a common cause can be reduced. Further, the same effects as those of the seventh embodiment can be obtained from the same configuration of the present embodiment.

Ninth Embodiment

Figure 12:
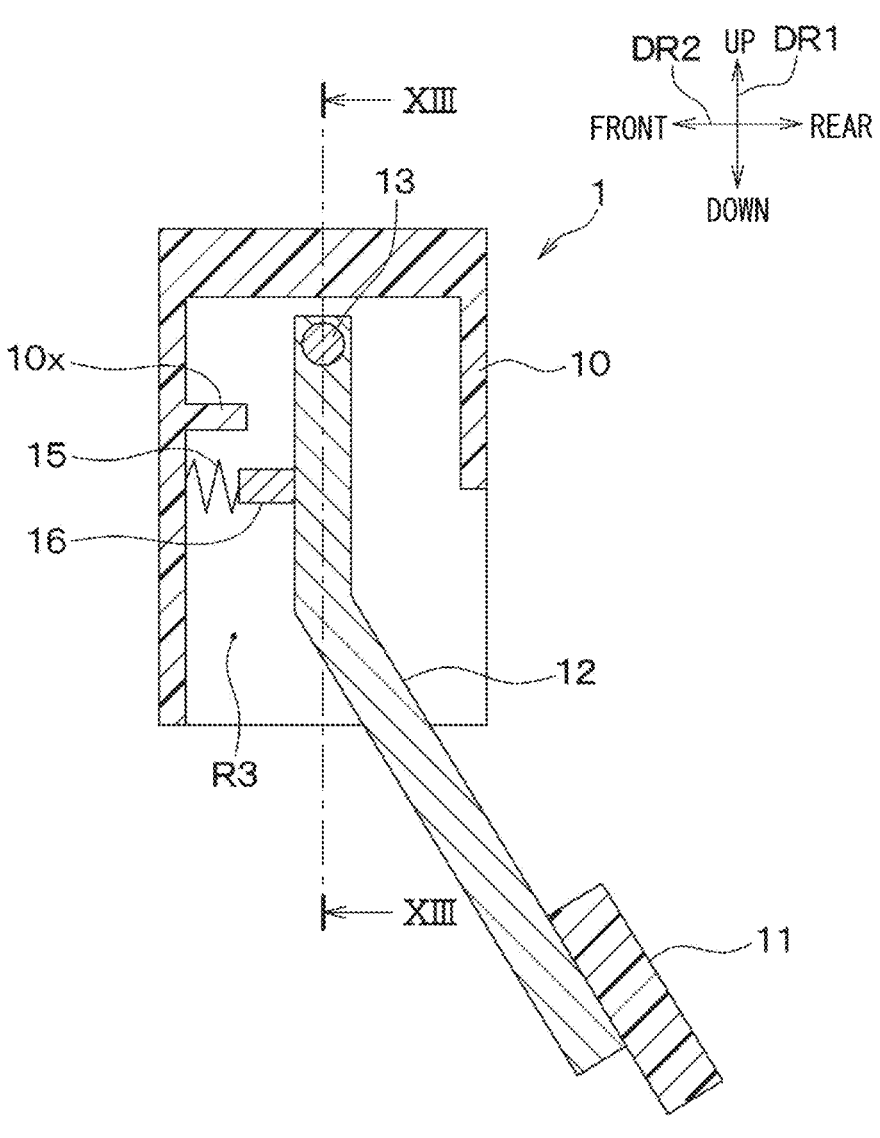
FIG. 12 is a cross-sectional view taken along the same line as FIG. 4 according to a ninth embodiment.
Figure 13:
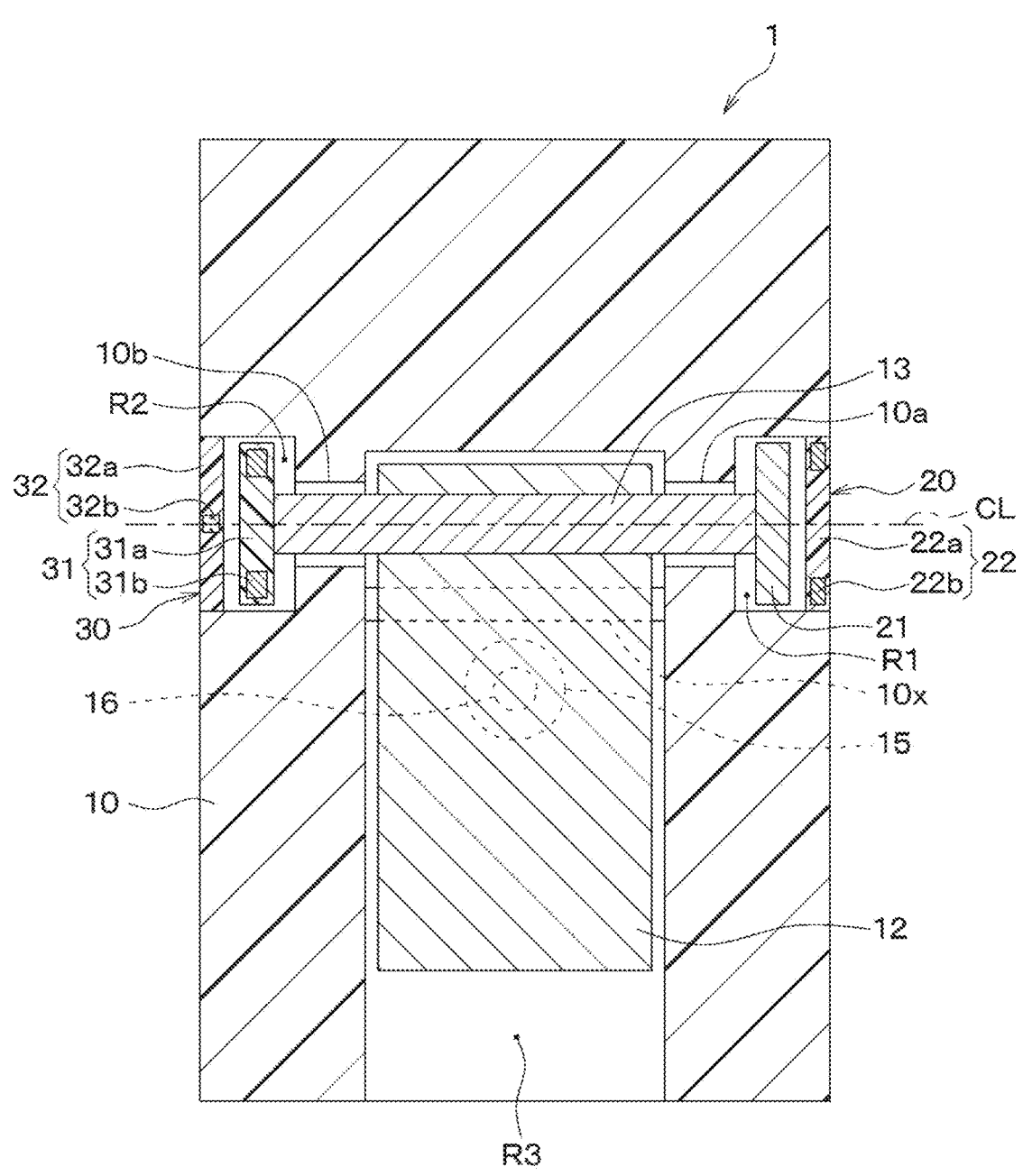
FIG. 13 is a cross-sectional view taken along a line XIII-XIII in FIG. 12.

Next, the ninth embodiment will be described with reference to FIGS. 12 and 13. A brake pedal device 1 of the present embodiment is configured by adding a partition wall 10x and a rod 16 to the brake pedal device 1 of the first embodiment. The other configuration is similar to that of the first embodiment.

The partition wall 10x is a flat plate-shaped member provided inside a mechanism chamber R3 to protrude from a housing 10 toward a pedal arm 12. The partition wall 10x may be formed integrally with the housing 10, or may be formed separately and then fixed to the housing 10.

The partition wall 10x is formed at a position between a reaction force generating mechanism 15 and surrounding portions 10a, 10b in a mechanism chamber R3. That is, the partition wall 10x is a partition member that separates the reaction force generating mechanism 15 from the surrounding portions 10a and 10b.

The partition wall 10x is disposed at a position away from the pedal arm 12 even when a pedal 11 is pedaled to a maximum extent. Therefore, a space always exists between the partition wall 10x and the pedal arm 12.

The rod 16 is a non-metallic member, for example made of resin, and is connected to the pedal arm 12 at one end and to the reaction force generating mechanism 15 at the other end. In such manner, the rod 16 is disposed at a position between the reaction force generating mechanism 15 and the pedal arm 12. The reaction force generated by the reaction force generating mechanism 15 is thus transmitted to the pedal arm 12 via the rod 16. Further, the force of the brake operation by the driver is transmitted from the pedal arm 12 to the reaction force generating mechanism 15 via the rod 16.

Further, when the amount of pedaling of the pedal 11 is maximum, a virtual straight line showing the shortest distance from the end of the reaction force generating mechanism 15 on a pedal arm 12 side to the surrounding portion 10a may pass through the inside of the partition wall 10x. In other words, the surrounding portion 10a may be hidden from the end of the reaction force generating mechanism 15 on the pedal arm 12 side by the partition wall 10x. Further, when the pedal 11 is pedaled to a maximum extent, the surrounding portion 10b may be hidden from the end of the reaction force generating mechanism 15 on the pedal arm 12 side by the partition wall 10x. These conditions may be satisfied not only when the amount of pedaling of the pedal 11 is at its maximum, but also when the amount of pedaling of the pedal 11 is zero.

(1) As described above, the partition wall 10x is formed at a position between the reaction force generating mechanism 15 and the surrounding portions 10a, 10b in the mechanism chamber R3. In such manner, foreign matter such as metal powder generated by the reaction force generating mechanism 15 is blocked by the partition wall 10x, reducing the possibility of foreign matter from the reaction force generating mechanism 15 entering the sensor chambers R1, R2 through the surrounding portions 10a, 10b. Thus, it is possible to suppress the deterioration in the detection accuracy of the first sensing unit 20 and the second sensing unit 30.

(2) Further, the rod 16 is disposed at a position between the reaction force generating mechanism 15 and the pedal arm 12, and transmits the reaction force generated by the reaction force generating mechanism 15 to the pedal arm 12. The presence of the rod 16 places the reaction force generating mechanism 15 away from the space between the partition wall 10x and the pedal arm 12. Therefore, the possibility of foreign matter originating from the reaction force generating mechanism 15 passing through the space between the partition wall 10x and the pedal arm 12 and entering the sensor chambers R1, R2 via the surrounding portions 10a, 10b can be reduced. Thus, it is possible to suppress the deterioration in the detection accuracy of the first sensing unit 20 and the second sensing unit 30.

The modifications to the first embodiment as shown in the present embodiment are also applicable to the second to eighth embodiments. Further, the same effects can be obtained from the configuration of the present embodiment that is similar to that of the first to eighth embodiments.

Tenth Embodiment

Figure 14:
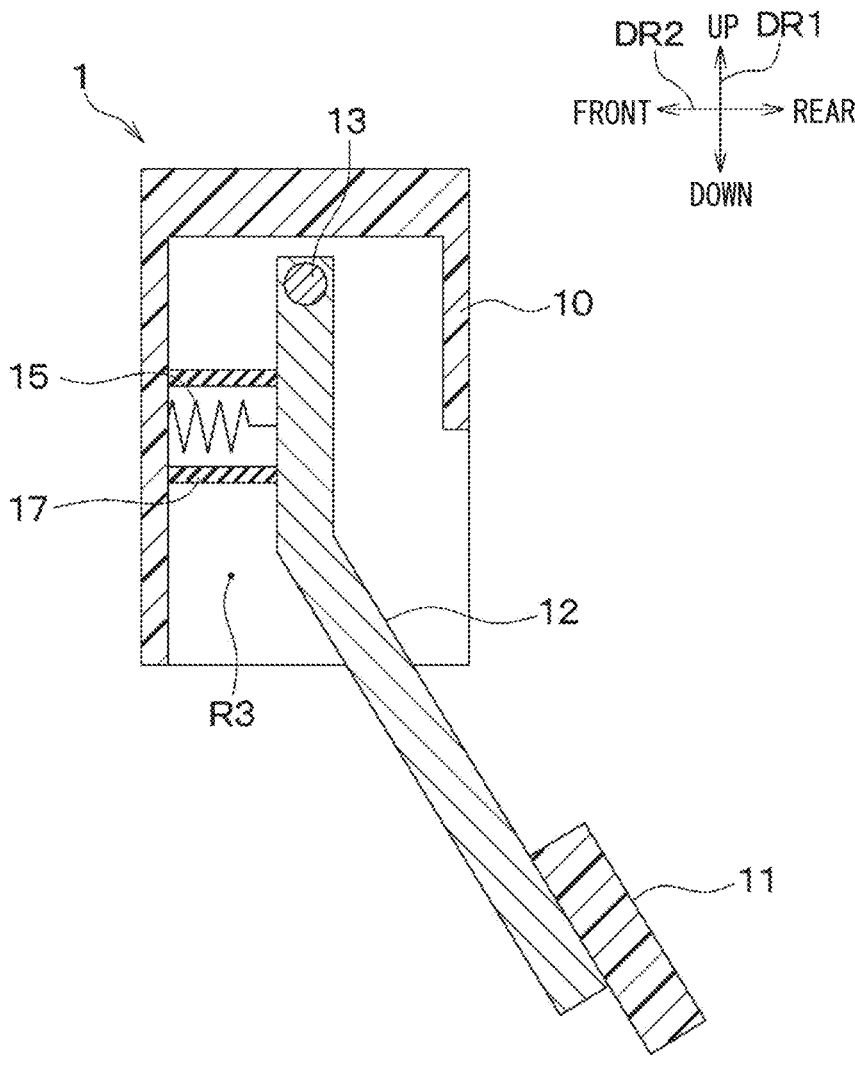
FIG. 14 is a cross-sectional view taken along the same line as FIG. 4 according to a tenth embodiment.

Next, the tenth embodiment will be described with reference to FIG. 14. A brake pedal device 1 of the present embodiment is different from the brake pedal device 1 of the first embodiment in that a cover 17 is added. The other configuration is similar to that of the first embodiment.

The cover 17 is a member that extends in a cylindrical shape from a housing 10 to a pedal arm 12 inside a mechanism chamber R3, and surrounds a periphery (for example, the entire circumference) of a reaction force generating mechanism 15 in an annular shape. The cover 17 has one end connected to the housing 10 and the other end connected to the pedal arm 12.

Therefore, a portion of the cover 17 is formed at a position between the reaction force generating mechanism 15 and the surrounding portions 10a, 10b in the mechanism chamber R3. That is, the cover 17 is a partition member that separates the reaction force generating mechanism 15 from the surrounding portions 10a and 10b.

Further, the cover 17 is a member that expands and contracts in response to the displacement of the pedal arm 12, and may be an elastic member (e.g., a rubber member) or a bellows-shaped member (e.g., a resin member). With such configuration, the cover 17 covers and hides the entire reaction force generating mechanism 15 from the surrounding portions 10a, 10b regardless of the position of the pedal arm 12.

In such manner, foreign matter such as metal powder generated by the reaction force generating mechanism 15 is blocked by the cover 17, thereby reducing the possibility of foreign matter from the reaction force generating mechanism 15 entering the sensor chambers R1, R2 through the surrounding portions 10a, 10b. Thus, it is possible to suppress the deterioration in the detection accuracy of the first sensing unit 20 and the second sensing unit 30.

(1) In such manner, the cover 17 extends from the housing 10 to the pedal arm 12 within the mechanism chamber R3, and expands and contracts in response to the displacement of the pedal arm 12. In such manner, foreign matter originating from the reaction force generating mechanism 15 can be blocked over the entire length from the housing 10 to the pedal arm 12 regardless of the position of the pedal arm 12.

The modifications to the first embodiment as shown in the present embodiment are also applicable to the second to eighth embodiments. Further, the same effects can be obtained from the configuration of the present embodiment that is similar to that of the first to eighth embodiments.

Eleventh Embodiment

Figure 15:
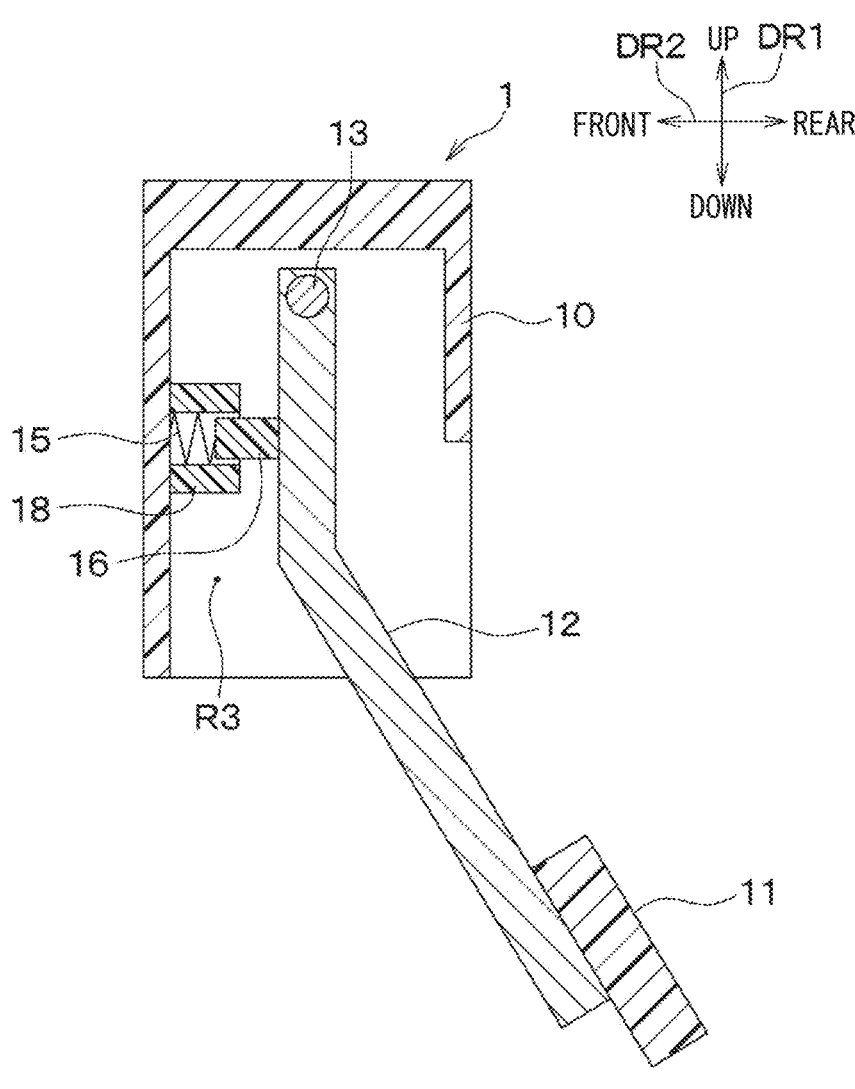
FIG. 15 is a cross-sectional view taken along the same line as FIG. 4 according to an eleventh embodiment.

Next, the eleventh embodiment will be described with reference to FIG. 15. A brake pedal device 1 of the present embodiment is configured by adding a surrounding wall 18 and a rod 16 to the brake pedal device 1 of the first embodiment. The other configuration is similar to that of the first embodiment.

The surrounding wall 18 is provided in a mechanism chamber R3 to protrude from a housing 10 toward a pedal arm 12, and is a cylindrical rigid cover that annularly surrounds the periphery (for example, the entire circumference) of a reaction force generating mechanism 15. The surrounding wall 18 may be formed integrally with the housing 10, or may be formed separately and then fixed to the housing 10.

Therefore, a portion of the surrounding wall 18 is formed at a position between the reaction force generating mechanism 15 and the surrounding portions 10a, 10b in the mechanism chamber R3. In other words, the surrounding wall 18 is a partition member that separates the reaction force generating mechanism 15 from the surrounding portions 10a and 10b.

The surrounding wall 18 is disposed at a position spaced apart from the pedal arm 12 even when the pedal 11 is pedaled to a maximum extent. Therefore, there is always a space between the surrounding wall 18 and the pedal arm 12.

The rod 16 is a non-metallic member, for example made of resin, and is in slidable contact with the pedal arm 12 at one end and connected to the reaction force generating mechanism 15 at the other end. In the present embodiment, the reaction force generating mechanism 15 and the rod 16 can be regarded as constituting one reaction force generating mechanism. In such manner, the rod 16 is disposed at a position between the reaction force generating mechanism 15 and the pedal arm 12. The reaction force generated by the reaction force generating mechanism 15 is thus transmitted to the pedal arm 12 via the rod 16. Further, the force of the brake operation by the driver is transmitted from the pedal arm 12 to the reaction force generating mechanism 15 via the rod 16. When the brake operation is performed on the pedal 11, the rod 16 and the pedal arm 12 slide, and the surrounding wall 18 and the reaction force generating mechanism 15 slide. Therefore, the sliding part between the rod 16 and the pedal arm 12 and the sliding part between the surrounding wall 18 and the reaction force generating mechanism 15 can be respectively considered as the part in the reaction force generating mechanism where sliding occurs. These parts are positioned below the surrounding portions 10a and 10b, the first sensing unit 20, and the second sensing unit 30 in the vehicle top-bottom direction DR1.

Further, when the pedal 11 is pedaled to a maximum extent, a virtual straight line forming the shortest distance from the end of the reaction force generating mechanism 15 on the pedal arm 12 side to the surrounding portion 10a may pass through the inside of the surrounding wall 18. In other words, the surrounding portion 10a may be hidden by the surrounding wall 18 from the end of the reaction force generating mechanism 15 on the pedal arm 12 side. Further, when the pedal 11 is pedaled to a maximum extent, the surrounding wall 18 may hide the surrounding portion 10b from the end of the reaction force generating mechanism 15 on the pedal arm 12 side. These conditions may be satisfied not only when the amount of pedaling of the pedal 11 is at its maximum, but also when the amount of pedaling of the pedal 11 is zero.

When the pedal 11 is pedaled to a maximum extent, a tip of the rod 16 is inserted into the space surrounded by the surrounding wall 18. That is, a line segment connecting any two points on an annular end of the surrounding wall 18 on the pedal arm 12 side passes through the rod 16. Such configuration makes it difficult for foreign matter originating from the reaction force generating mechanism 15 to escape to the outside of the surrounding wall 18. These conditions may be satisfied not only when the amount of pedaling of the pedal 11 is at its maximum, but also when the amount of pedaling of the pedal 11 is zero.

As described above, the surrounding wall 18 is formed at a position between the reaction force generating mechanism 15 and the surrounding portions 10a, 10b in the mechanism chamber R3. In such manner, foreign matter such as metal powder generated by the reaction force generating mechanism 15 is blocked by the surrounding wall 18, reducing the possibility of foreign matter from the reaction force generating mechanism 15 entering the sensor chambers R1, R2 through the surrounding portions 10a, 10b. Thus, it is possible to suppress the deterioration in the detection accuracy of the first sensing unit 20 and the second sensing unit 30.

Further, the rod 16 is disposed at a position between the reaction force generating mechanism 15 and the pedal arm 12, and transmits the reaction force generated by the reaction force generating mechanism 15 to the pedal arm 12. The presence of the rod 16 places the reaction force generating mechanism 15 away from the space between the partition wall 10x and the pedal arm 12. Therefore, the possibility of foreign matter originating from the reaction force generating mechanism 15 passing through the space between the surrounding wall 18 and the pedal arm 12 and entering the sensor chambers R1, R2 via the surrounding portions 10a, 10b can be reduced. Thus, it is possible to suppress the deterioration in the detection accuracy of the first sensing unit 20 and the second sensing unit 30. Further, since the surrounding wall 18 surrounds the reaction force generating mechanism 15 in an annular shape, foreign matter originating from the reaction force generating mechanism 15 is less likely to escape to the outside of the surrounding wall 18.

The modifications to the first embodiment as shown in the present embodiment are also applicable to the second to eighth embodiments. Further, the same effects can be obtained from the configuration of the present embodiment that is similar to that of the first to eighth embodiments.

Twelfth Embodiment

Figure 16:
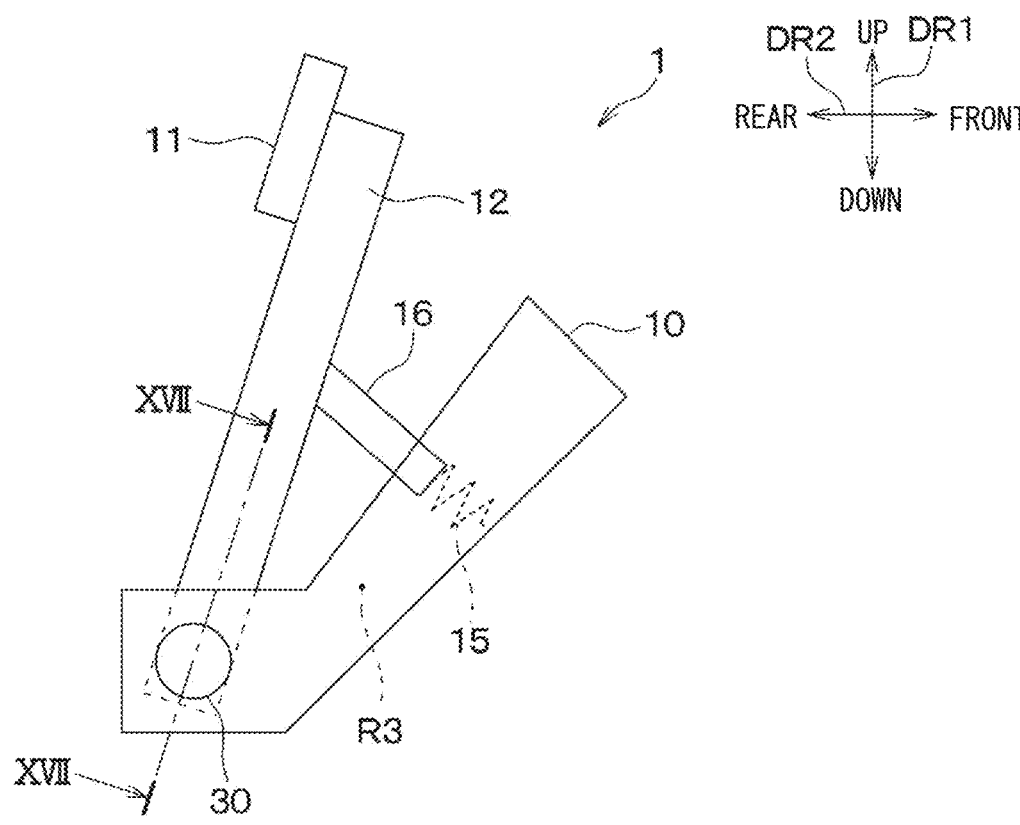
FIG. 16 is a side view of a brake pedal device according to a twelfth embodiment.
Figure 17:
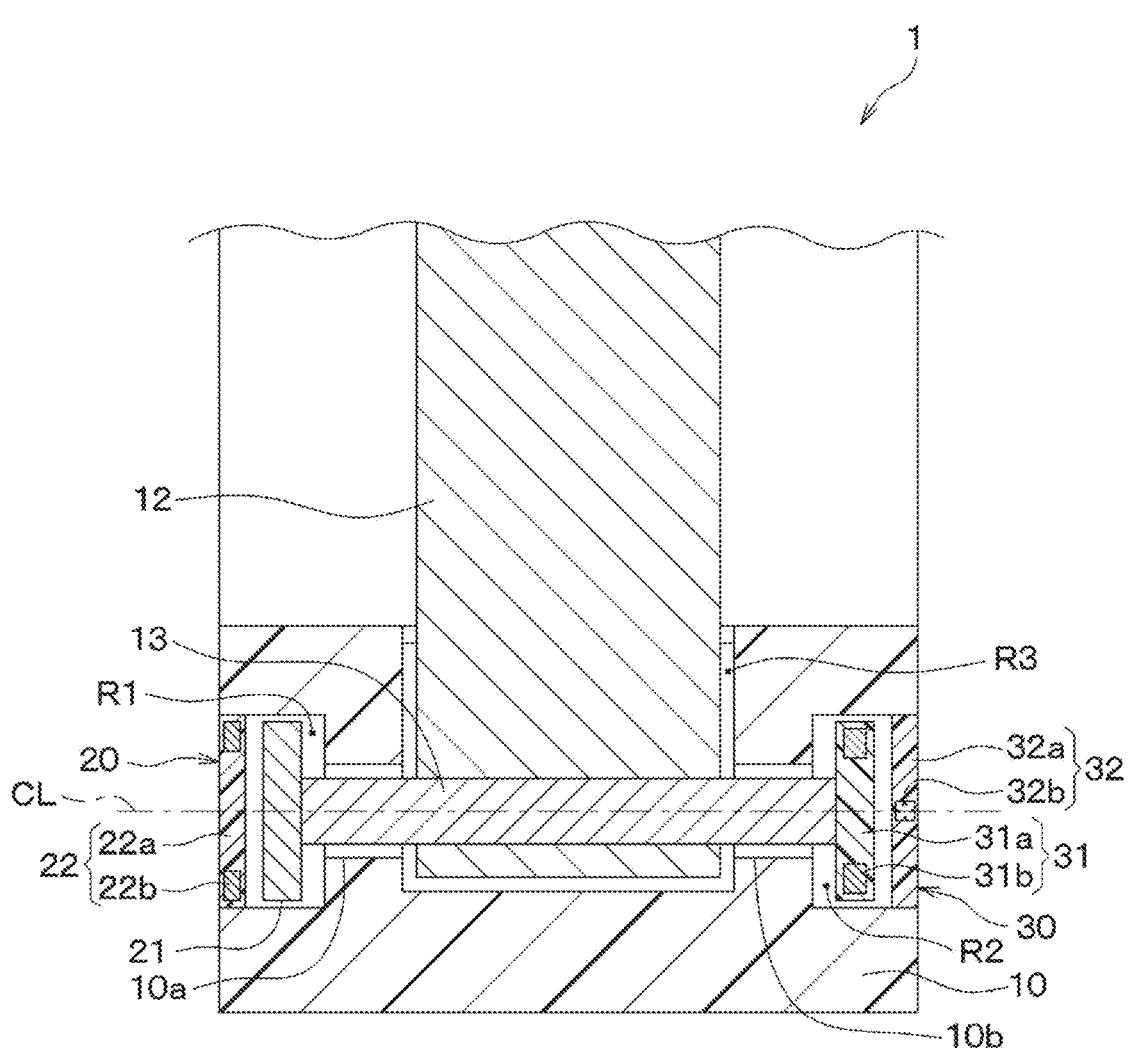
FIG. 17 is a cross-sectional view taken along a XVII-XVII line of FIG. 16.

Next, the twelfth embodiment will be described with reference to FIGS. 16 and 17. A brake pedal device 1 of the present embodiment is an organ-type brake pedal device 1 for a vehicle. The brake pedal device 1 is attached to the floor or the like of a vehicle. Similar to the first embodiment, the brake pedal device 1 is a device for realizing a brake-by-wire system.

The brake pedal device 1 of the present embodiment has a housing 10, a pedal 11, a pedal arm 12, a rotating shaft 13, a reaction force generating mechanism 15, a first sensing unit 20, and a second sensing unit 30, similar to the first embodiment. The structures, functions, and interconnections of these components of the brake pedal device 1 are basically the same as those in the first embodiment.

However, whereas in the first embodiment the rotating shaft 13 is disposed on a toe side of the foot that pedals the pedal 11, in the present embodiment the rotating shaft 13 is disposed on a heel side of the foot that pedals the pedal 11. The brake pedal device 1 of the present embodiment also has a rod 16. The rod 16 is a bar-shaped member that is connected to the pedal arm 12 at one end and to the reaction force generating mechanism 15 at the other end. In such manner, the rod 16 is disposed at a position between the reaction force generating mechanism 15 and the pedal arm 12. The reaction force generated by the reaction force generating mechanism 15 is thus transmitted to the pedal arm 12 via the rod 16. Further, the force of the brake operation by the driver is transmitted from the pedal arm 12 to the reaction force generating mechanism 15 via the rod 16.

Therefore, in the present embodiment as well, when the driver performs a brake operation such as pedaling and releasing the pedal 11, the pedal 11 and the pedal arm 12 rotate together with the rotating shaft 13 about an axis line CL. At such time, the rotating shaft 13 is rotatably supported by the surrounding portions 10a and 10b of the housing 10 and rotates. Further, the reaction force generating mechanism 15 applies a reaction force against the pedal operation of the pedal 11 to the pedal arm 12 via the rod 16.

Further, the configurations and arrangements of the first sensing unit 20 constituting the inductive sensor and the second sensing unit 30 constituting the Hall sensor are also similar to those in the first embodiment. Therefore, the targets 21 and 31b are attached to the rotating shaft 13 and rotate together with the rotating shaft 13. The sensor elements 22b and 32b thus detect the rotation of the targets 21 and 31b, respectively, and the displacement amount of the pedal 11 can be detected.

The present embodiment differs from the first embodiment in that the first sensing unit 20 and the second sensing unit 30 are positioned below the reaction force generating mechanism 15 in the vehicle top-bottom direction.

In the present embodiment as well, a first sensor chamber R1, a second sensor chamber R2, and a mechanism chamber R3 are formed within the housing 10. The arrangement of the components in the first sensor chamber R1, the second sensor chamber R2, and the mechanism chamber R3 is also the same as in the first embodiment.

Therefore, the first sensing unit 20 and the end of the rotating shaft 13 on a first sensing unit 20 side are disposed in the first sensor chamber R1. The second sensing unit 30 and the end of the rotating shaft 13 on a second sensing unit 30 side are disposed in the second sensor chamber R2. The rotating shaft 13, the pedal arm 12, and the reaction force generating mechanism 15 are arranged in the mechanism chamber R3. However, the rod 16 is also arranged in the mechanism chamber R3.

The first sensor chamber R1 and the second sensor chamber R2 are disposed on one side and the other side of the mechanism chamber R3 in the vehicle width direction DR3, respectively. Further, the first sensor chamber R1 and the mechanism chamber R3 are positionally separated from each other via the surrounding portion 10a. Similarly, the second sensor chamber R2 and the mechanism chamber R3 are positionally separated from each other via the surrounding portion 10b.

Further, a space inside the first sensor chamber R1 and a space inside the mechanism chamber R3 are in communication with each other via a space formed at a position between the surrounding portion 10a and the rotating shaft 13. Similarly, a space inside the second sensor chamber R2 and a space inside the mechanism chamber R3 communicate with each other via a space formed at a position between the surrounding portion 10b and the rotating shaft 13. The relationships among the cross-sectional area sizes of the spaces between the first sensor chamber R1, the second sensor chamber R2, the mechanism chamber R3, and the surrounding portions 10a and 10b are also the same as in the first embodiment.

It should be noted that the modifications to the first embodiment, such as those in the second to eleventh embodiments, are also applicable to the present embodiment. In such manner, in the brake pedal device 1 of the present embodiment, the same effects can be obtained from the same configuration as in the first to eleventh embodiments.

Thirteenth Embodiment

Figure 18:
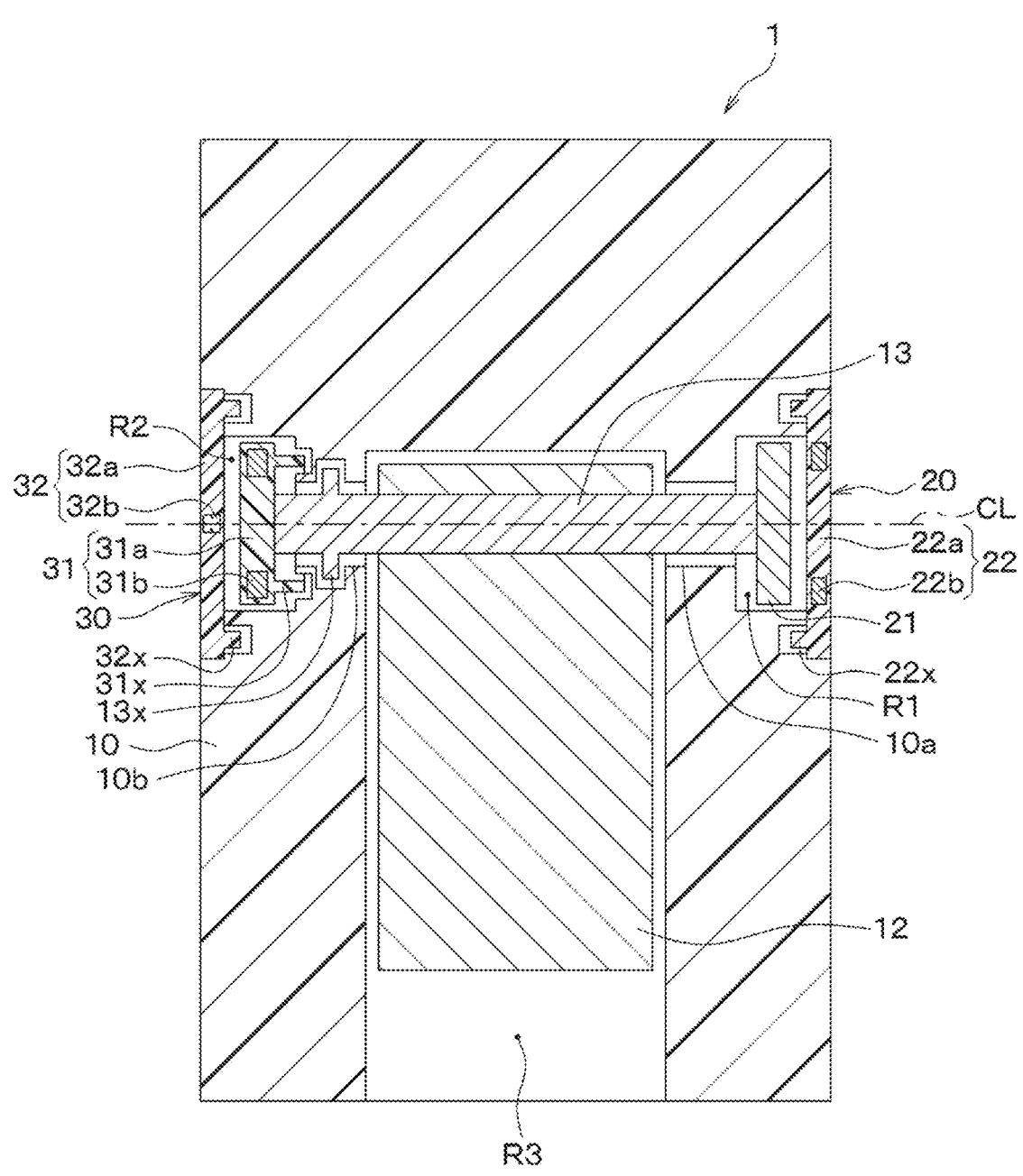
FIG. 18 is a cross-sectional view taken along the same line as FIG. 3 according to a thirteenth embodiment.

Next, the thirteenth embodiment will be described with reference to FIG. 18. In the present embodiment, a labyrinth projection 31x is further added to the structure of the third embodiment.

The labyrinth projection 31x is a collar member that projects from a plate surface of a base portion 31a on a surrounding portion 10b side and surrounds a rotating shaft 13 in an annular shape. The labyrinth projection 31x may surround the entire circumference of the rotating shaft 13, or may surround approximately the entire circumference.

The labyrinth projection 31x is fixed to the base portion 31a and rotates integrally with the base portion 31a. The labyrinth projection 31x may be formed integrally with the base portion 31a, or may be formed separately from the base portion 31a and then attached to the base portion 31a. Further, a portion of a housing 10 that faces the labyrinth projection 31x is recessed to receive the labyrinth projection 31x.

In such manner, a labyrinth structure is formed by the labyrinth projection 31x and a portion of the housing 10 that faces the labyrinth projection 31x. Thus, a path entering from a surrounding portion 10b to lead to a space between a target 31b and a sensor element 32b that separates the target 31b and the sensor element 32b bends three or more times (specifically, four times) in order to pass through the labyrinth structure. Such configuration reduces the possibility of foreign matter originating from a reaction force generating mechanism 15 entering the space between the target 31*b* and the sensor element 32*b* that separates the target 31*b* and the sensor element 32*b*.

The other configurations are the same as those of the first embodiment. The labyrinth structure constituted by the labyrinth projections 31*x* and the corresponding recesses of the housing 10 may be formed on a surface of a target 21 facing a surrounding portion 10*a*. Further, the same effects can be obtained from the same configuration in the present embodiment and the third embodiment.

Fourteenth Embodiment

Figure 19:
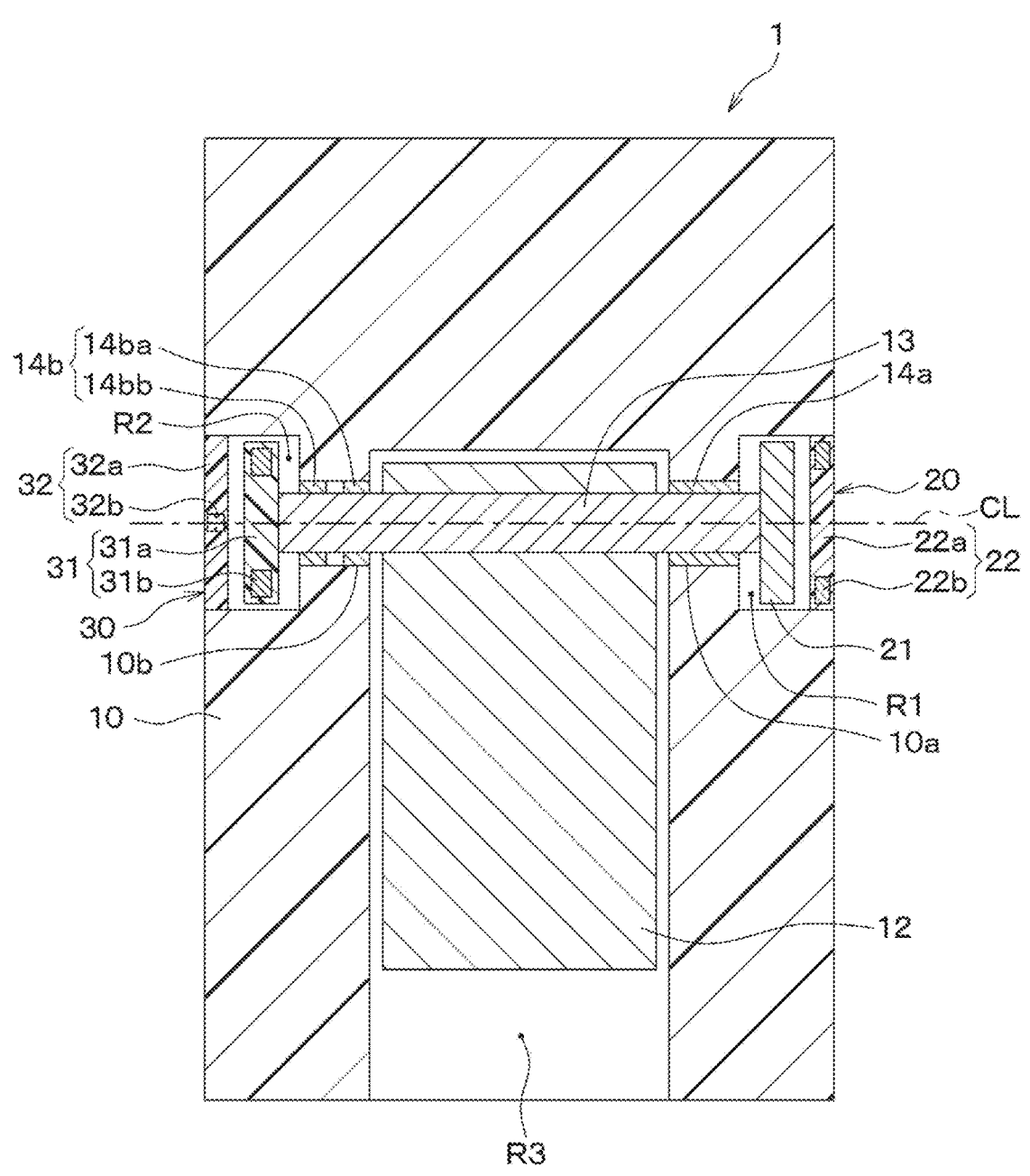
FIG. 19 is a cross-sectional view taken along the same line as FIG. 3 according to a fourteenth embodiment.

Next, the fourteenth embodiment will be described with reference to FIG. 19. The present embodiment is different from the fifth embodiment in the structure of the collar 14*b*. Specifically, the collar 14*b* includes a collar 14*ba* and a collar 14*bb*.

The collars 14*ba*, 14*bb* are each a cylindrical member and are housed within a surrounding portion 10*b* of a housing 10. The collars 14*ba*, 14*bb* are fixed to the surrounding portion 10*b* by adhesion, press fitting, or the like. The collars 14*ba*, 14*bb* may be made of resin or metal. A rotating shaft 13 passes through a through hole formed by inner circumferential surfaces of the collars 14*ba*, 14*bb*. In such manner, the collars 14*ba*, 14*bb* annularly surround the periphery (for example, the entire circumference, or approximately the entire circumference) of the rotating shaft 13 and rotatably support the rotating shaft 13. Therefore, in the present embodiment, the collars 14*ba* and 14*bb* also correspond to a bearing portion, respectively.

In such manner, the collars 14*ba*, 14*bb* are interposed at a position between the surrounding portion 10*b* and the rotating shaft 13 to rotatably support the rotating shaft 13. The collar 14*ba* corresponds to a first sub-bearing portion, and the collar 14*bb* corresponds to a second sub-bearing portion.

The collars 14*ba* and 14*bb* are arranged side by side along an axis line CL of the rotating shaft 13 with a space therebetween. That is, a space is formed at a position between the collars 14*ba* and 14*bb*, which is wider than the space between (a) the collars 14*ba* and 14*bb* and (b) the rotating shaft 13. The collar 14*ba* is positioned closer to the mechanism chamber R3 than the collar 14*bb*.

(1) In such manner, a relatively wide space is formed at a position between the collar 14*ba* and the collar 14*bb*, so that foreign matter that has passed through the space between rotating shaft 13 and collar 14*ba* from the mechanism chamber R3 is likely to accumulate in the space between the collar 14*ba* and the collar 14*bb*. Therefore, the possibility that foreign matter will enter the space between the rotating shaft 13 and the collar 14*bb* and then enter the second sensor chamber R2 can be reduced.

It should be noted that the collar 14*a* may also be configured with two separate collars, similar to the collar 14*b*. The other configurations are the same as those of the fifth embodiment. The same effects can be obtained from the same configuration in the present embodiment and the fifth embodiment.

Fifteenth Embodiment

Figure 20:
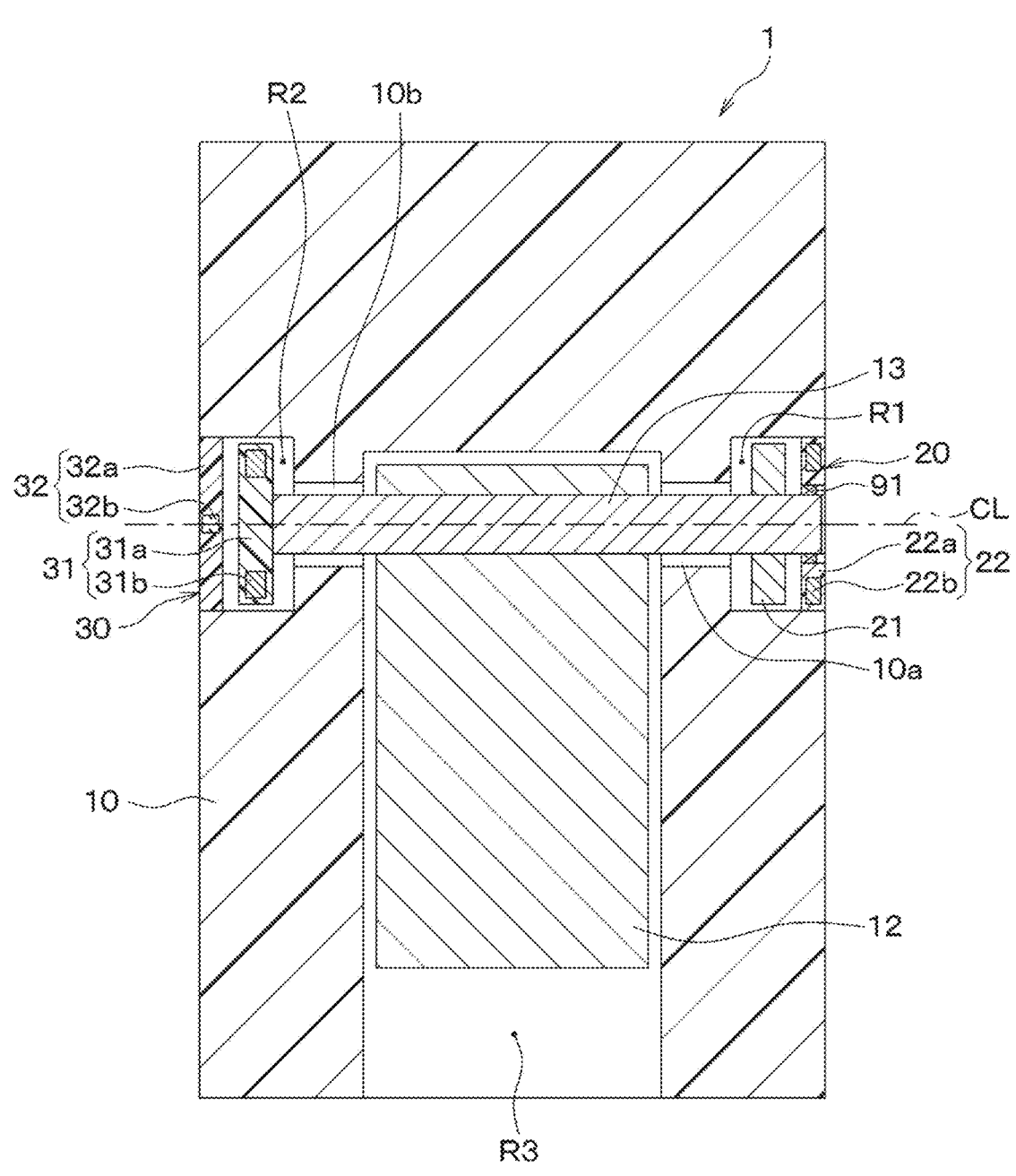
FIG. 20 is a cross-sectional view taken along the same line as FIG. 3 according to a fifteenth embodiment.

Next, the fifteenth embodiment will be described with reference to FIG. 20. In the present embodiment, the shapes of the rotating shaft 13, the target 21, and the base portion 22*a* in the first sensor chamber R1 are changed from those in the first embodiment, and a bearing portion 91 is further added. The other configuration is the same as in the first embodiment.

A target 21 has a through hole formed in the center, and a rotating shaft 13 passes through the through hole. The target 21 and the rotating shaft 13 are fixed to each other via the through hole by, for example, press fitting. In such manner, the target 21 rotates integrally with the rotating shaft 13.

Further, a hole is formed in the center of a base portion 22*a*, and the rotating shaft 13 penetrating the target 21 is inserted into the hole. In the hole, a bearing portion 91 is interposed at a position between the rotating shaft 13 and the base portion 22*a*. The bearing portion 91 is attached to the base portion 22*a* in the above-mentioned hole of the base portion 22*a*, and surrounds and rotatably supports the rotating shaft 13. In the present embodiment, the surrounding portions 10*a*, 10*b* may or may not function as a bearing.

Further, in a housing 10, a space between a surrounding portion 10*a* and the rotating shaft 13 is narrowed relative to a space in a mechanism chamber R3 and a space in a first sensor chamber R1, similar to the first embodiment. Such configuration makes it difficult for foreign matter generated by a reaction force generating mechanism 15 to reach the first sensor chamber R1.

Further, modifications similar to those made to the rotating shaft 13, the target 21, and the base portion 22*a* in the first sensor chamber R1 may be made to the rotating shaft 13, a base portion 31*a*, and a base portion 32*a* in the second sensor chamber R2, respectively. In such case, a bearing similar to the bearing portion 91 is provided at a position between the hole formed in the base portion 32*a* and the rotating shaft 13. Further, the sensor element 32*b* is moved to a position that avoids the hole formed in the base portion 32*a*.

Further, the modification of the first embodiment as shown in the present embodiment can be made to the second to fourteenth embodiments. Further, in the present embodiment, the same effects can be obtained from the same configuration as in the first to fourteenth embodiments.

Sixteenth Embodiment

Figure 21:
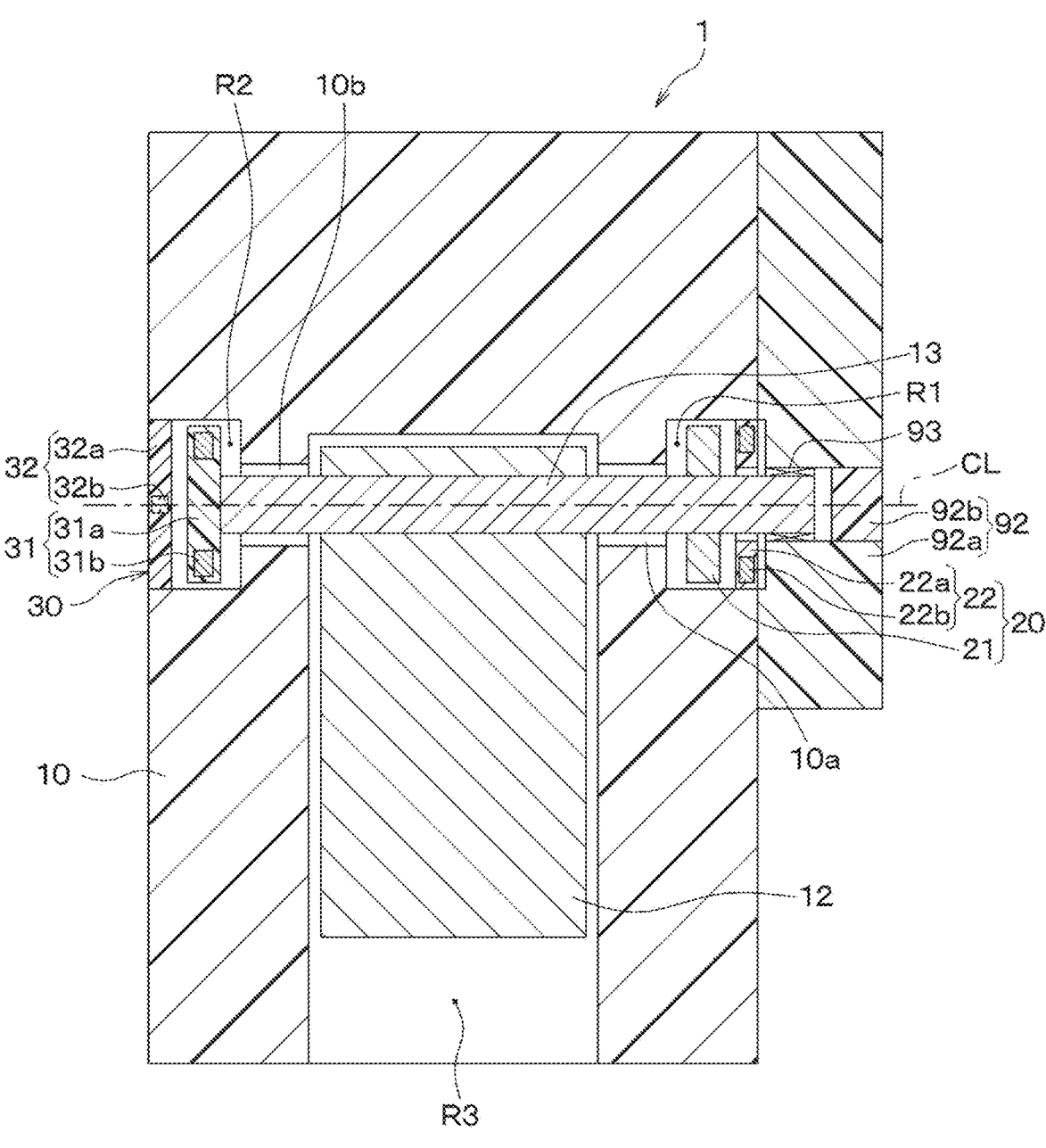
FIG. 21 is a cross-sectional view taken along the same line as FIG. 3 according to a sixteenth embodiment.

Next, the sixteenth embodiment will be described with reference to FIG. 21. In the present embodiment, the shapes of the rotating shaft 13, the target 21, and the base portion 22*a* are changed from those of the first embodiment, and a cover 92 and a bearing portion 93 are further added. The other configurations are the same as those of the first embodiment.

A target 21 has a through hole formed in the center, and a rotating shaft 13 passes through the through hole. The target 21 and the rotating shaft 13 are fixed to each other via the through hole by, for example, press fitting. In such manner, the target 21 rotates integrally with the rotating shaft 13.

Further, a through hole is formed in the center of a base portion 22*a*, and the rotating shaft 13 that penetrates the target 21 passes through the through hole. At the through hole, a space exists between the rotating shaft 13 and the base portion 22*a*. Therefore, the rotating shaft 13 is freely rotatable relative to the base portion 22*a* fixed to a housing 10.

A cover 92 is provided on the opposite side of the target 21 with respect to the base portion 22*a*. The cover 92 has a body portion 92*a* and a lid portion 92*b*. The body portion 92*a* is a plate-shaped member. The body portion 92*a* is fixed to the housing 10 by fastening with bolts, adhesive, or the like so that a plate surface facing the housing 10 is in contact with the housing 10.

A through hole is formed in the body portion 92*a*, and the rotating shaft 13 that passes through the base portion 22*a* is inserted into the through hole. A bearing portion 93 is interposed at a position between the rotating shaft 13 and the body portion 92*a* in the through hole of the body portion 92*a*. The bearing portion 93 is attached to the body portion 92*a* in the through hole of the body portion 92*a*, and surrounds and rotatably supports the rotating shaft 13. In the present embodiment, the surrounding portions 10*a*, 10*b* may or may not function as a bearing.

The through hole of the body portion 92*a* is closed by the lid portion 92*b* at an end of the body portion 92*a* opposite to a first sensor chamber R1. The lid portion 92*b* is inserted into the through hole in the body portion 92*a* and fixed to the body portion 92*a* by press fitting, adhesive, or the like. In such manner, the cover 92 covers the first sensor chamber R1.

Further, in the housing 10, a space between a surrounding portion 10*a* and the rotating shaft 13 is narrowed relative to a space in a mechanism chamber R3 and a space in the first sensor chamber R1, similar to the first embodiment. Such configuration makes it difficult for foreign matter generated by a reaction force generating mechanism 15 to reach the first sensor chamber R1.

Further, modifications similar to those made to the rotating shaft 13, the target 21, and the base portion 22*a* on a first sensor chamber R1 side may be made to the rotating shaft 13, the base portion 31*a*, and the base portion 32*a* on a second sensor chamber R2 side, respectively. In such case, a member having a configuration similar to that of the body portion 92*a* and the lid portion 92*b* is disposed to cover the second sensor chamber R2. Further, a bearing portion similar to the bearing portion 93 is provided at a position between the rotating shaft 13 and a through hole formed in a member having a similar configuration to the body portion 92*a*. Further, a sensor element 32*b* is moved to a position that avoids the hole formed in the base portion 32*a*.

The modifications to the first embodiment as shown in the present embodiment can be made to the second to fourteenth embodiments. Further, in the present embodiment, the same effects can be obtained from the same configuration as in the first to fourteenth embodiments. In the present embodiment, the lid portion 92*b* may be formed integrally with the body portion 92*a*. That is, the cover 92 may be a single piece of component.

Seventeenth Embodiment

Figure 22:
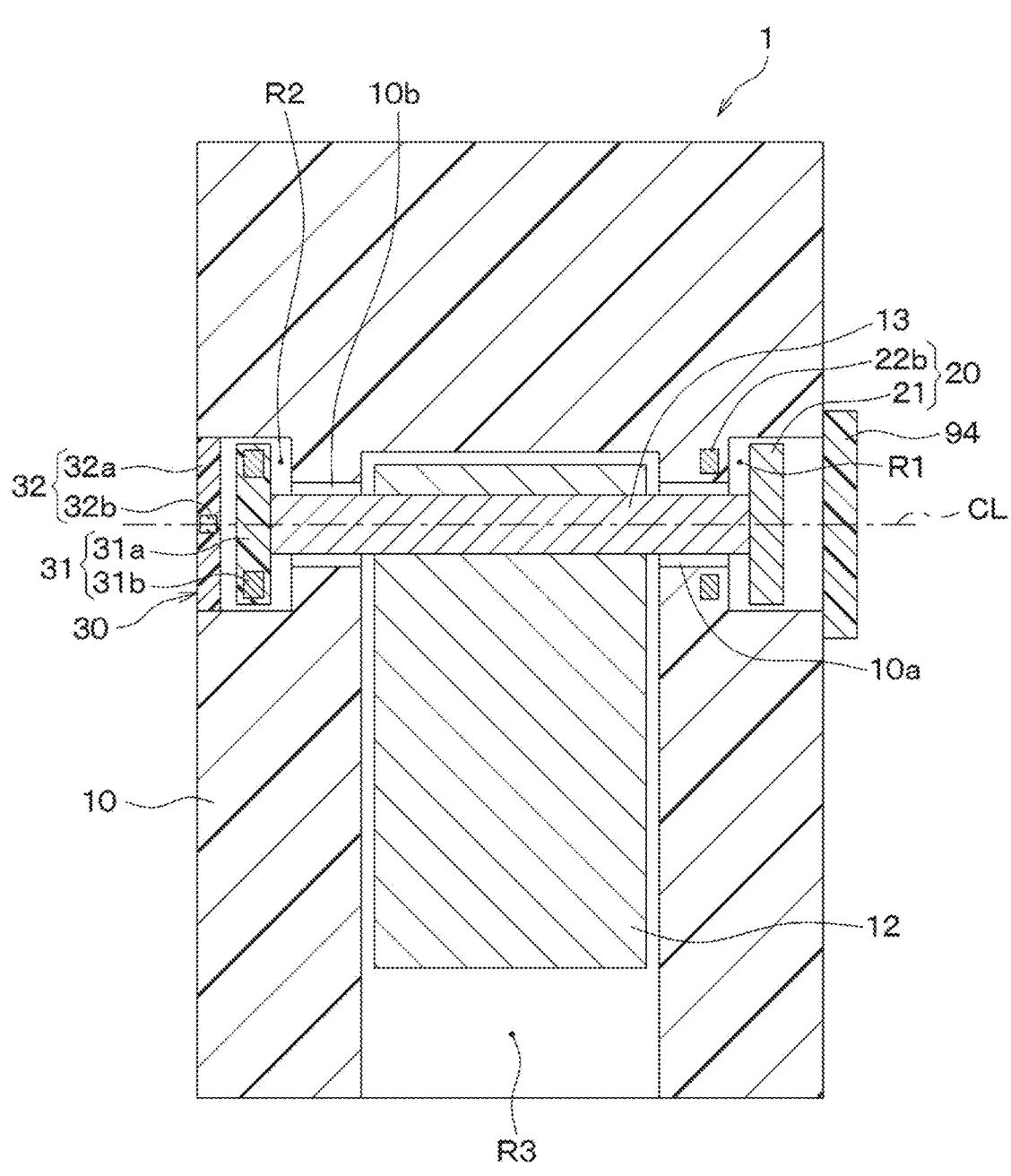
FIG. 22 is a cross-sectional view taken along the same line as FIG. 3 according to a seventeenth embodiment.

Next, the seventeenth embodiment will be described with reference to FIG. 22. In the present embodiment, compared to the first embodiment, the base portion 22*a* of the fixed member 22 of the first sensing unit 20 is eliminated, the arrangement of the sensor element 22*b* is different, and a cover 94 is further provided. The other configurations are the same as those of the first embodiment.

In the present embodiment, a sensor element 22*b* is embedded inside a housing 10. Embedding may be accomplished by a variety of methods, such as insert molding. More specifically, the sensor element 22*b* is disposed to face a target 21 at positions surrounding the surrounding portion 10*a* in a circumferential direction centered on an axis line CL. Even in such manner, the sensor element 22*b* can detect the rotation of the target 21. Further, in place of the base portion 22*a* which served as a lid for the first sensor chamber R1, a plate-shaped cover 94 is fixed to the housing 10 to cover a first sensor chamber R1.

In such case, only the target 21 among the target 21 and the sensor element 22*b* is disposed in the first sensor chamber R1. However, a space separating the target 21 and the sensor element 22*b* is reserved inside the first sensor chamber R1. Even in such a case, the possibility of erroneous detection by the first sensing unit 20 can be reduced by preventing foreign matter from entering the first sensor chamber R1.

As another example, in a second sensor chamber R2 as well, only a target 31*b* among the target 31*b* and a sensor element 32*b* may be disposed in the first sensor chamber R1, and the sensor element 32*b* may be embedded in the housing 10.

As yet another example, the target 21 and the sensor element 22*b* may be disposed in different chambers within the housing 10. Similarly, the target 31*b* and the sensor element 32*b* may be disposed in different chambers within the housing 10. That is, there may be a chamber in which only the sensor element 22*b* is disposed, or there may be a chamber in which only the sensor element 32*b* is disposed.

The modifications to the first embodiment as shown in the present embodiment can be made to the second to sixteenth embodiments. Further, in the present embodiment, the same effects can be obtained from the same configuration as in the first to sixteenth embodiments.

Eighteenth Embodiment

Figure 23:
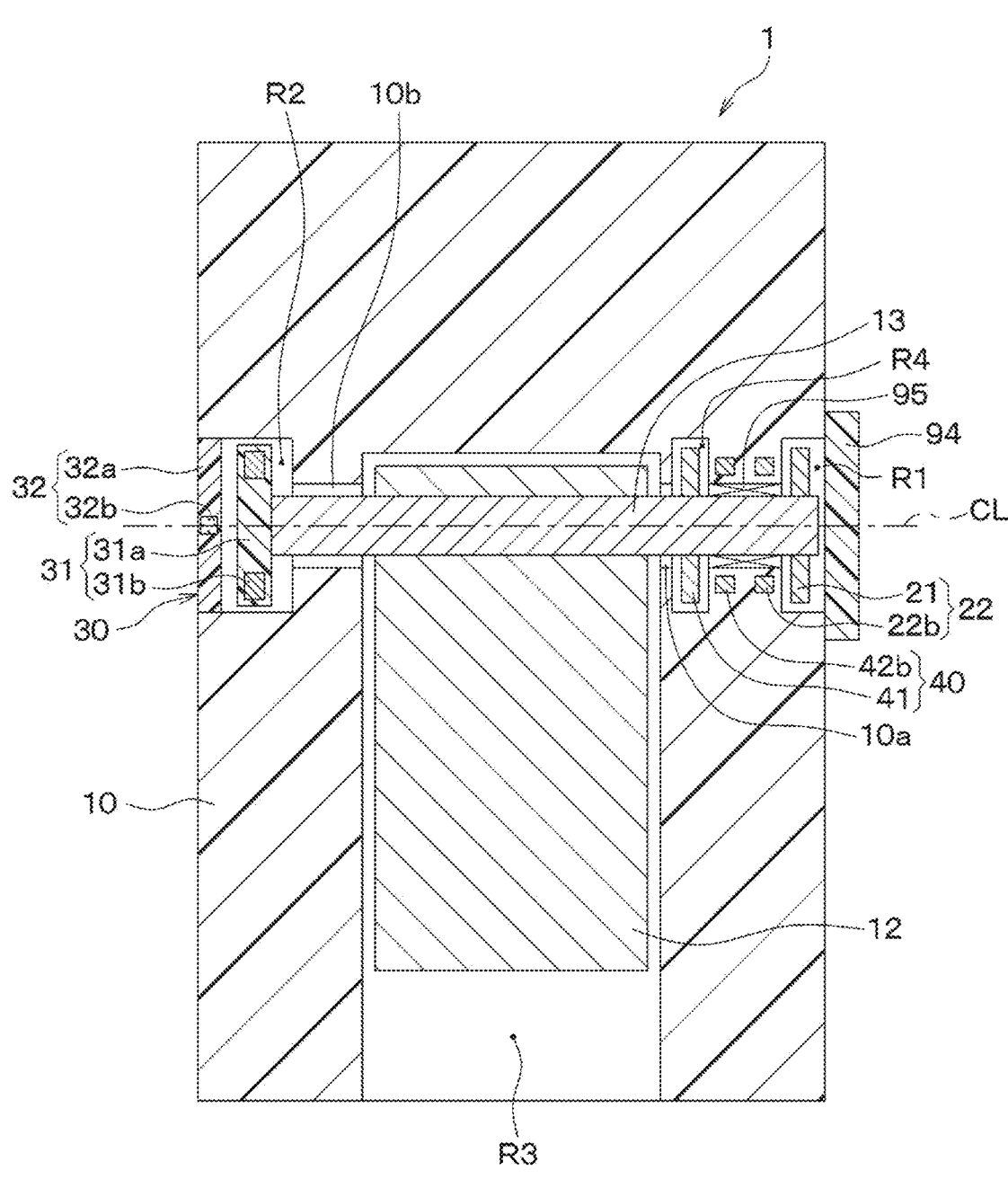
FIG. 23 is a cross-sectional view taken along the same line as FIG. 3 according to an eighteenth embodiment.

Next, the eighteenth embodiment will be described with reference to FIG. 23. In the present embodiment, an additional sensing unit 40 and a bearing portion 95 are provided in comparison with the seventeenth embodiment, and an additional sensor chamber R4 is formed in the housing 10. The other configurations are the same as those of the first embodiment.

Similar to the first sensing unit 20, the additional sensing unit 40 is a unit that constitutes an inductive sensor, and has a target 41 that rotates relative to a housing 10 and a sensor element 42*b* that is fixed to the housing 10.

The target 41 is disposed in the additional sensor chamber R4, and is fixed to a rotating shaft 13. The additional sensor chamber R4 is a chamber through which the rotating shaft 13 passes, and is disposed at a position between a mechanism chamber R3 and a first sensor chamber R1 in a direction along an axis line CL. The mechanism chamber R3 and the additional sensor chamber R4 are in communication with each other via a space between a surrounding portion 10*a* and the rotating shaft 13.

The bearing portion 95 is interposed at a position between the surrounding portion 10*a* and the rotating shaft 13, which is provided at a position between the additional sensor chamber R4 and the first sensor chamber R1. The bearing portion 95 is attached to the surrounding portion 10*a*, and surrounds and rotatably supports the rotating shaft 13. In the present embodiment, the surrounding portions 10*a*, 10*b* may or may not function as a bearing. The additional sensor chamber R4 and the first sensor chamber R1 are in communication with each other via a space between the bearing portion 95 and the rotating shaft 13.

The sensor element 42*b* is disposed at a position between the target 41 and a sensor element 22*b* and is embedded in the housing 10 in the same manner as the sensor element 22*b*. The sensor elements 22*b* and 42*b* surround the bearing portion 95 in the circumferential direction centered on the axis line CL.

Figure 24:
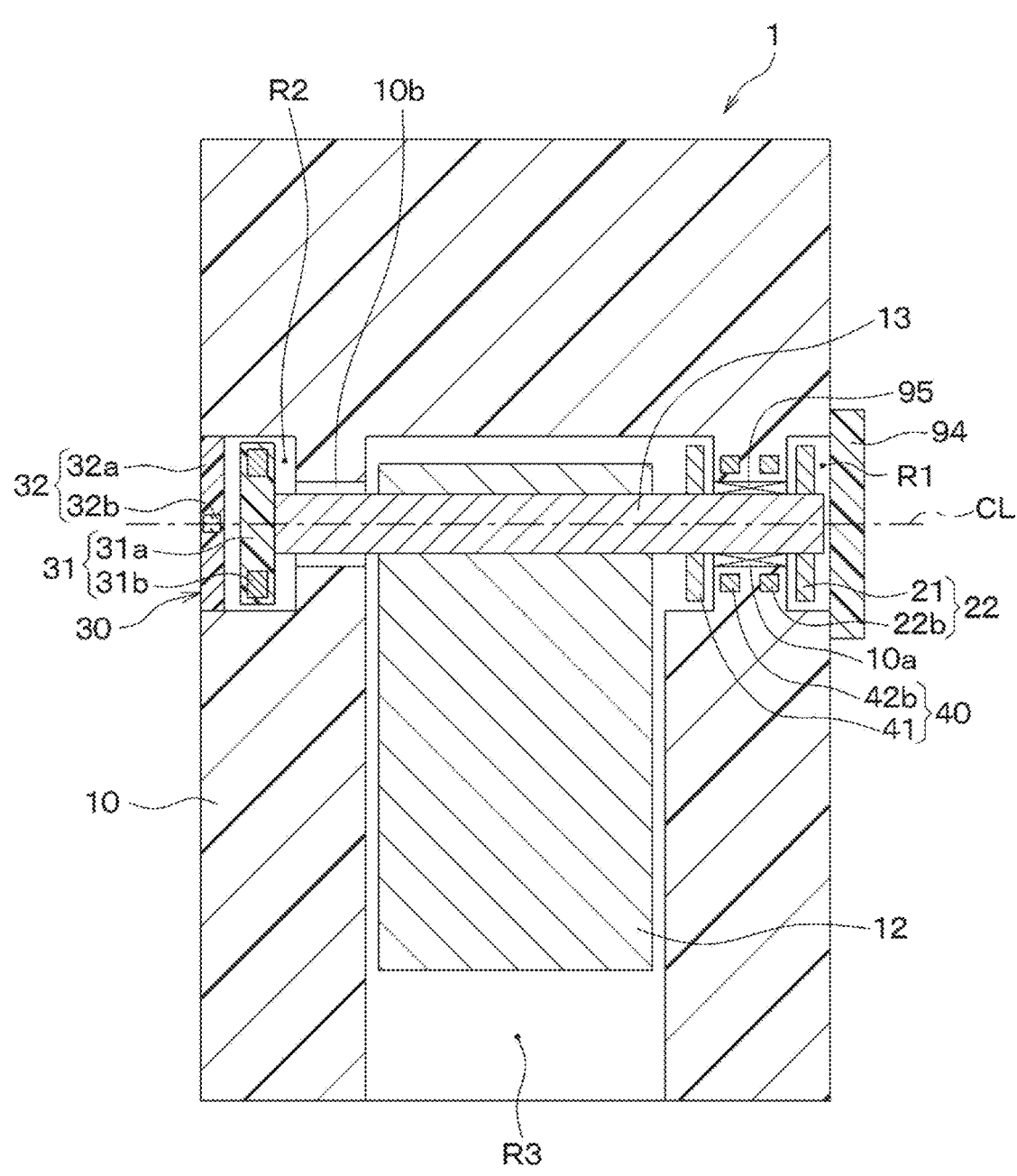
FIG. 24 is a cross-sectional view taken along the same line as in FIG. 3 according to a modification of the eighteenth embodiment.

Further, at a position between the mechanism chamber R3 and the additional sensor chamber R4, a space between the surrounding portion 10a and the rotating shaft 13 is narrowed relative to the space in the mechanism chamber R3 and the space in the additional sensor chamber R4. Such configuration makes it difficult for foreign matter generated by a reaction force generating mechanism 15 to reach the additional sensor chamber R4. Further, the bearing portion 95 formed at a position between the additional sensor chamber R4 and the first sensor chamber R1 makes it difficult for foreign matter generated in the reaction force generating mechanism 15 to reach the first sensor chamber R1. Further, as a modification, as shown in FIG. 24, by eliminating a part of the surrounding portion 10a between the mechanism chamber R3 and the additional sensor chamber R4 in FIG. 23, the additional sensor chamber R4 may be integrated into the mechanism chamber R3. In such case, the target 41 is disposed in a state of being positioned inside the mechanism chamber R3. Even in such case, at a position between the mechanism chamber R3 and the first sensor chamber R1, a space between the surrounding portion 10a and the rotating shaft 13 is narrowed relative to a space in the mechanism chamber R3 and than a space in the first sensor chamber R1. Further, the bearing portion 95 formed at a position between the mechanism chamber R3 and the first sensor chamber R1 makes it difficult for foreign matter generated in the reaction force generating mechanism 15 to reach the first sensor chamber R1. In the present embodiment, the same effects as those in the seventeenth embodiment can be obtained from the same configuration as the seventeenth embodiment.

Nineteenth Embodiment

Next, the nineteenth embodiment will be described with reference to FIGS. 25 and 26. The present embodiment differs from the first embodiment in the structures of the first sensing unit 20 and the second sensing unit 30, and in the structures of the housing 10 and the rotating shaft 13 to which the first sensing unit 20 and the second sensing unit 30 are attachable. The other configuration is the same as that of the first embodiment.

A first sensing unit 20 is composed of one sub-unit. Specifically, the first sensing unit 20 includes a target 21, a fixed member 22, and a mounting shaft 25. Further, the fixed member 22 includes a base portion 22a and a sensor element 22b.

The base portion 22a is made of a material such as resin, and is a casing that serves as an outer shell of the sub-unit. The base portion 22a is fixed to the housing 10. The target 21 and the mounting shaft 25 are housed in an internal space surrounded by the base portion 22a. The internal space is a first sensor chamber R1. A through hole that opens to the rotating shaft 13 is formed in a wall of the base portion 22a on a rotating shaft 13 side.

The shape, material, and function of the sensor element 22b are the same as those in the first embodiment. The sensor element 22b faces the target 21 and is attached inside the base portion 22a or on a surface of the base portion 22a facing the target 21.

The shape, material, and function of the target 21 are the same as those in the first embodiment. The target 21 is disposed in the internal space of the base portion 22a to intersect (for example, perpendicularly) with an axis line CL, and is disposed to be rotatable with respect to the base portion 22a about the axis line CL. For example, the target 21 may be rotatably supported by a bearing portion (e.g., a thrust bearing or a radial bearing) (not shown) attached to an inner surface of the base portion 22a.

The mounting shaft 25 is a rod-shaped member extending along the axis line CL, one end of which is fixed to the target 21, passes through the above-mentioned through hole formed in the base portion 22a, and the other end of which is attached to an end of the rotating shaft 13 on a first sensing unit 20 side. In such manner, the mounting shaft 25 and the target 21 are rotatable together with the rotating shaft 13.

The second sensing unit 30 is composed of one sub-unit. Specifically, the second sensing unit 30 includes a rotating member 31, a fixed member 32, and a mounting shaft 35. The rotating member 31 includes a base portion 31a and a target 31b. The fixed member 32 includes a base portion 32a and a sensor element 32b.

The base portion 32a is made of a material such as resin, and is a casing that serves as an outer shell of the sub-unit. The base portion 32a is fixed to the housing 10. The rotating member 31 and the mounting shaft 35 are housed in an internal space surrounded by the base portion 32a. The internal space is a second sensor chamber R2. A through hole that opens to the rotating shaft 13 is formed in a wall of the base portion 32a on a rotating shaft 13 side.

The shape, material, and function of the sensor element 32b are the same as those in the first embodiment. The sensor element 32b is attached inside the base portion 32a or on a surface of the base portion 32a facing the rotating member 31 so that a magnetic sensing surface faces the rotating member 31.

The shapes, materials, functions, and relative positions of the base portion 31a and the target 31b are the same as those in the first embodiment. The base portion 31a is disposed in an internal space of the base portion 32a to intersect (for example, perpendicularly) with the axis line CL, and is disposed to be rotatable with respect to the base portion 32a about the axis line CL. For example, the base portion 31a may be rotatably supported by a bearing portion (e.g., a thrust bearing or a radial bearing) (not shown) attached to an inner surface of the base portion 32a.

The mounting shaft 35 is a rod-shaped member extending along the axis line CL, one end of which is fixed to the base portion 31a, passes through the above-mentioned through hole formed in the base portion 32a, and the other end of which is attached to an end of the rotating shaft 13 on a second sensing unit 30 side. In such manner, the mounting shaft 35 and the rotating member 31 are rotatable together with the rotating shaft 13.

The rotating shaft 13 differs from the first embodiment only in a structure of portions where it is connected to the first sensing unit 20 and to the second sensing unit 30 at both ends, and the rest of the structure is the same as that of the first embodiment. The end of the rotating shaft 13 on a first sensing unit 20 side is formed with a structure to which the mounting shaft 25 is attachable. For example, as shown in FIG. 26, a receiving hole 13a into which the mounting shaft 25 can be press-fitted may be formed at the end of the rotating shaft 13, or various other structures into which the mounting shaft 25 is attachable may be formed.

The end of the rotating shaft 13 on the second sensing unit 30 side is formed with a structure to which the mounting shaft 35 is attachable. For example, as shown in FIG. 26, a receiving hole 13b into which the mounting shaft 35 can be press-fitted may be formed at the end of the rotating shaft 13, or various other structures into which the mounting shaft 35 is attachable may be formed.

Figure 26:
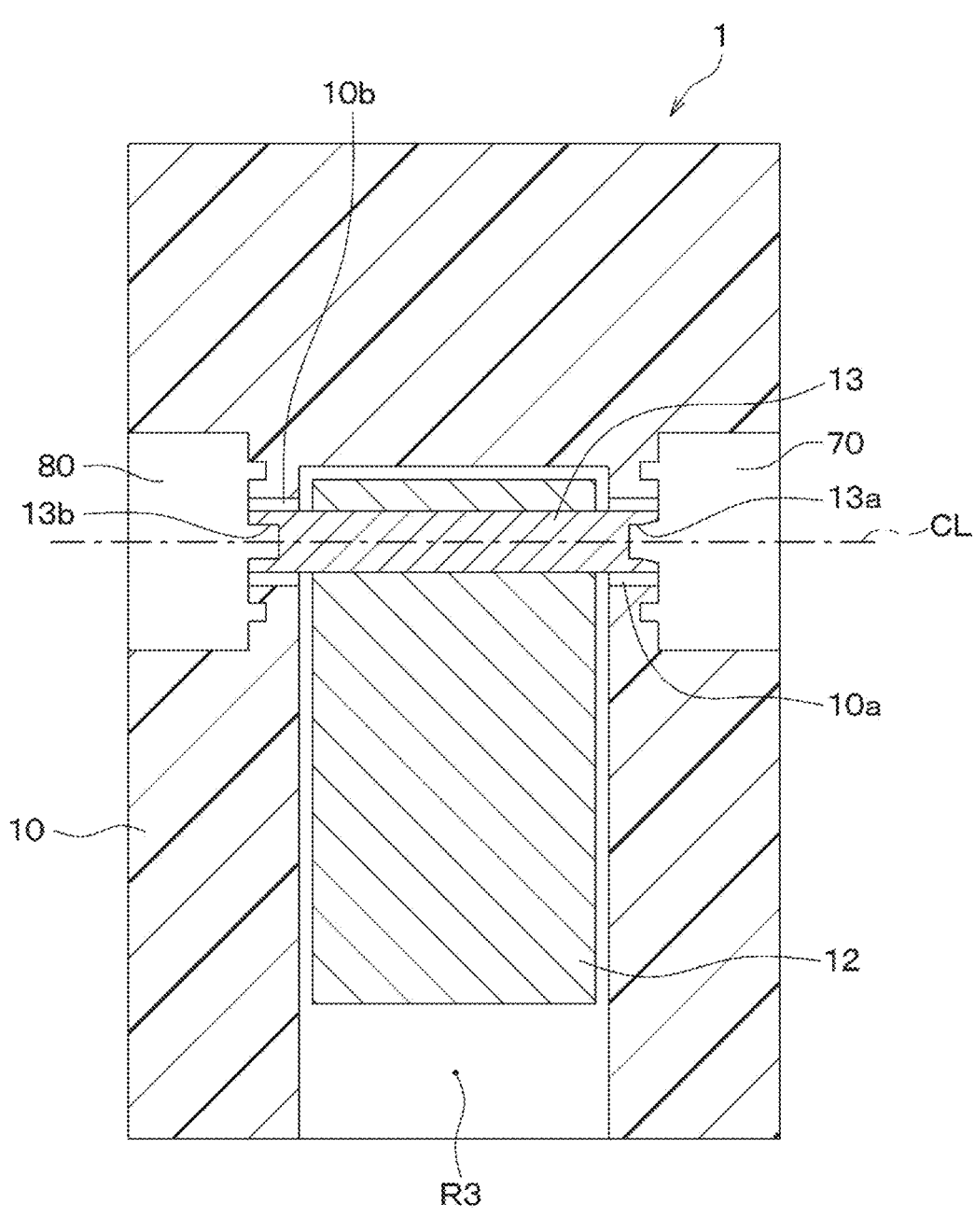
FIG. 26 is a cross-sectional view taken along the same line as in FIG. 3, in a state where the first sensing unit and the second sensing unit are not attached.

In a brake pedal device 1 of the present embodiment, first, the members other than the first sensing unit 20 and the second sensing unit 30 are assembled to form the brake pedal device 1 as shown in FIG. 26. In such state, the housing 10 is formed with a recess 70 shaped to receive the first sensing unit 20 and a recess 80 shaped to receive the second sensing unit 30.

The recess 70 has a structure to which the first sensing unit 20 is attachable. For example, the recess 70 may be sized so that the base portion 22a of the first sensing unit 20 can be press-fitted therein, or a bolt hole may be formed so that the base portion 22a can be fastened with a bolt.

The recess 80 has a structure to which the second sensing unit 30 is attachable. For example, the recess 80 may be sized so that the base portion 32a of the second sensing unit 30 can be press-fitted therein, or a bolt hole may be formed so that the base portion 32a can be fastened with a bolt.

The first sensing unit 20 is attached to the recess 70, and the second sensing unit 30 is attached to the recess 80, thereby forming the brake pedal device 1 as shown in FIG. 24. In such manner, the brake pedal device 1 is formed with the recesses 70, 80, receiving holes 13a, 13b, etc., as a structure to which the first sensing unit 20 and the second sensing unit 30 are attachable as sub-units.

Figure 25:
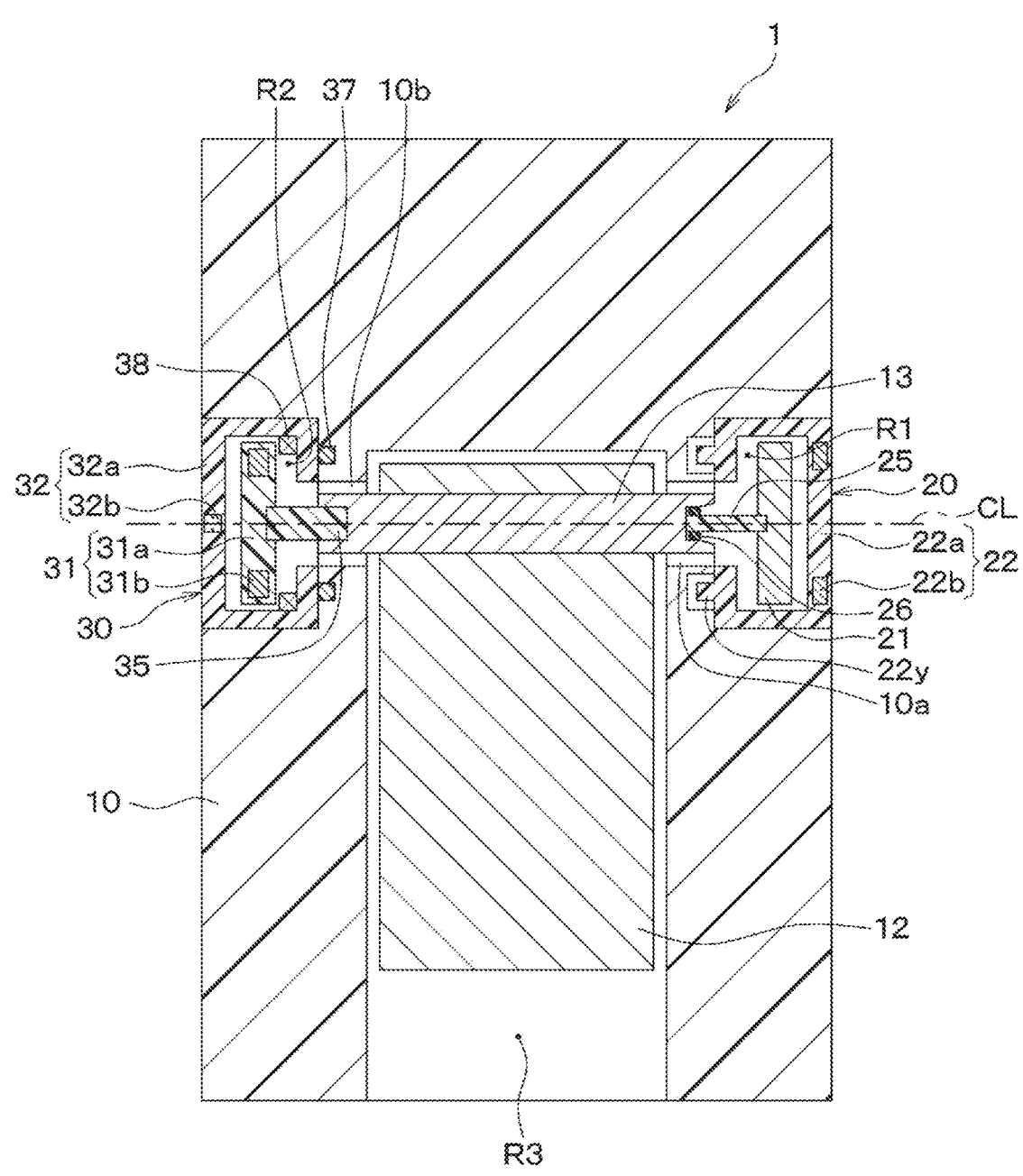
FIG. 25 is a cross-sectional view taken along the same line as FIG. 3 according to a nineteenth embodiment.

Further, as shown in FIG. 25, the first sensing unit 20 may have an O-ring 26 as a member for reducing rattling between the mounting shaft 25 and the rotating shaft 13. The O-ring 26 is attached to an end of the mounting shaft 25 on a rotating shaft 13 side, and surrounds the mounting shaft 25 in the circumferential direction centered on the axis line CL. The mounting shaft 25 and the O-ring 26 are inserted into the receiving hole 13a of the rotating shaft 13, so that the O-ring 26 is interposed at a position between the mounting shaft 25 and the rotating shaft 13. In such manner, rattling between the mounting shaft 25 and the rotating shaft 13 can be reduced. Further, an axial misalignment between the rotating shaft 13 and the mounting shaft 25 can be reduced, and the two are kept substantially coaxial. Further, the receiving hole 13a may have a tapered shape that widens as it approaches the target 21 so that the O-ring 26 can be easily received therein. Further, an end of the receiving hole 13a on a target 21 side may be rounded. As another example, such an O-ring may be attached to a second sensing unit 30 side. Further, the reduction of rattling between the mounting shaft 25 and the rotating shaft 13 is also achievable, for example, by press-fitting the mounting shaft 25 into the receiving hole 13a of the rotating shaft 13. Further, the reduction of rattling between the mounting shaft 25 and the rotating shaft 13 may also be achievable, for example, by making a cross-sectional shape of the mounting shaft 25 and the receiving hole 13a perpendicular to the axis line CL non-circular (for example, polygonal).

The second sensing unit 30 may also have a coil spring 38 as a member for reducing rattling between the base portion 32a and the base portion 31a. The coil spring 38 is disposed at a position between the base portion 32a and the base portion 31a in the sensor chamber R2 to be wound about the axis line CL. One end of the coil spring 38 is engaged with the base portion 32a, and the other end is engaged with the base portion 31a. In such manner, the elastic force of the coil spring 38 in a torsion direction (i.e., the circumferential direction about the axis line CL) suppresses rattling between the base portion 32a and the base portion 31a, and the base portion 31a is positioned relative to the base portion 32a. In such manner, the axial misalignment between the rotating shaft 13 and the mounting shaft 35 can be reduced, and the two are kept substantially coaxial. As another example, such a coil spring may be attached to a first sensing unit 20 side.

Further, the base portion 22a of the first sensing unit 20 may be formed with a labyrinth projection 22y. The labyrinth projection 22y projects from a surface of the housing 10 facing the mechanism chamber R3. The surface intersects (e.g., is perpendicular to) with the axis line CL of the base portion 22a. The labyrinth projection 22y has a collar shape that annularly surrounds the first sensor chamber R1. Further, a portion of the housing 10 that faces the labyrinth projection 22y is recessed to receive the labyrinth projection 22y.

In such manner, a labyrinth structure is formed by the labyrinth projection 22y and a portion of the housing 10 that faces the labyrinth projection 22y. The path from the outside of the housing 10 to the first sensor chamber R1 through the space between the base portion 22a and the housing 10 bends three or more times (specifically, four times) in order to pass through the labyrinth structure. Such configuration reduces the possibility of foreign matter entering the first sensor chamber R1 from the outside of the housing 10. As another example, such a labyrinth structure may be attached to a second sensing unit 30 side.

Further, an O-ring 37 may be sandwiched between the housing 10 and a surface of the base portion 32a of the second sensing unit 30 that faces the mechanism chamber R3. The O-ring 37 is an annular sealing member that air-tightly seals a space between the base portion 32a and the housing 10. In such manner, the possibility of foreign matter entering the second sensor chamber R2 from the outside of the housing 10 can be reduced. As another example, such an O-ring may be attached to a first sensing unit 20 side.

As described above, the mounting shaft 25 and the mounting shaft 35 may be components that constitute the first sensing unit 20 and the second sensing unit 30, respectively. Alternatively, as another example, the mounting shaft 25 and the mounting shaft 35 may be components that constitute the brake pedal device 1 before the first sensing unit 20 and the second sensing unit 30 are attached, respectively. For example, the mounting shaft 25 and the mounting shaft 35 may be formed integrally with the rotating shaft 13, and then fixed by press-fitting or the like into holes formed in the target 21 and the base portion 31a, respectively.

As described above, the brake pedal device 1 is formed with a structure capable of mounting (a) the targets 21, 31b that are attached to the rotating shaft 13 and rotate together with the rotating shaft 13, and (b) multiple sensor elements 22b, 32b that detect their rotation. Therefore, after these components are attached to the brake pedal device 1, the possibility that factors such as dimensional variations and assembly variations of the multiple components will interfere with the detection process of the rotation of the rotating shaft 13 can be reduced. Therefore, the possibility that the detection accuracy of the displacement of the pedal 11 will lower can be reduced.

The modifications of the first embodiment as shown in the present embodiment are also applicable to the second to eighteenth embodiments. Further, in the present embodiment, the same effects can be obtained from the same configuration as in the first to eighteenth embodiments. Of course, the brake pedal device 1 of the first to eighteenth embodiments is provided with the first sensing unit 20 and the second sensing unit 30. Therefore, the brake pedal devices 1 of the first to eighteenth embodiments also naturally have a structure to which the first sensing unit 20 and the second sensing unit 30 are attachable.

Twentieth Embodiment

Next, the twentieth embodiment will be described with reference to FIGS. 27 to 31. In the present embodiment, the configuration of the first sensing unit 20 that constitutes the inductive sensor in the first embodiment is changed. A brake pedal device p2 of the present embodiment includes a housing p6, a rotating shaft p7, a brake pedal p8, a reaction force generating mechanism p9, an inductive sensor p1, and the like. The housing p6 is directly fixed to the vehicle body by bolts (not shown) or indirectly fixed to the vehicle body via a base member (not shown). Specifically, the housing p6 is fixed to a dash panel or a floor inside the vehicle compartment. The housing p6 corresponds to an example of a fixed body. A bearing p61 for rotatably supporting the rotating shaft p7 is provided inside the housing p6.

The brake pedal device p2, the housing p6, the rotating shaft p7, the reaction force generating mechanism p9, and the bearing p61 are the same components as the brake pedal device 1, the housing 10, the rotating shaft 13, the reaction force generating mechanism 15, and the surrounding portion 10b of the first embodiment, respectively. Further, the brake pedal p8 is the same component as the one composed of the pedal 11 and the pedal arm 12 of the first embodiment. That is, a pedal pad p82 and a pedal arm p81 are the same components as the pedal 11 and the pedal arm 12 of the first embodiment, respectively.

The other configurations of the present embodiment are the same as those of the first embodiment. However, in the present embodiment, the first sensing unit 20 of the first embodiment is constituted by the inductive sensor p1, and the position of the inductive sensor p1 constituting the first sensing unit 20 and the position of the second sensing unit 30 are swapped.

Next, the inductive sensor p1 will be described. The inductive sensor p1 is a sensor that utilizes the principle of mutual induction. In detail, when a target having a conductor approaches a transmitting coil, a magnetic field of the transmitting coil is canceled and an amount of magnetic flux penetrating a receiving coil changes, and the inductive sensor p1 reads such change as an output (i.e., a detection value corresponding to an angular position of a detection object about an axis line CL). The transmitting coil is also called an excitation coil.

Figure 27:
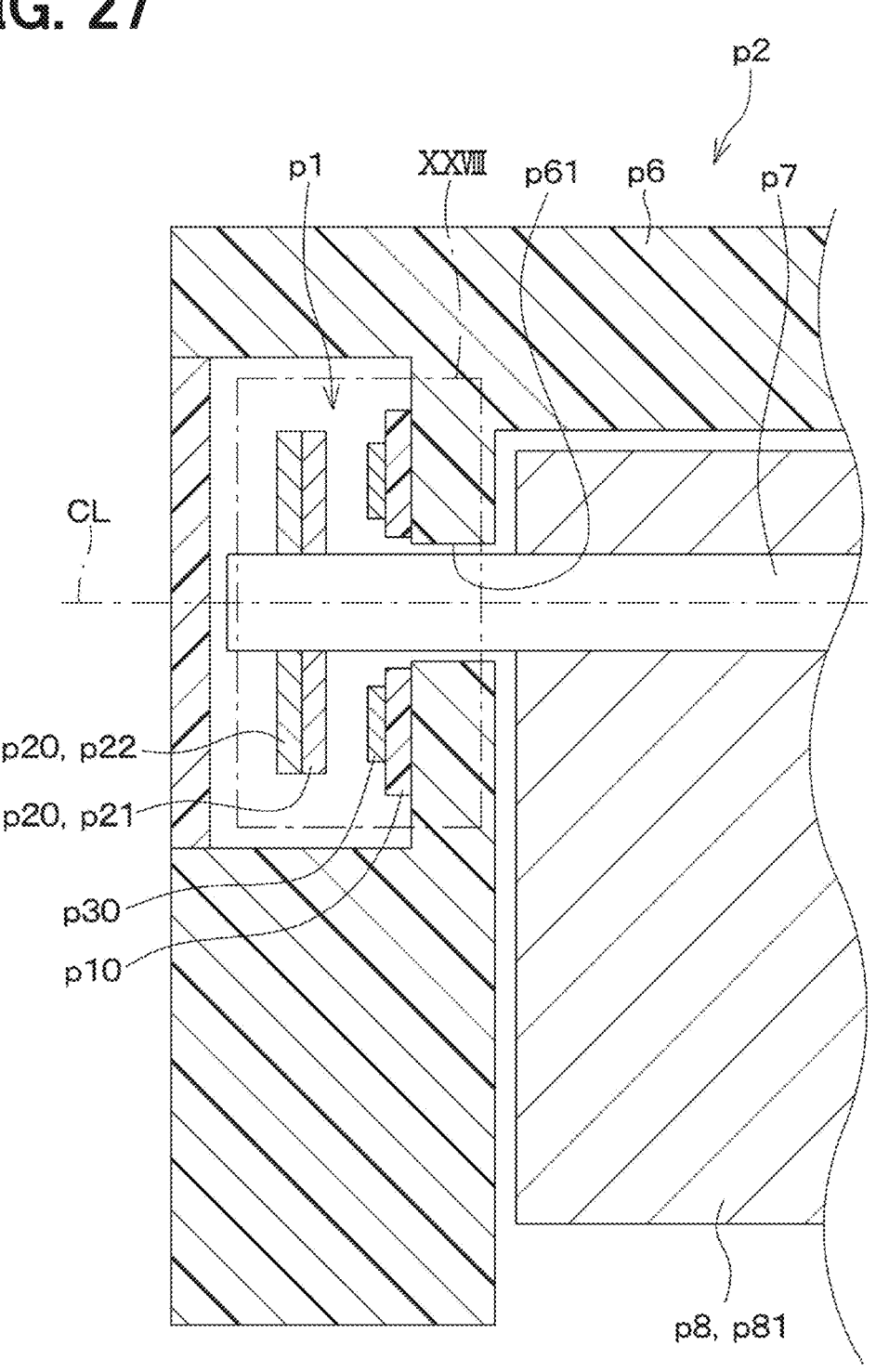
FIG. 27 is a partial cross-sectional view in a section similar to that of FIG. 3 according to a twentieth embodiment.
Figure 28:
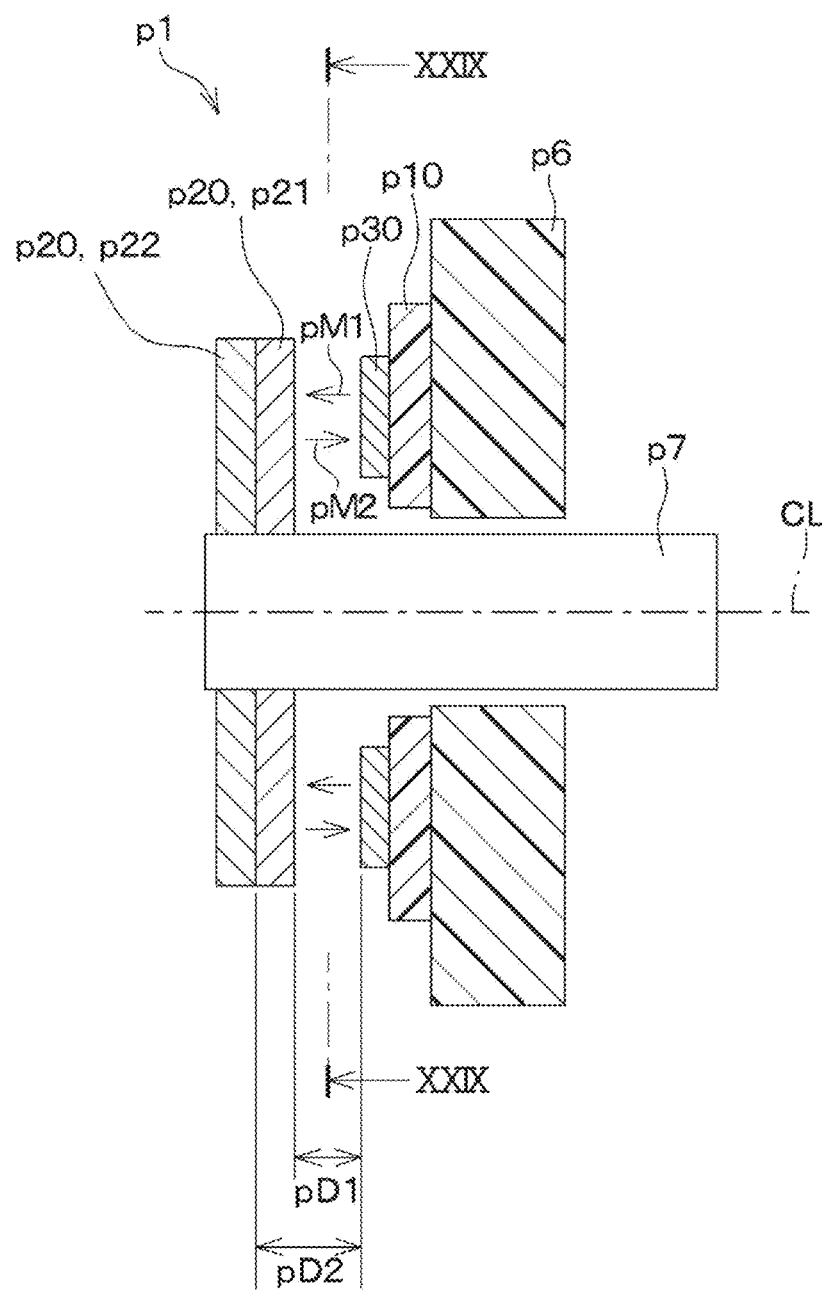
FIG. 28 is an enlarged view of a portion XXVIII of FIG. 27, and is a cross-sectional view parallel to the axis of the rotating shaft in the inductive sensor.
Figure 29:
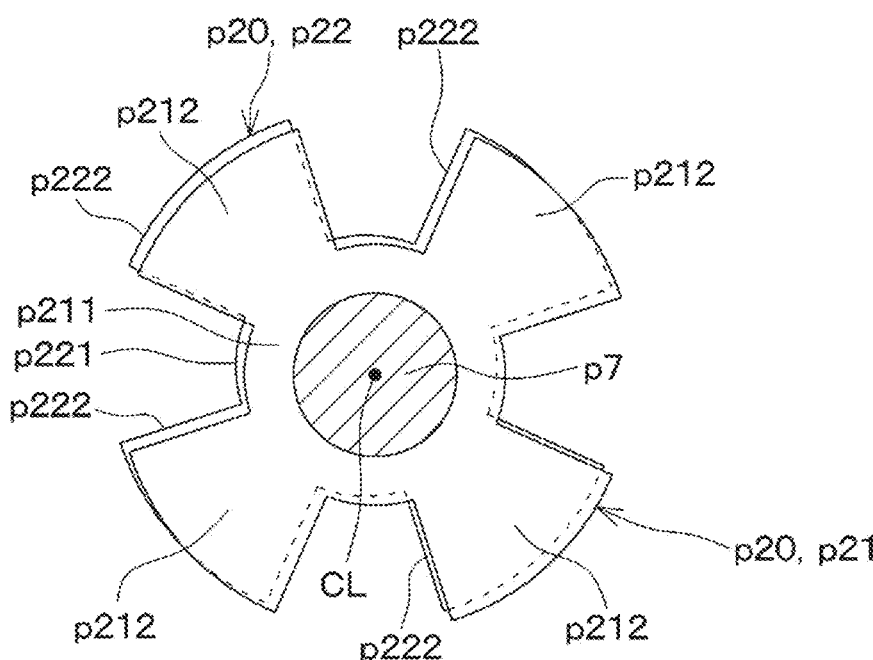
FIG. 29 is a cross-sectional view taken along a XXIX-XXIX line in FIG. 28.

As shown in FIGS. 27 to 29, the inductive sensor p1 of the present embodiment includes a circuit board p10 and multiple targets p20.

The circuit board p10 is fixed to the housing p6 serving as a fixed body. A transmitting coil (not shown), a receiving coil (not shown), and a transceiver circuit (not shown) are implemented on the circuit board p10. In the following description, the transmitting coil and receiving coil are collectively referred to as a "transceiver coil p30." FIG. 27 shows an area on the circuit board p10 where the transceiver coil p30 is implemented. The transceiver circuit is formed of an integrated circuit such as an ASIC. The transceiver circuit supplies a high frequency wave to the transmitting coil and outputs a signal according to the change in inductance of the receiving coil.

The multiple targets p20 include a first target p21 and a second target p22. Further, from the twentieth embodiment onwards, from among the multiple targets p20, the one arranged on a circuit board p10 side will be called as the first target p21, and the one arranged on the opposite side of the first target p21 from the circuit board p10 will be called as the second target p22. It should be noted that the inductive sensor p1 is not limited to the one having two targets p20 (i.e., the first target p21 and the second target p22), and may have three or more targets p20. This also applies to each embodiment described later.

Each of the multiple targets p20 includes a conductor. The target p20 may be entirely made of a conductor, or may include a conductor in part. The multiple targets p20 are each independently fixed to the rotating shaft p7 as a detection object. Therefore, the multiple targets p20 move in synchronization with the rotating shaft p7. The method of fixing the target p20 and the rotating shaft p7 can be, for example, one or more of press fitting, snap fitting, caulking, and welding.

As shown in FIG. 29, the first target p21 has a cylindrical portion p211 that surrounds an outer wall on a radial outside of the rotating shaft p7, and multiple blade portions p212 that extend radially outward from the cylindrical portion p211. In the present embodiment, the first target p21 has four blade portions p212. The second target p22 also has a cylindrical portion p221 that surrounds the outer wall on the radial outside of the rotating shaft p7, and multiple blade portions p222 that extend radially outward from the cylindrical portion p221. The second target p22 also has four blade portions p222. The four blade portions p212, p222 of the first target p21 and the second target p22, respectively, are provided at predetermined intervals in the circumferential direction of the cylindrical portions p211, p221 in an area all around the circumference. By providing the four blade portions p212, p222 in an area all around the circumference of the cylindrical portions p211, p221, it is possible to increase the output of the inductive sensor p1.

As shown in FIG. 28, the first target p21 and the second target p22 are arranged to overlap in a plate thickness direction. A distance (i.e., detection gap) pD1 between the first target p21 and the transceiver coil p30 is set to a distance at which mutual induction occurs. Further, a distance (i.e., detection gap) pD2 between the second target p22 and the transceiver coil p30 is also set to a distance at which mutual induction occurs. In FIG. 28, the occurrence of mutual induction in the detection gap between the target p20 and the transceiver coil p30 is shown diagrammatically by arrows pM1 and pM2.

When viewed from a direction in which the axis line CL of the rotating shaft p7 extends (hereinafter referred to as an "axial direction"), the shape of the first target p21 and the shape of the second target p22 may or may not overlap. FIG. 29 shows a state in which the shape of the first target p21 and the shape of the second target p22 are arranged slightly offset about the axis when viewed from the axial direction (i.e., they do not overlap partially).

Incidentally, the brake pedal device p2 mounted on the vehicle may be subjected to vibrations from the vehicle while the vehicle is traveling. Further, the brake pedal device p2 may be used in high or low temperature and high humidity environments. Therefore, there is a risk that the target p20 attached to the brake pedal device p2 may fall off for some reason (for example, vehicle vibration, loss of fixing force due to rust, etc.).

Figure 30:
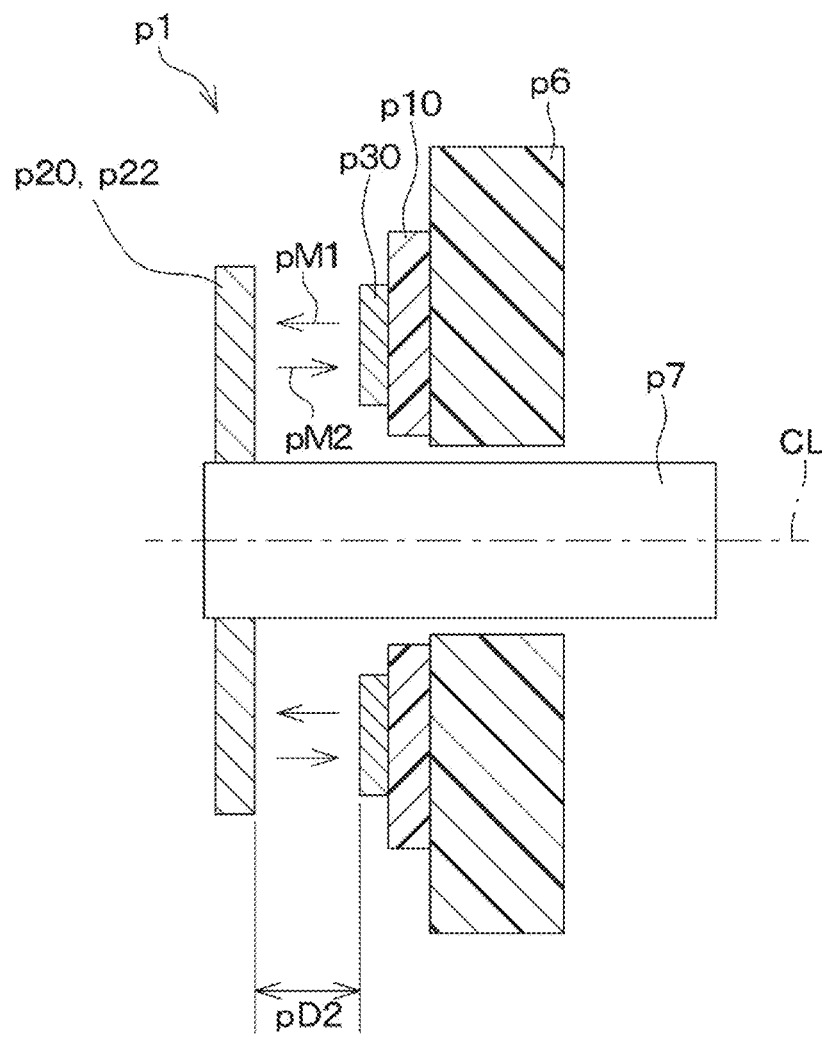
FIG. 30 is a diagram showing a state in which the first target has fallen off in the inductive sensor according to the twentieth embodiment.

FIG. 30 shows a state in which the first target p21 has fallen off the rotating shaft p7 for some reason in the inductive sensor p1 of the twentieth embodiment. As shown in FIG. 30, the inductive sensor p1 of the twentieth embodiment is capable of detecting the positions of the rotating shaft p7 and the brake pedal p8 using the second target p22 even if the first target p21 falls off.

Figure 31:
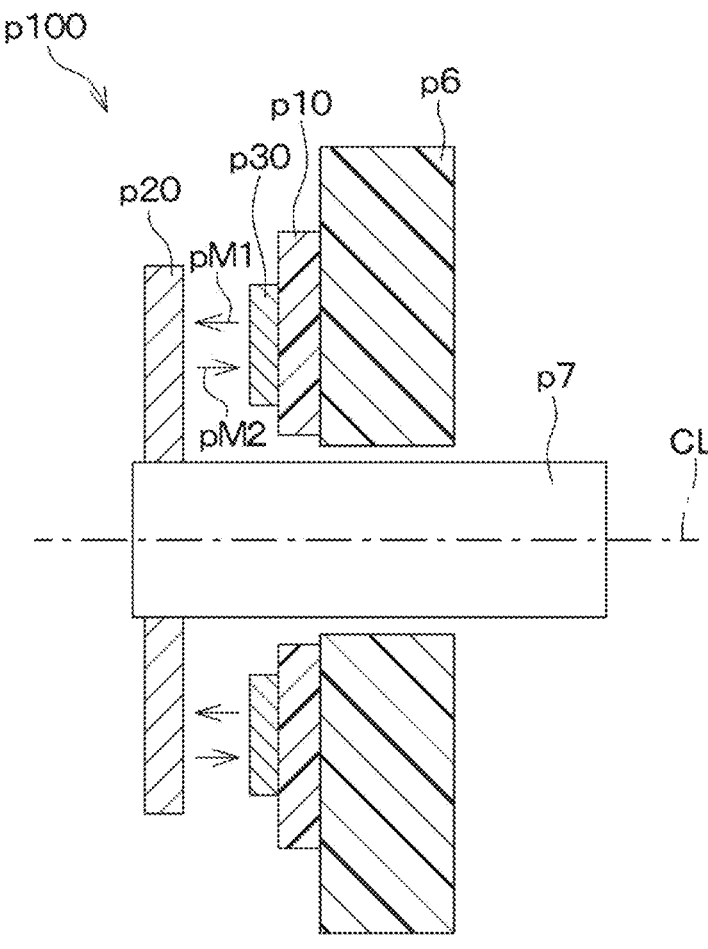
FIG. 31 is a cross-sectional view parallel to the axis of a rotating shaft in an inductive sensor of a comparative example.

Here, for comparison with the inductive sensor p1 of the present embodiment, an inductive sensor p100 of a comparative example will be described. As shown in FIG. 31, the inductive sensor p100 of the comparative example includes a single target p20 and a circuit board p10 on which a transceiver coil p30 and the like are implemented.

In the inductive sensor p100 of this comparative example, if the target p20 falls off the rotating shaft p7 for some reason, an output abnormality occurs. Further, even if the inductive sensor p100 of the comparative example is configured to be capable of outputting multiple detection values from the circuit board p10, if the target p20 falls off, all of the detection values will produce abnormal outputs.

In contrast to such a comparative example, the inductive sensor p1 and the brake pedal device p2 of the present embodiment have the following configuration and provide the following advantageous effects.

(1) The inductive sensor p1 has multiple targets p20 that are each fixed independently to a detection object (e.g., the rotating shaft p7 or the brake pedal p8) to move in synchronization with the movement of the detection object.

According to the above, even if one of the multiple targets p20 falls off or becomes deformed, the position of the detection object can be correctly detected by another target p20 and the transceiver coil p30. Therefore, the inductive sensor p1 can ensure redundancy in detecting the position of the detection object even if the target 20 falls off or is deformed.

(2) The brake pedal device p2 detects the position (specifically, the rotation angle) of the rotating shaft p7 and the brake pedal p8 as detection objects using the inductive sensor p1 having multiple targets p20. According to the above, in the brake-by-wire system, if the inductive sensor p1 that detects the position of the rotating shaft p7 of the brake pedal device p2 and the brake pedal p8 malfunctions, there is a risk that braking of the vehicle will be hindered. In contrast, the brake pedal device p2 of the present embodiment has the inductive sensor p1 having multiple targets p20, so that it is possible to ensure redundancy in detecting the position of the rotating shaft p7 and the brake pedal p8 even if the target p20 falls off or is deformed. Therefore, the brake pedal device p2 can improve the safety of vehicle braking by the brake-by-wire system.

In the present embodiment, the transceiver coil p30 corresponds to the sensor element 22b, and the multiple targets p20 correspond to the targets 31. Further, the modifications to the first embodiment as shown in the present embodiment are similarly applicable to the inductive sensors of the second to nineteenth embodiments.

Twenty-First Embodiment

The twenty-first embodiment will now be described. The twenty-first embodiment is different from the twentieth embodiment in the configuration of the inductive sensor p1, but is otherwise similar to the twentieth embodiment, so only the parts that differ from the twentieth embodiment will be described.

Figure 32:
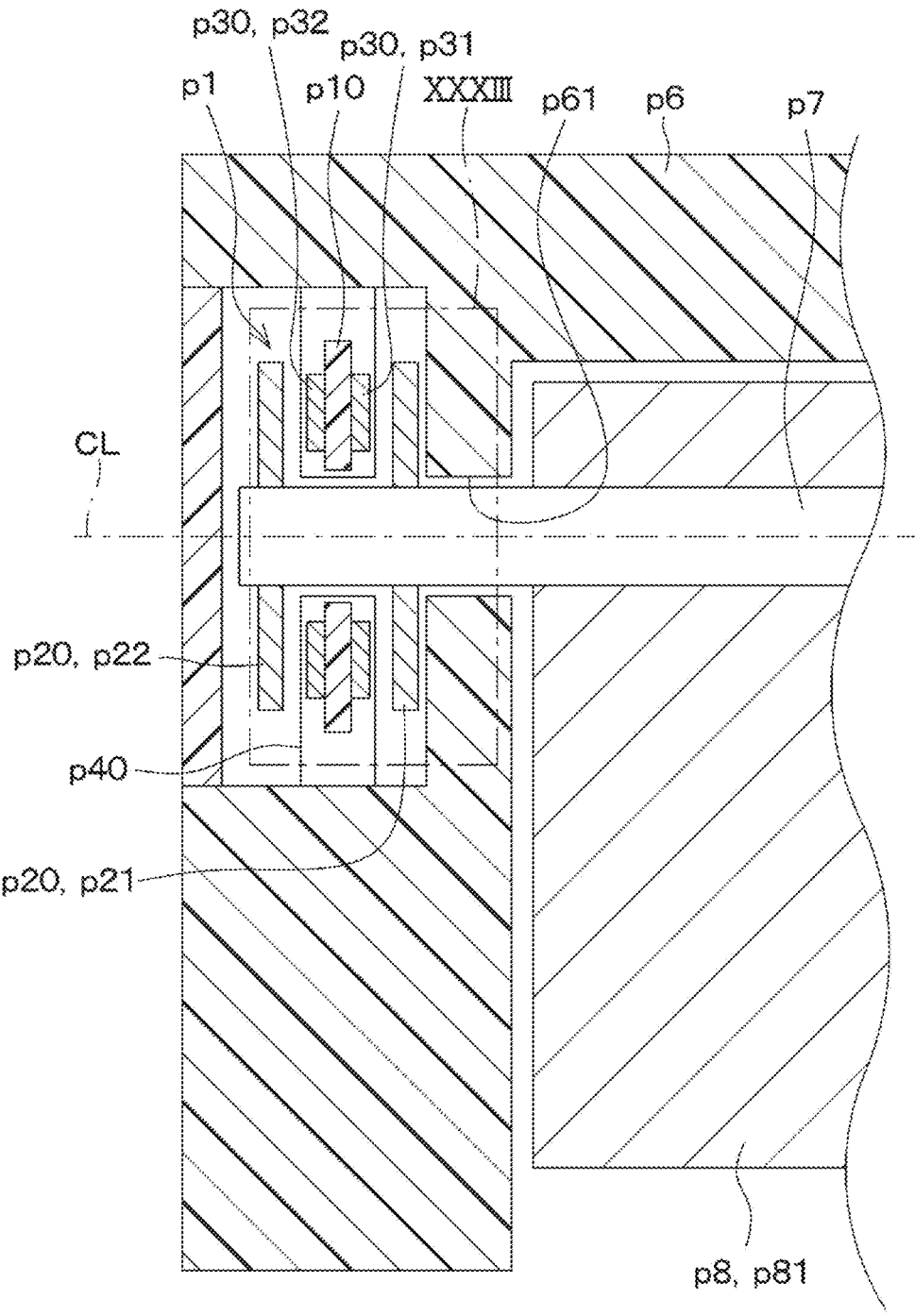
FIG. 32 is a cross-sectional view showing a portion corresponding to FIG. 27 in a brake pedal device provided with an inductive sensor according to a twenty-first embodiment.
Figure 33:
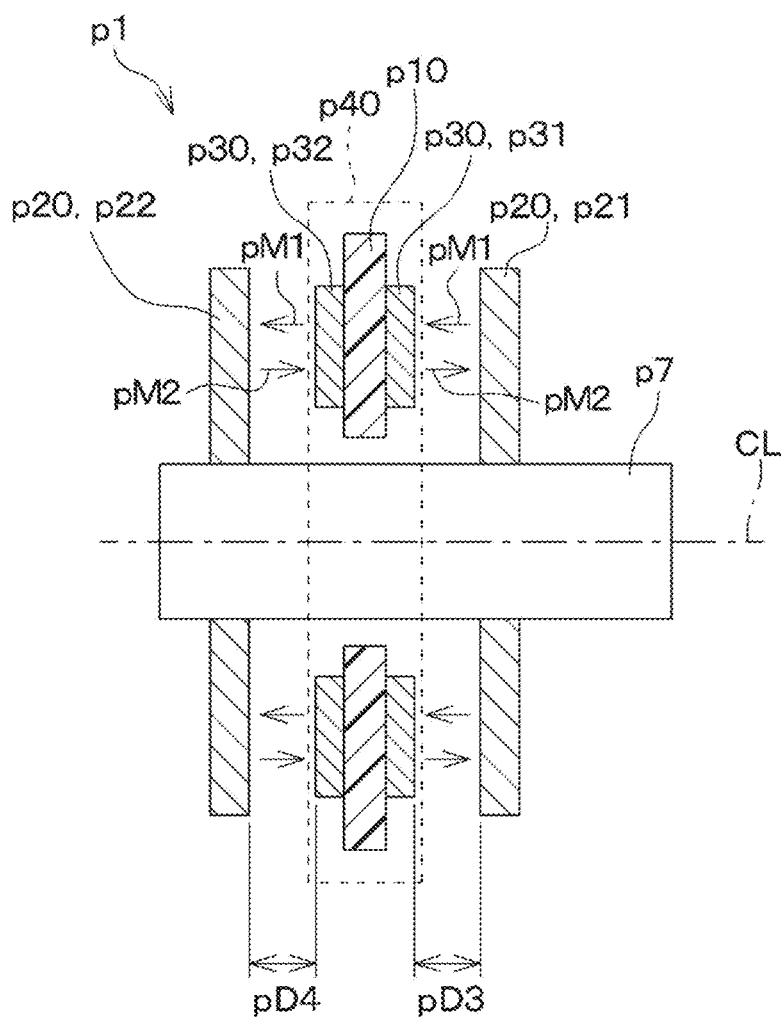
FIG. 33 is an enlarged view of a portion XXXIII of FIG. 32, and is a cross-sectional view parallel to the axis of the rotating shaft in the inductive sensor according to the twenty-first embodiment.

As shown in FIGS. 32 and 33, in the twenty-first embodiment, an inductive sensor p1 has multiple transceiver coils p30 implemented on a single circuit board p10, and is configured to be capable of outputting multiple detection values. Among the multiple transceiver coils p30, a first transceiver coil p31 is implemented on one surface of the circuit board p10. Among the multiple transceiver coils p30, a second transceiver coil p32 is implemented on the other surface of the circuit board p10. The single circuit board p10 and the multiple transceiver coils p30 implemented thereon are stored in a sensor casing p40, which is fixed to a housing p6 serving as a fixed body. Specifically, the multiple transceiver coils p30 are the first transceiver coil p31 and the second transceiver coil p32.

The multiple targets p20 include a first target p21 and a second target p22. The first target p21 is disposed on one side of the circuit board p10 in a plate thickness direction, and the second target p22 is disposed on the other side of the circuit board p10 in the plate thickness direction. The first target p21 and the second target p22 are each fixed independently with respect to a rotating shaft p7 as a detection object. Therefore, the first target p21 and the second target p22 move in synchronization with the rotating shaft p7.

Although not shown in the figure, the first target p21 and the second target p22, similar to what is shown in FIG. 29 in the twentieth embodiment, have cylindrical portions p211, p221 that surround the radially-outward outer wall of the rotating shaft 7, and multiple blade portions p212, p222 that extend radially outward from the cylindrical portions p211, p221. The multiple blade portions p212, p222 of the first target p21 and the second target p22, respectively, are provided at predetermined intervals in the circumferential direction on an entire circumference of the cylindrical portions p211, p221. By providing multiple blade portions p212, p222 on the entire circumference of the cylindrical portions p211, p221, it is possible to increase the output of the inductive sensor p1.

As shown in FIG. 33, a distance pD3 between the first target p21 and the first transceiver coil p31 is set to a distance at which mutual induction occurs. Therefore, the first transceiver coil p31 is capable of outputting a signal corresponding to the position of the first target p21. Further, a distance pD4 between the second target p22 and the second transceiver coil p32 is also set to a distance at which mutual induction occurs. Therefore, the second transceiver coil p32 is capable of outputting a signal corresponding to the position of the second target p22.

In the twenty-first embodiment, the distance pD3 between the first target p21 and the first transceiver coil p31 and the distance pD4 between the second target p22 and the second transceiver coil p32 are the same. In the present specification, "the distance pD3 and the distance pD4 are the same" includes a state in which the distances are completely the same, as well as a state in which they are slightly different due to manufacturing tolerances. By making pD3 and pD4 the same, it becomes possible to easily compare the detection value output from the first transceiver coil p31 and the detection value output from the second transceiver coil p32, with no or simple post-processing of the signals in the ECU.

The inductive sensor p1 and a brake pedal device p2 of the twenty-first embodiment described above have the following configuration and the resulting effects further to the effects described in the twentieth embodiment.

(1) The multiple targets p20 include at least the first target p21 and the second target p22. The transceiver coil p30 has at least the first transceiver coil p31 that outputs a detection value corresponding to the position of the first target p21, and the second transceiver coil p32 that outputs a detection value corresponding to the position of the second target p22.

According to the above, the inductive sensor p1 includes a first sub-sensor unit composed of the first target p21 and the first transceiver coil p31, and a second sub-sensor unit composed of the second target p22 and the second transceiver coil p32. Therefore, even if one of the first sub-sensor unit and the second sub-sensor unit malfunctions or falls off, the position of the detection object can still be correctly detected by the other sub-sensor unit. Therefore, the inductive sensor 1 can ensure redundancy in detecting the position of the detection object even if the target p20 falls off or is deformed.

(2) The distance pD3 between the first target p21 and the first transceiver coil p31 is the same as the distance pD4 between the second target p22 and the second transceiver coil p32. In such manner, it is possible to make the detection value of the first sub-sensor section and the detection value of the second sub-sensor section substantially the same with respect to the position detection of the detection object. Therefore, in the ECU to which the detection value of the inductive sensor p1 is transmitted, by either eliminating or simplifying the signal post-processing of (a) the detection value of the first sub-sensor unit and (b) the detection value of the second sub-sensor unit, it becomes possible to easily compare the two detection values.

Further, even if for some reason either the first target p21 or the second target p22 falls off the rotating shaft p7 and the position of the detection object is detected using the other target p20, a signal amplitude of the sensor output does not become small. If the signal amplitude is large, an S/N ratio (i.e., signal-to-noise ratio) becomes large and the effect of noise in transmission becomes small, thereby making it possible to detect the position of the detection object with high accuracy.

(3) The first transceiver coil p31 is implemented on one surface of the single circuit board p10, and the second transceiver coil p32 is implemented on the other surface thereof. Further, the first target p21 is disposed on one side of the circuit board p10 in the plate thickness direction, and the second target p22 is disposed on the other side of the circuit board p10 in the plate thickness direction. With such configuration, it is possible to make the distance pD3 between the first target p21 and the first transceiver coil p31 the same as the distance pD4 between the second target p22 and the second transceiver coil p32.

Twenty-Second Embodiment

The twenty-second embodiment will now be described. The twenty-second embodiment is different from the twentieth embodiment and the like in that the configuration of the inductive sensor p1 is changed, but the rest is similar to the twentieth embodiment and the like, so only the parts that differ from the twentieth embodiment will be described.

Figure 34:
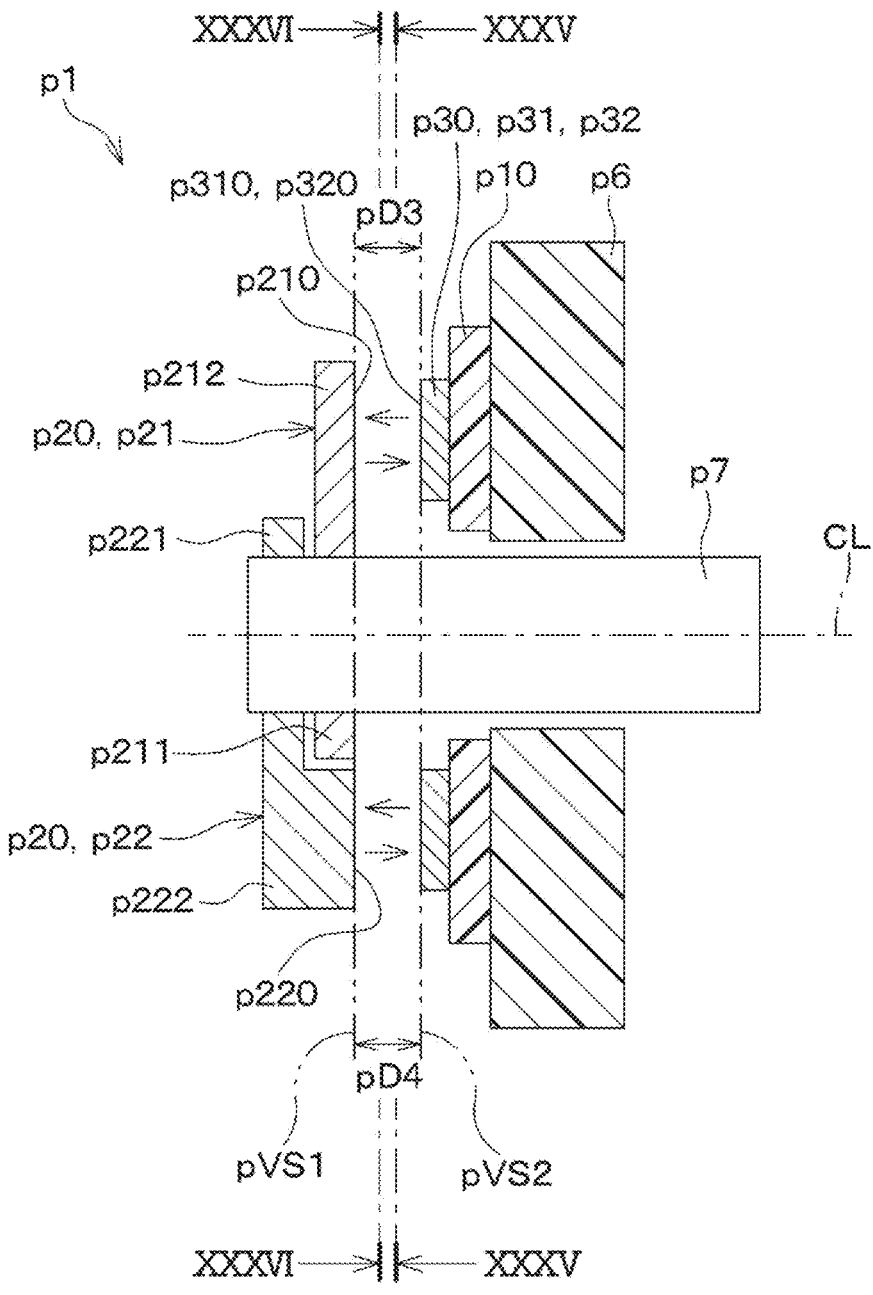
FIG. 34 is a cross-sectional view parallel to the axis of the rotating shaft in an inductive sensor according to a twenty-second embodiment.
Figure 35:
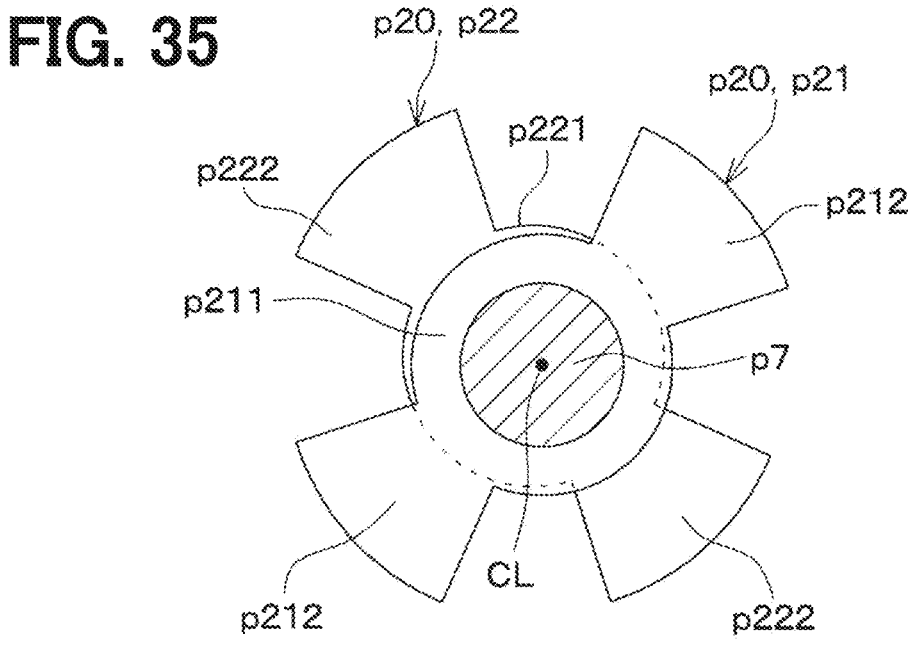
FIG. 35 is a cross-sectional view taken along a XXXV-XXXV line in FIG. 34.
Figure 36:
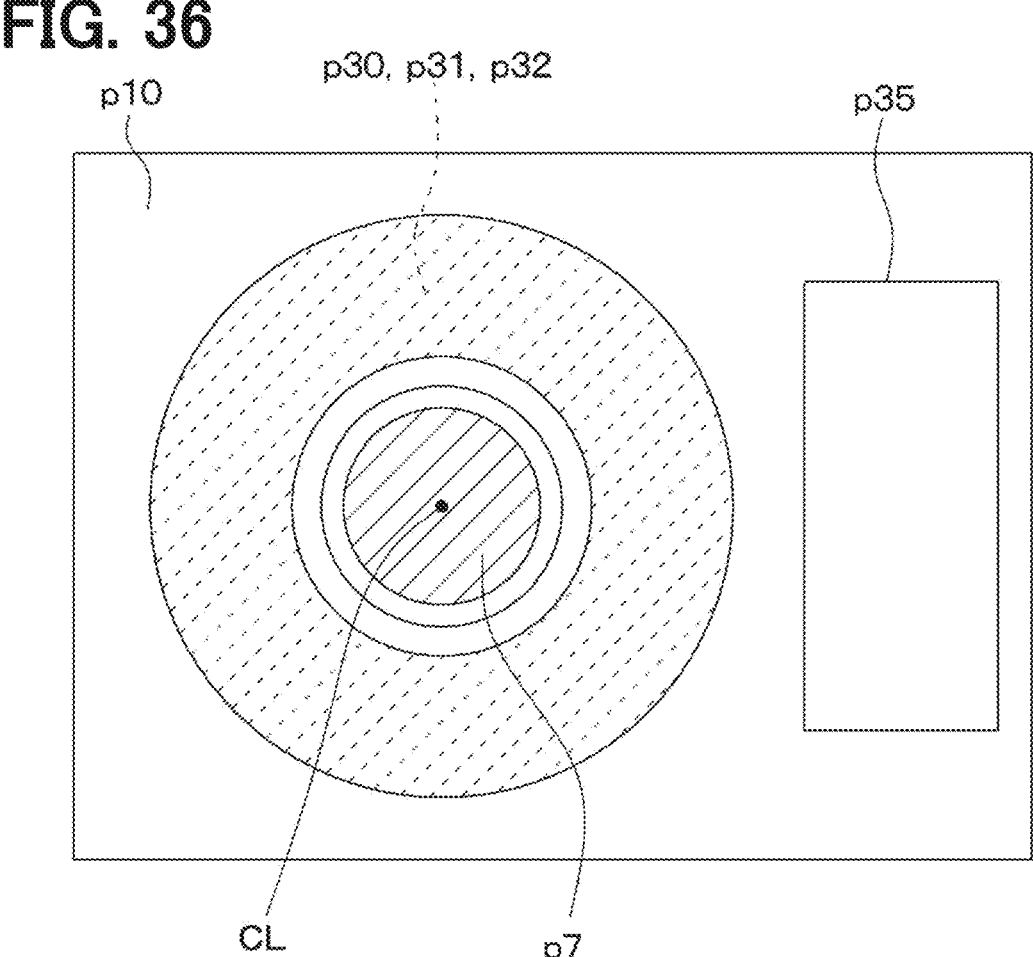
FIG. 36 is a cross-sectional view taken along a XXXVI-XXXVI line in FIG. 34.

As shown in FIGS. 34 to 36, in the twenty-second embodiment, an inductive sensor p1 also includes a circuit board p10 and multiple targets p20.

As shown in FIGS. 34 and 35, the multiple targets p20 include a first target p21 and a second target p22. As shown in FIG. 35, the first target p21 and the second target p22 each have a cylindrical portion p211, p221 that surrounds the radially-outward outer wall of a rotating shaft p7, and multiple blade portions p212, p222 that extend radially outward from the cylindrical portions p211, p221. As shown in FIG. 34, the cylindrical portion p211 of the first target p21 and the cylindrical portion p221 of the second target p22 are each independently fixed to the rotating shaft p7.

As shown in FIG. 35, the multiple blade portions p212 of the first target p21 and the multiple blade portions p222 of the second target p22 are disposed at circumferentially offset positions, in other words, at positions that do not overlap in the axial direction. Further, as shown in FIG. 34, a surface p210 of the multiple blade portions p212 of the first target p21 facing the first transceiver coil p31, and a surface p220 of the multiple blade portions p222 of the second target p22 facing the second transceiver coil p32 are disposed on a first virtual plane pVS1.

Further, as shown in FIG. 36, the inductive sensor p1 of the twenty-second embodiment has multiple transceiver coils p30 implemented on a single circuit board p10, and is configured to be capable of outputting multiple detection values. Among the multiple transceiver coils p30, a first transceiver coil p31 and a second transceiver coil p32 are implemented in an electrically independent state. The first transceiver coil p31 and the second transceiver coil p32 are implemented in a stacked state on one surface of the circuit board p10.

In FIG. 36, an area on the circuit board p10 where the first transceiver coil p31 and the second transceiver coil p32 are implemented is shown hatched with broken lines, although such area is not a cross section. Further, the coils constituting the transceiver coil p30 may have various shapes (for example, a sinusoidal shape). As shown in FIG. 34, the circuit board p10 on which multiple transceiver coils p30 and a transceiver circuit p35 are implemented is fixed to a housing p6 serving as a fixed body.

As shown in FIG. 34, the first transceiver coil p31 and the second transceiver coil p32 are disposed on a second virtual plane pVS2 parallel to the first virtual plane pVS1 on the circuit board p10. In the present specification, "the first transceiver coil p31 and the second transceiver coil p32 are disposed on the second virtual plane pVS2" means not only a state in which the first transceiver coil p31 and the second transceiver coil p32 exactly coincide with the second virtual plane pVS2, but also a state in which they are slightly misaligned, for example, by the thickness of the coil wire and the thickness of the layer of the circuit board p10.

The inductive sensor p1 and a brake pedal device p2 of the twenty-second embodiment described above have the following configuration and the resulting effects further to the effects described in the twentieth embodiment and the like.

In the twenty-second embodiment, the surface p210 of the first target p21 facing the first transceiver coil p31 and the surface p220 of the second target p22 facing the second transceiver coil p32 are disposed on the first virtual plane pVS1. Further, the surface p310 of the first transceiver coil p31 facing the first target p21 and the surface p320 of the second transceiver coil p32 facing the second target p22 are disposed on the second virtual plane pVS2 parallel to the first virtual plane pVS1.

With such arrangement, even in the twenty-second embodiment, it is possible to make a distance pD3 between the first target p21 and the first transceiver coil p31 the same as a distance pD4 between the second target p22 and the second transceiver coil p32. Therefore, even if either the first target p21 or the second target p22 falls off the rotating shaft p7 for some reason and the position of the detection object is detected using the other target p20, the signal amplitude of the sensor output does not become small. If the signal amplitude is large, an S/N ratio (i.e., signal-to-noise ratio) becomes large and the effect of noise in transmission becomes small, thereby making it possible to detect the position of the detection object with high accuracy.

Further, according to the configuration of the twenty-second embodiment, there is only one detection gap between the multiple targets p20 and the transceiver coil p30, thereby making the size of the inductive sensor p1 in the axial direction of the rotating shaft p7 smaller than in the second and third embodiments.

In the present embodiment, both the first transceiver coil p31 and the second transceiver coil p32 are disposed along an entire circumference, centered on the axis line CL of the rotating shaft p7. In a case, an axial misalignment may occur in the rotating shaft p7 due to rattling caused by clearance between bearings p61 and p62 (i.e., the surrounding portion 10a) of the housing p6 and the rotating shaft p7. In such case, the positions of the blade portions p212, p222 will be shifted, but since the first transceiver coil p31 and the second transceiver coil p32 are disposed within a wide angular range of 360 degrees about the axis line CL, an influence on the sensitivity of the first transceiver coil p31 and the second transceiver coil p32 caused by the positional shift of the blade portions p212, p222 can be reduced, and ultimately, the position of the detection object can be detected with high accuracy.

Further, the two blade portions p212 are disposed at positions in the opposite direction with respect to the axis line CL. Specifically, a virtual plane (not shown) including the axis line CL can pass through both of the two blade portions p212. Further, since the first transceiver coil p31 is disposed 360 degrees about the axis line CL, the two blade portions p212 can be detected simultaneously. With such configuration, even if the above-mentioned axial misalignment occurs in the rotating shaft p7, the directions of the circumferential positional misalignment of the two blade portions p212 about the axis line CL will be opposite to each other. Therefore, the influence of misalignment of the two blades p212 are cancelled out by the first transceiver coil p31. In such manner, the position of the detection object can be detected with even higher accuracy. The same is true between the two blades p222 and the second transceiver coil p32.

Twenty-Third Embodiment

The twenty-third embodiment will now be described. The twenty-third embodiment is similar to the twentieth embodiment and the like in that the configuration of the inductive sensor p1 is changed, but the other configuration is the same as the twentieth embodiment and the like, thereby only the differences from the twentieth embodiment will be described.

Figure 37:
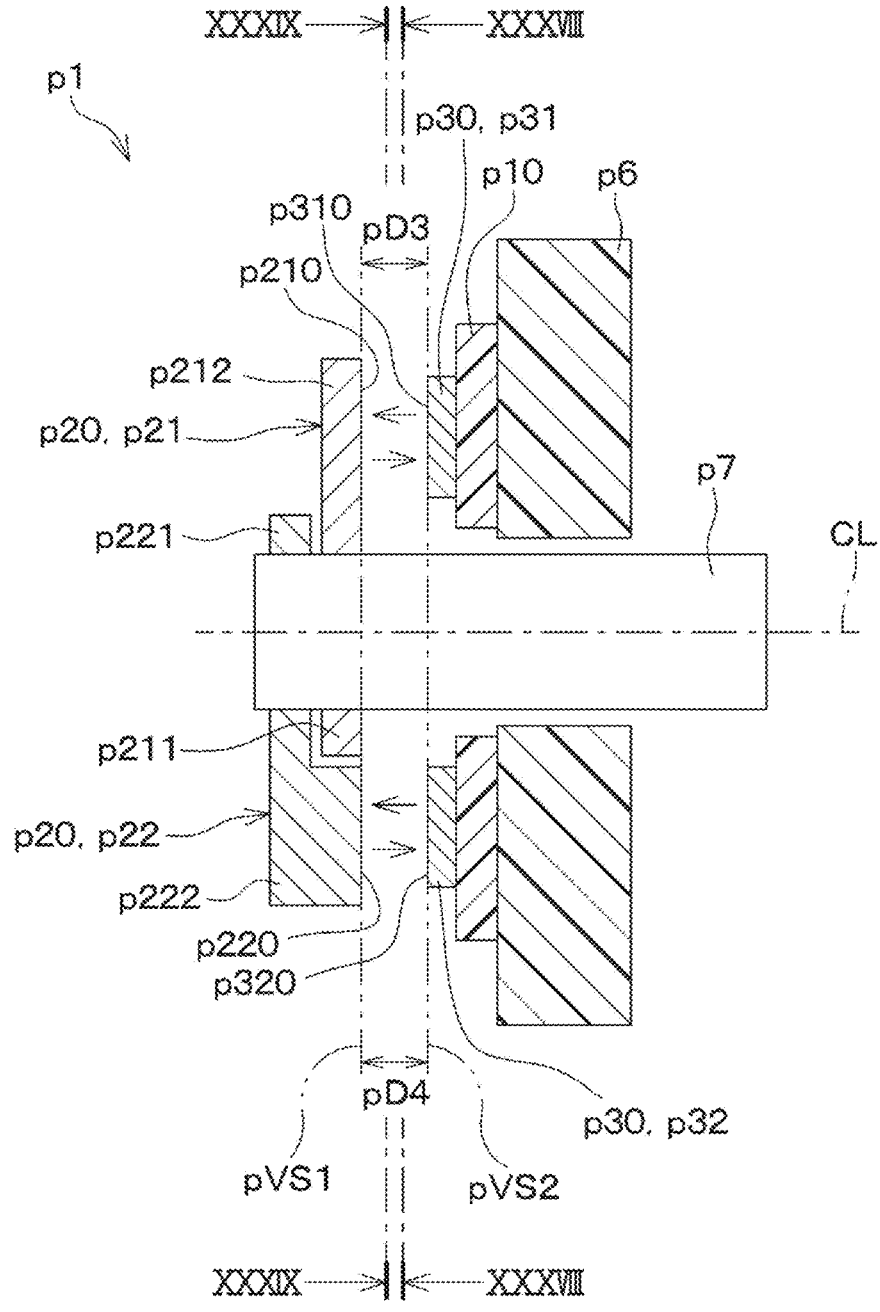
FIG. 37 is a cross-sectional view parallel to the axis of the rotating shaft in an inductive sensor according to a twenty-third embodiment.
Figure 38:
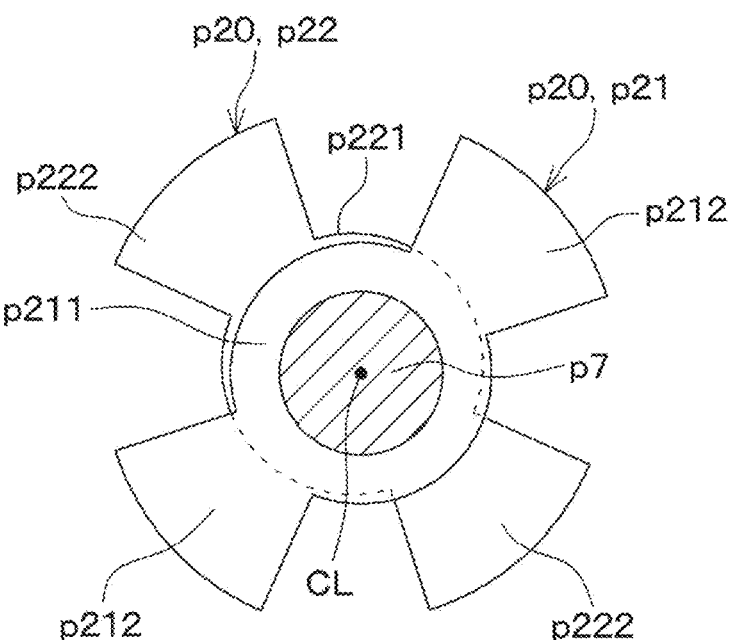
FIG. 38 is a cross-sectional view taken along a XXXVIII-XXXVIII line in FIG. 37.
Figure 39:
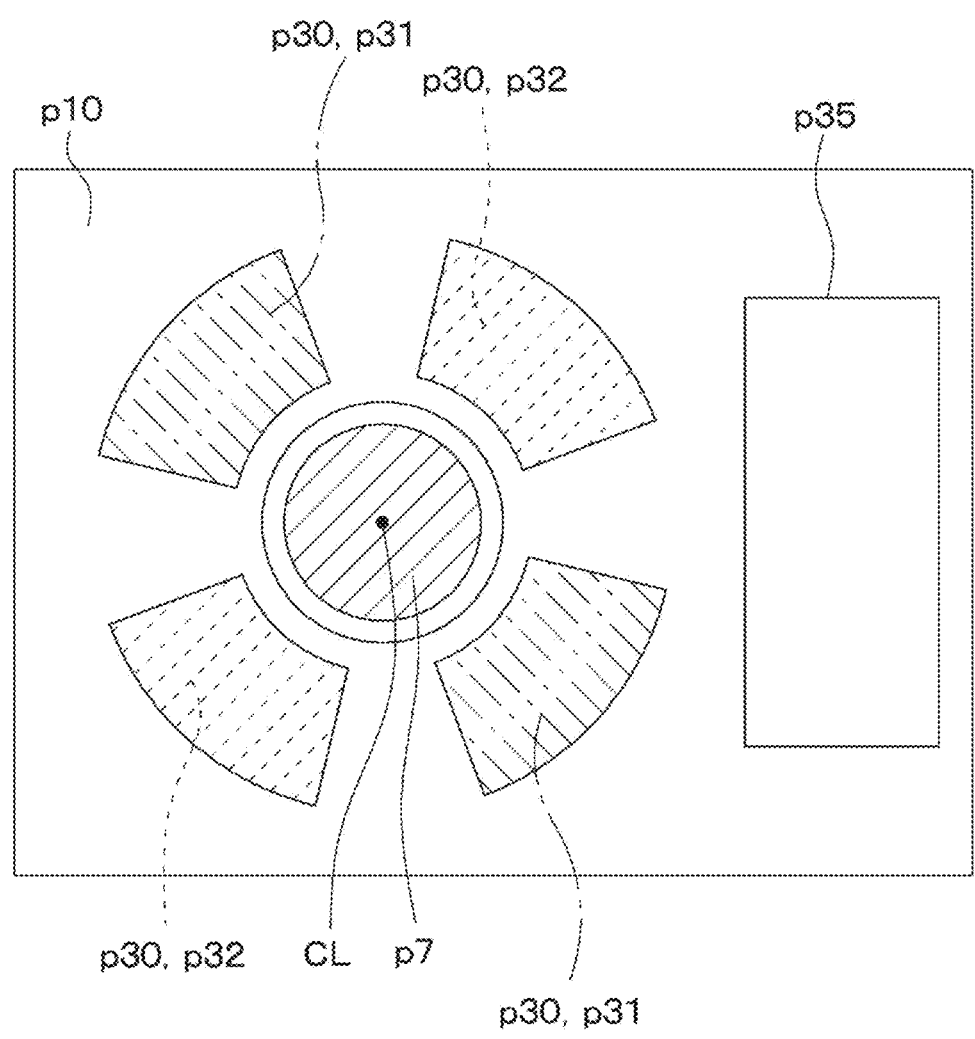
FIG. 39 is a cross-sectional view taken along a XXXIX-XXXIX line in FIG. 37.

As shown in FIGS. 37 to 39, in the twenty-third embodiment, an inductive sensor p1 also includes a circuit board p10 and multiple targets p20. The multiple targets p20 are the same as those described in the twenty-second embodiment. That is, as shown in FIG. 37, a surface p210 of multiple blade portions p212 of a first target p21 facing a first transceiver coil p31, and a surface p220 of multiple blade portions p222 of a second target p22 facing a second transceiver coil p32 are disposed on a first virtual plane pVS1.

As shown in FIG. 39, the inductive sensor 1 of the twenty-third embodiment also has multiple transceiver coils p30 implemented on a single circuit board p10, and is configured to be capable of outputting multiple detection values. Among the multiple transceiver coils p30, a first transceiver coil p31 and a second transceiver coil p32 are implemented in an electrically independent state. In FIG. 39, an area on the circuit board p10 where the first transceiver coil p31 is implemented is shown hatched with one-dot chain lines, although the hatched area is not a cross section. Further, an area on the circuit board p10 where the second transceiver coil p32 is implemented is shown hatched with broken lines, although the hatched area is not a cross section.

The first transceiver coil p31 and the second transceiver coil p32 are implemented in different areas on one surface of the circuit board p10. By mounting the first transceiver coil p31 and the second transceiver coil p32 in different areas, it is possible to prevent the first transceiver coil p31 and the second transceiver coil p32 from being influenced by each other's magnetic fields. Therefore, even if one of the transceiver coils p30, either the first transceiver coil p31 or the second transceiver coil p32, fails for some reason and the position of the detection object is detected using the other transceiver coil p30, the output signal of the sensor is prevented from being influenced.

The coils constituting the transceiver coil p30 may have various shapes (for example, a sinusoidal shape). As shown in FIG. 37, the circuit board p10 on which multiple transceiver coils p30 and the transceiver circuit p35 are implemented is fixed to a housing p6 serving as a fixed body. In the twenty-third embodiment, the first transceiver coil p31 and the second transceiver coil p32 are also disposed on a second virtual plane pVS2 parallel to a first virtual plane pVS1 on the circuit board p10. Therefore, a distance pD3 between the first target p21 and the first transceiver coil p31 is the same as a distance pD4 between the second target p22 and the second transceiver coil p32.

The inductive sensor p1 and a brake pedal device p2 of the twenty-third embodiment described above have the following configuration and the resulting effects further to the effects described in the twentieth embodiment and the like.

In the twenty-third embodiment, the first transceiver coil p31 and the second transceiver coil p32 are implemented in different areas on one surface of the circuit board p10. Therefore, it is possible to prevent the first transceiver coil p31 and the second transceiver coil p32 from being influenced by each other's magnetic fields. Therefore, even if one of the transceiver coils p30, either the first transceiver coil p31 or the second transceiver coil p32, fails for some reason and the position of the detection object is detected using the other transceiver coil p30, it is possible to prevent the sensor output signal from being influenced.

Further, in the twenty-third embodiment, there is only one detection gap between the multiple targets p20 and the transceiver coil p30, thereby making the size of the inductive sensor p1 in the axial direction of the rotating shaft p7 smaller compared to the twenty-first and twenty-second embodiments.

Further, in the present embodiment, the first transceiver coil p31 is disposed at two positions spaced apart in the circumferential direction about the axis line CL. More specifically, the first transceiver coil p31 is disposed at two positions in the opposite direction with respect to the axis line CL. That is, a virtual plane (not shown) including the axis line CL passes through both of the two positions where the first transceiver coil p31 is disposed. The same applies to the second transceiver coil p32. In such manner, since the first transceiver coil p31 and the second transceiver coil p32 are disposed within a wide angular range about the axis line CL, an influence on the sensitivity of the first transceiver coil p31 and the second transceiver coil p32 caused by the positional shift of the blade portions p212, p222 can be reduced, and ultimately, the position of the detection object can be detected with high accuracy.

Further, the two blade portions p212 are disposed at positions in the opposite direction with respect to the axis line CL. Specifically, a virtual plane (not shown) including the axis line CL can pass through both of the two blade portions p212. Further, the first transceiver coil p31 is disposed at two positions, enabling simultaneous detection of the two blade portions p212. With such configuration, even if the above-mentioned axial misalignment occurs in the rotating shaft p7, the directions of the circumferential positional misalignment of the two blade portions p212 about the axis line CL will be opposite to each other. Therefore, the influence of misalignment of the two blades p212 are cancelled out by the first transceiver coil p31. In such manner, the position of the detection object can be detected with even higher accuracy. The same is true between the two blades p222 and the second transceiver coil p32.

Twenty-Fourth Embodiment

The twenty-fourth embodiment will now be described. The twenty-fourth embodiment also describes an example of a method for fixing multiple targets p20 in comparison with the twentieth embodiment and the like.

Figure 40:
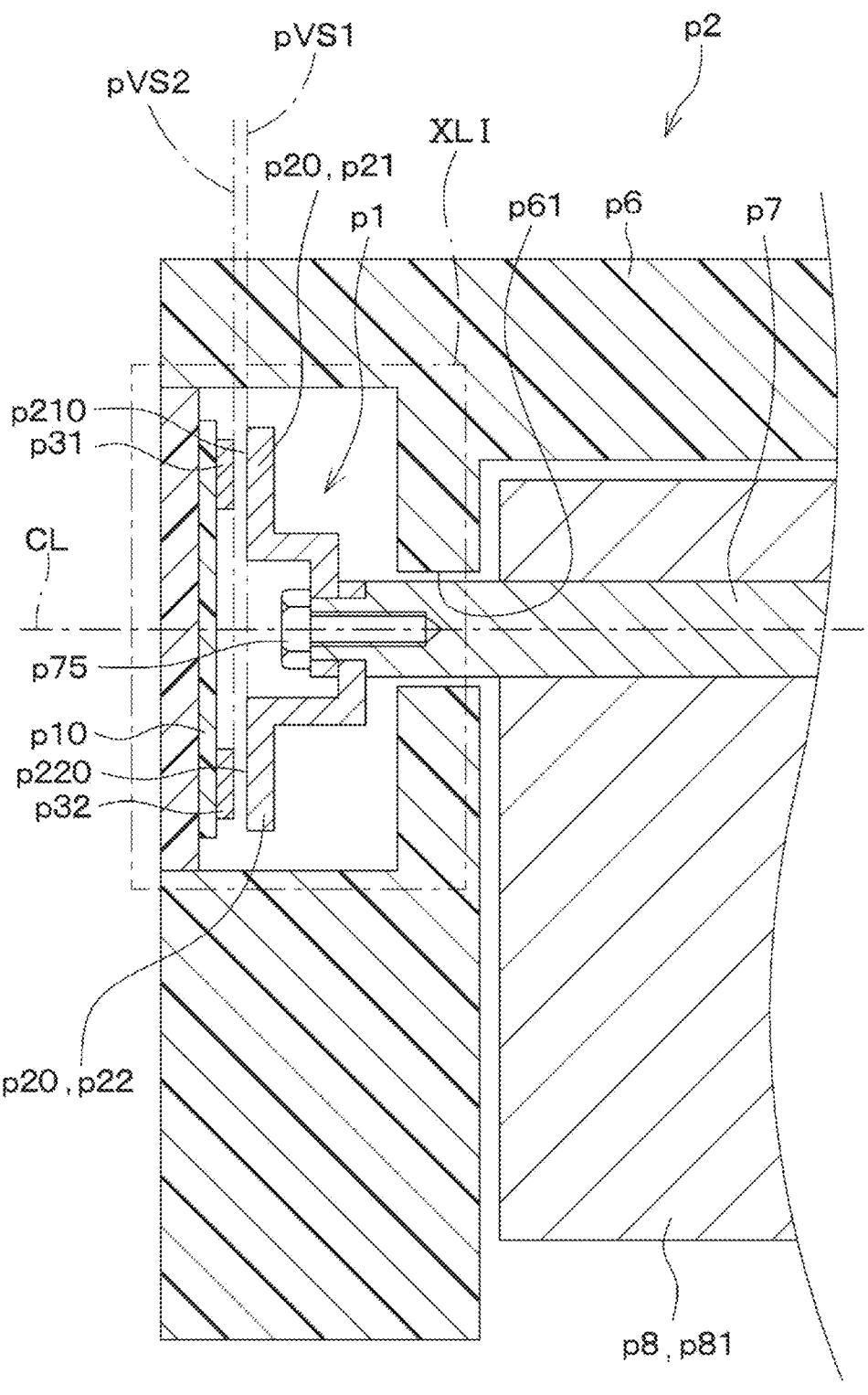
FIG. 40 is a cross-sectional view showing a portion corresponding to FIG. 27 in a brake pedal device provided with an inductive sensor according to a twenty-fourth embodiment.
Figure 41:
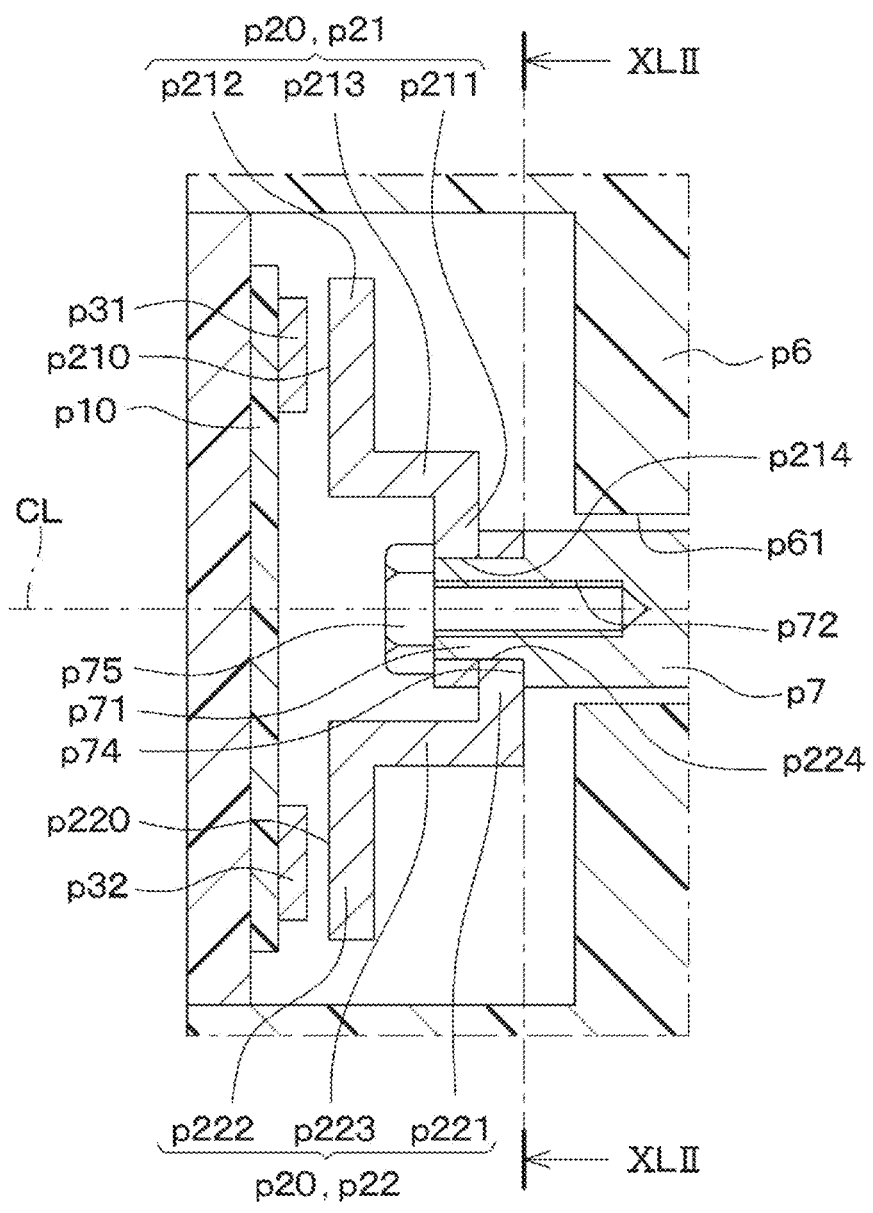
FIG. 41 is an enlarged view of a portion XLI in FIG. 40.
Figure 42:
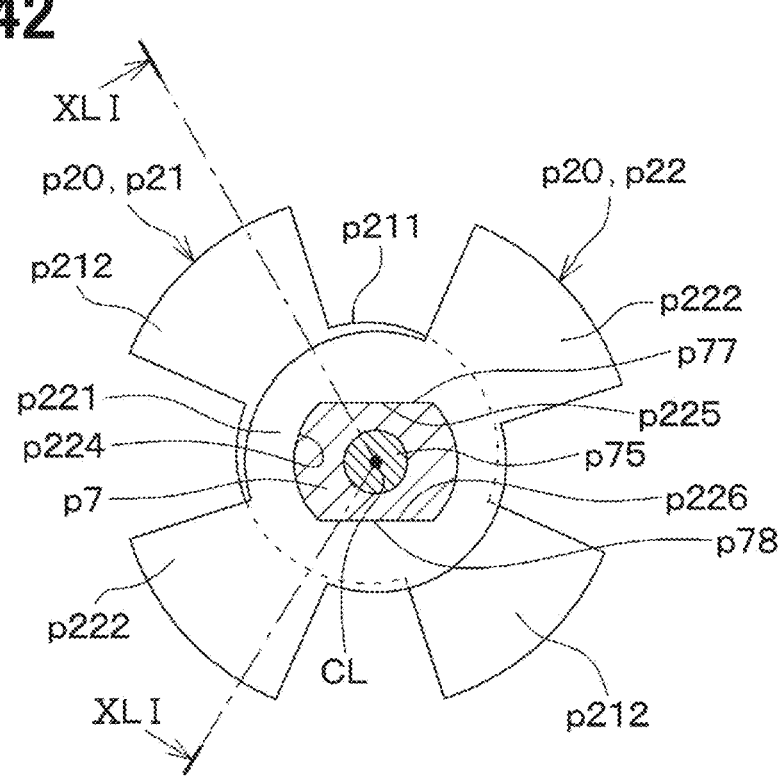
FIG. 42 is a cross-sectional view taken along a XLII-XLII line in FIG. 41.

As shown in FIGS. 40 to 42, in the twenty-fourth embodiment, the multiple targets p20 include a first target p21 and a second target p22. The first target p21 and the second target p22 each have a cylindrical portion p211, p221, an arm portion p213, p223, and multiple blade portions p212, p222. The cylindrical portions p211 and p221 are portions that surround a radially-outward outer wall of a rotating shaft p7. The arm portions p213 and p223 are portions that extend from outer edges of the cylindrical portions p211, p221 in the axial direction toward the circuit board p10. The multiple blade portions p212 and p222 are portions that extend radially outward from portions of the arm portions p213, p223 on a circuit board p10 side.

As shown in FIG. 41, both the first target p21 and the second target p22 are fixed to the rotating shaft p7, which serves as a rotating body, by a same bolt p75. Specifically, an axial end p71 of the rotating shaft p7 is inserted into a first hole p214 of the first target p21 and a second hole p224 of the second target p22. Further, a screw hole p72 is provided at an end p71 of the rotating shaft p7 to extend in the axial direction. The bolt p75 is screwed into the screw hole p72 of the rotating shaft p7. The first target p21 and the second target p22 are fixed in a state in which they are pressed against a step p74 provided on the rotating shaft p7 by an axial force of the bolt p75.

As shown in FIG. 42, the first target p21 and the second target p22 are both restricted in their relative rotation with respect to the rotating shaft p7 by an anti-rotation structure. Specifically, the anti-rotation structure is composed of two second target side flat surfaces p225, p226 formed on an inner wall of the second hole p224 of the second target p22, and two rotating shaft side flat surfaces p77, p78 provided on an outer wall of the rotating shaft p7. In such manner, the anti-rotation structure restricts the relative rotation between the second target p22 and the rotating shaft p7.

Although not shown in the figure, the anti-rotation structure is also composed of two first target side flat surfaces p225, p226 formed on an inner wall of the first hole p214 of the first target p21, and two rotating shaft side flat surfaces p77, p78 provided on an outer wall of the rotating shaft p7. In such manner, the anti-rotation structure restricts the relative rotation between the first target p21 and the rotating shaft p7. Therefore, even if the bolt p75 becomes loose, the anti-rotation structure can prevent the first target p21, the second target p22, and the rotating shaft p7 from rotating relative to each other.

The multiple blade portions p212 of the first target p21 and the multiple blade portions p222 of the second target p22 are disposed at positions offset in the circumferential direction, in other words, at positions that do not overlap in the axial direction. As shown in FIG. 40, a surface p210 of each of the multiple blade portions p212 of the first target p21 that faces the first transceiver coil p31 is disposed on a first virtual plane pVS1. Further, a surface p220 of the multiple blade portions p222 of the second target p22 that faces the second transceiver coil p32 is also disposed on the first virtual plane pVS1.

On the other hand, the first transceiver coil p31 and the second transceiver coil p32 are disposed on a second virtual plane pVS2 that is parallel to the first virtual plane pVS1 on the circuit board p10. In the present specification, "the first transceiver coil p31 and the second transceiver coil p32 are disposed on the second virtual plane pVS2" includes a state in which the first transceiver coil p31 and the second transceiver coil p32 are exactly aligned with the second virtual plane pVS2, as well as a state in which they are slightly misaligned. An example of the slight misalignment is a state in which the first transceiver coil p31, the second transceiver coil p32, and the second virtual plane pVS2 are slightly misaligned by the thickness of the coil wire and the thickness of the layer of the circuit board p10.

An inductive sensor p1 and a brake pedal device p2 of the twenty-fourth embodiment described above have the following configuration and the resulting effects further to the effects described in the twentieth embodiment and the like.

In the twenty-fourth embodiment, the first target p21 and the second target p22 are both fixed to the rotating shaft p7, which serves as a rotating body, by the same bolt. In such manner, the first target p21 and the second target p22 are easily fixable to the rotating shaft p7 without requiring any special equipment.

In the twenty-fourth embodiment, the inductive sensor p1 is provided with the anti-rotation structure that (i) restricts the relative rotation between the first target p21 and the rotating shaft p7 and (ii) restricts the relative rotation between the second target p22 and the rotating shaft p7. With such configuration, even if the bolt p75 becomes loose, the first target p21 and the second target p22 will not rotate relative to the rotating shaft p7. Therefore, the inductive sensor p1 can continue to correctly detect the positions of the rotating shaft p7 and the brake pedal p8 as the detection objects, thereby ensuring redundancy in the detection of the positions of the detection objects.

Twenty-Fifth Embodiment

The twenty-fifth embodiment will now be described. The twenty-fifth embodiment describes another specific example of the anti-rotation structure in comparison with the twenty-fourth embodiment.

Figure 43:
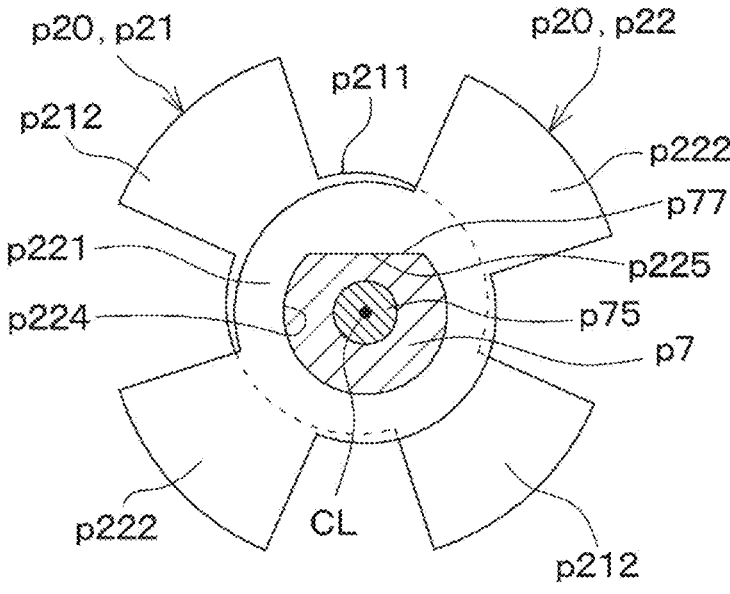
FIG. 43 is a cross-sectional view showing a portion corresponding to FIG. 42 in a brake pedal device provided with an inductive sensor according to a twenty-fifth embodiment.

As shown in FIG. 43, in the twenty-fifth embodiment as well, the relative rotation of both the first target p21 and the second target p22 with respect to the rotating shaft p7 is restricted by an anti-rotation structure. Specifically, the anti-rotation structure is composed of one second target side flat surface portion p225 formed on an inner wall of a second hole p224 of the second target p22, and one rotating shaft side flat surface portion p77 provided on an outer wall of the rotating shaft p7. In such manner, the anti-rotation structure restricts the relative rotation between the second target p22 and the rotating shaft p7. Also, although not shown in the figure, the anti-rotation structure is also composed of a first target side flat surface portion p215 formed on an inner wall of a first hole p214 of the first target p21, and a rotating shaft side flat surface portion p77 provided on an outer wall of the rotating shaft p7. In such manner, the anti-rotation structure restricts the relative rotation between the first target p21 and the rotating shaft p7. Therefore, in the same way as in the twenty-fourth embodiment, even if a bolt p75 loosens, the twenty-fifth embodiment can prevent the first target p21, the second target p22, and the rotating shaft p7 from rotating relative to each other.

Twenty-Sixth Embodiment

The twenty-sixth embodiment will now be described. The twenty-sixth embodiment also describes another specific example of the anti-rotation structure in comparison with the twenty-fourth embodiment.

Figure 44:
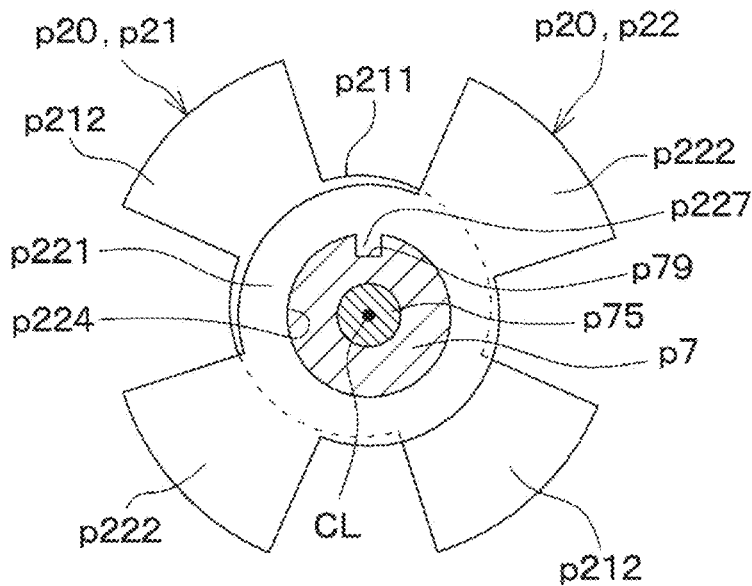
FIG. 44 is a cross-sectional view showing a portion corresponding to FIG. 42 in a brake pedal device provided with an inductive sensor according to a twenty-sixth embodiment.

As shown in FIG. 44, in the twenty-sixth embodiment as well, the relative rotation of both a first target p21 and a second target p22 with respect to a rotating shaft p7 is restricted by an anti-rotation structure. Specifically, the anti-rotation structure is composed of a projection p227 projecting radially inward from an inner wall of a second hole p224 of the second target p22, and a recess p79 provided on an outer wall of the rotating shaft p7. The projection p227 of the second target p22 fits into the recess p79 of the rotating shaft p7. In such manner, the anti-rotation structure restricts the relative rotation between the second target p22 and the rotating shaft p7.

Further, although not shown in the figure, the anti-rotation structure is also composed of a projection projecting radially inward from an inner wall of a first hole p214 of the first target p21, and a recess p79 provided on an outer wall of the rotating shaft p7. The projection of the first target p21 fits into the recess p79 of the rotating shaft p7. In such manner, the anti-rotation structure restricts the relative rotation between the first target p21 and the rotating shaft p7. Therefore, in the twenty-sixth embodiment, like the twenty-fourth and twenty-fifth embodiments, even if the bolt p75 loosens, the first target p21, the second target p22, and the rotating shaft p7 are prevented from rotating relative to each other.

Twenty-Seventh Embodiment

The twenty-seventh embodiment will now be described. The twenty-seventh embodiment is different from the twenty-fourth to twenty-sixth embodiments in that the method of fixing the multiple targets p20 is changed.

Figure 45:
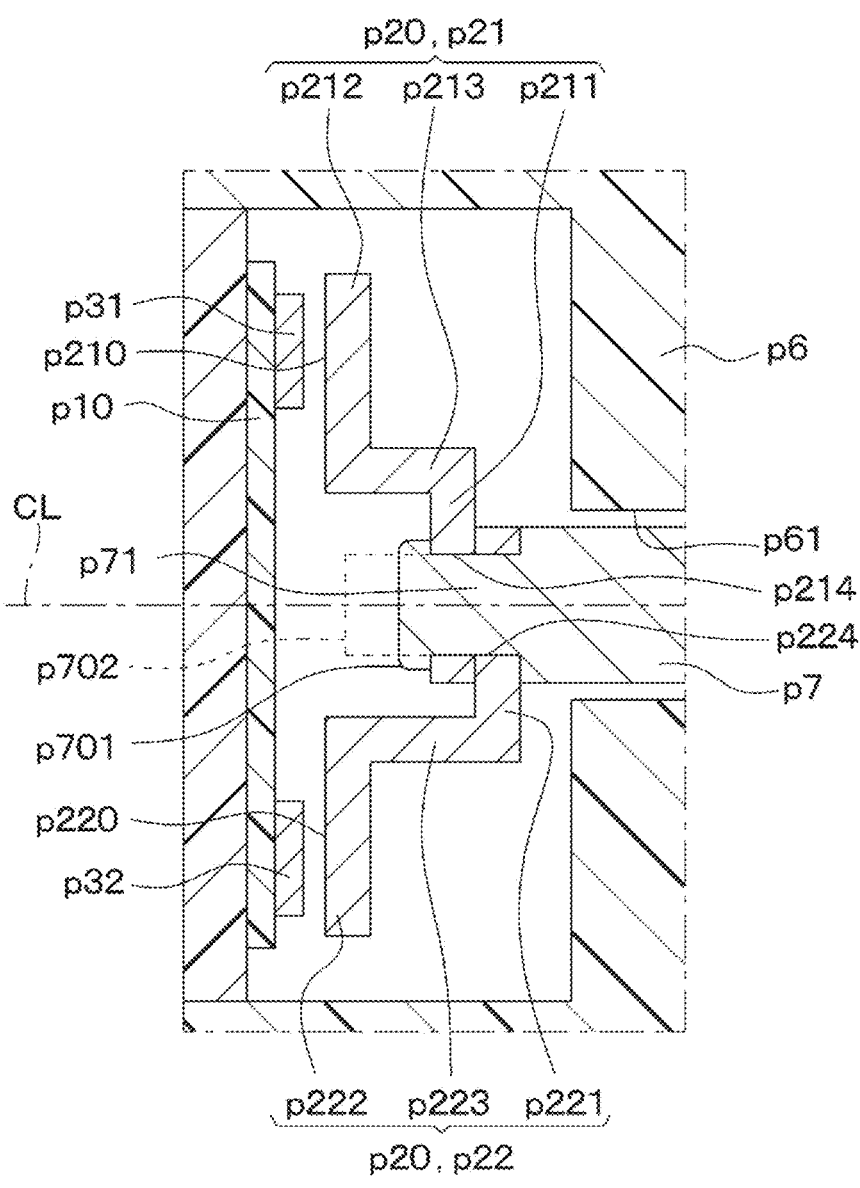
FIG. 45 is a cross-sectional view showing a portion corresponding to FIG. 41 in a brake pedal device provided with an inductive sensor according to a twenty-seventh embodiment.

As shown in FIG. 45, in the twenty-seventh embodiment, a first target p21 and a second target p22 are both fixed to a rotating shaft p7 serving as a rotating body by caulking p701. Specifically, an end p71 in the axial direction of the rotating shaft p7 has a shape shown by a broken line p702 before being subjected to the caulking process. A portion indicated by the broken line p702 is inserted into a first hole p214 of the first target p21 and a second hole p224 of the second target p22. Then, the portion indicated by the broken line p702 is pressurized from the axial direction and crushed, thereby performing the caulking process. In such manner, the end p71 of the rotating shaft p7 in the axial direction can fix the first target p21 and the second target p22 by the caulking p701.

The twenty-seventh embodiment may also be provided with the anti-rotation structures described in the twenty-fourth to twenty-sixth embodiments.

An inductive sensor p1 and a brake pedal device p2 of the twenty-seventh embodiment described above have the following configuration and the resulting effects further to the effects described in the twentieth embodiment and the like.

In the twenty-seventh embodiment, both the first target p21 and the second target p22 are fixed to the rotating shaft 7 by caulking p701. In such manner, the component cost of a bolt p75 can be reduced compared to a configuration in which the first target p21 and the second target p22 are fixed to the rotating shaft p7 by the bolt p75. Further, since the height of the head of the caulking p701 is generally lower than the height of the head of the bolt p75, the amount of bending of the target p20 (i.e., the length of the arm portions p213, p223) required to position a detection surface of the target p20 on the first virtual plane pVS1 shown in FIG. 40 can be reduced. Therefore, the size of the inductive sensor p1 in the axial direction can be reduced. The detection surface of the target p20 is the surface p210 of the multiple blade portions p212 of the first target p21 that faces the first transceiver coil p31, and the surface p220 of the multiple blade portions p222 of the second target p22 that faces the second transceiver coil p32.

Twenty-Eighth Embodiment

The twenty-eighth embodiment will now be described. The twenty-eighth embodiment is different from the twenty-third to twenty-seventh embodiments in that the size of the transceiver coil p30 is changed.

Figure 46:
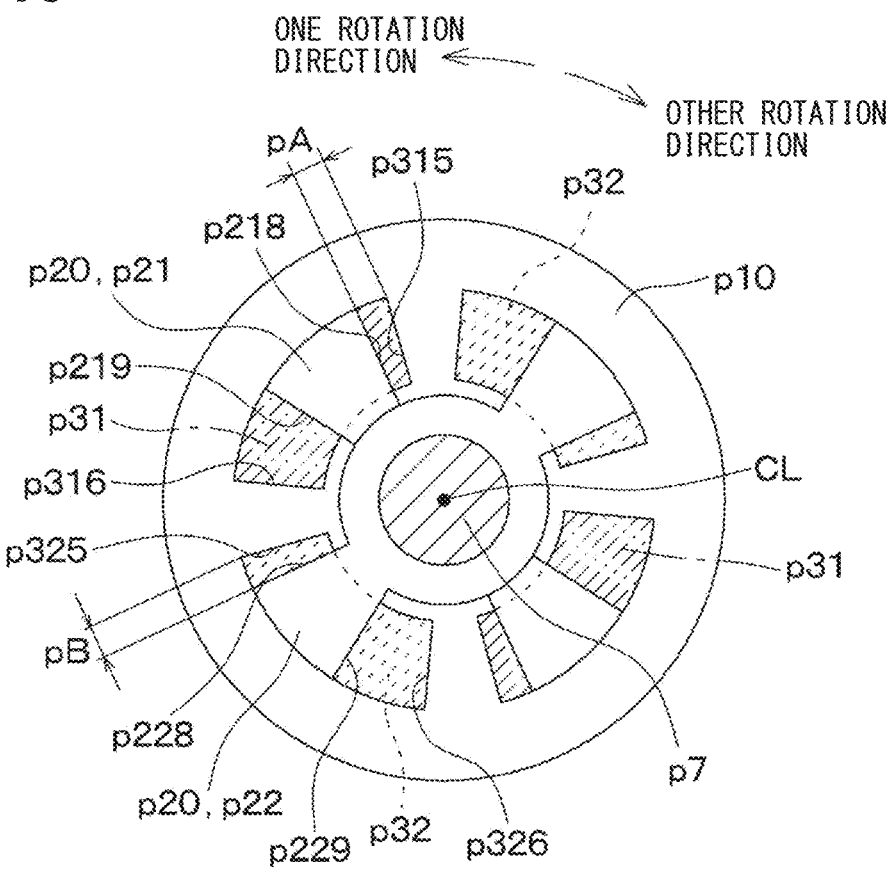
FIG. 46 is a cross-sectional view showing a portion corresponding to FIG. 42 in a brake pedal device having an inductive sensor according to a twenty-eighth embodiment, and showing a state of the inductive sensor when the brake pedal is in the initial position.

FIG. 46 shows a state of an inductive sensor p1 when the centers of bearings p61, p62 of a housing p6 and an axis line CL of a rotating shaft p7 are in the same position and no driver's pressure is being applied to a brake pedal p8, i.e., when the brake pedal p8 is in its initial position. In such state, an angle of a target p20 with respect to a circuit board p10 is set to, for example, 0 degree.

Figure 47:
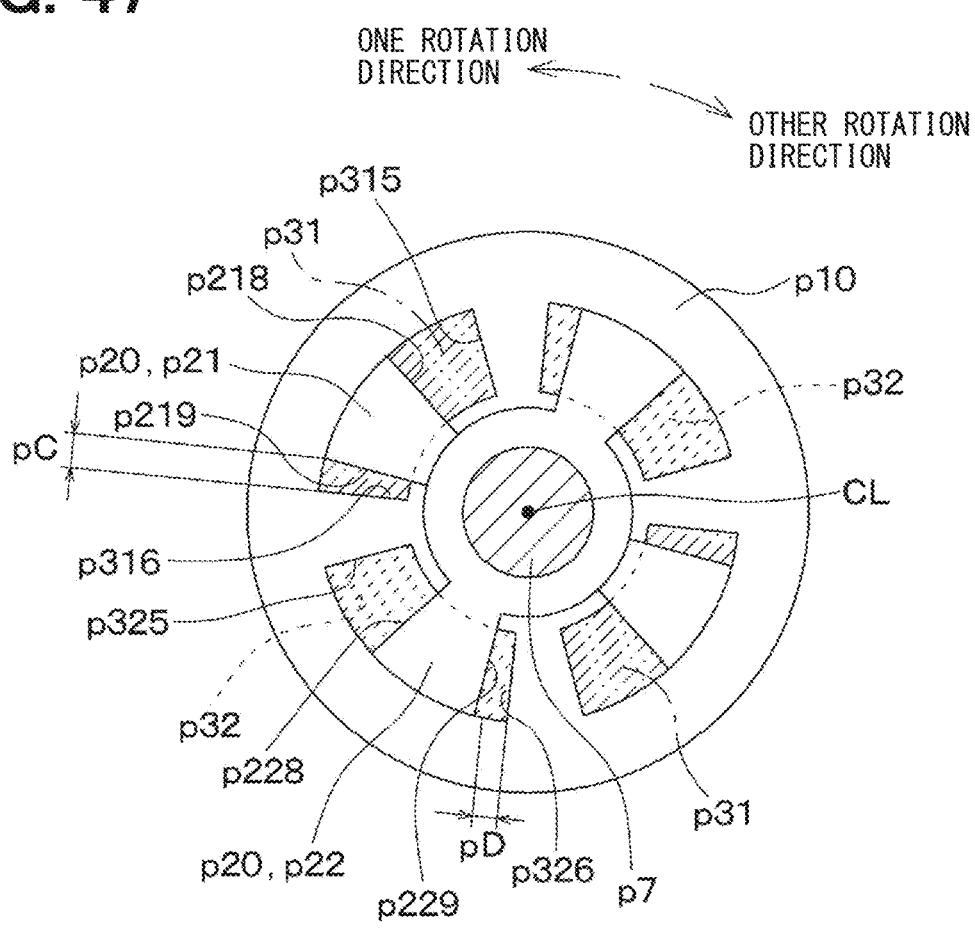
FIG. 47 is a cross-sectional view showing a portion corresponding to FIG. 42 in a brake pedal device having an inductive sensor of the twenty-eighth embodiment, and showing a state of the inductive sensor when the brake pedal is in a maximum pedaling position.

On the other hand, FIG. 47 shows a state of the inductive sensor p1 when the centers of the bearings p61, p62 of the housing p6 and the axis line CL of the rotating shaft p7 are in the same position and the brake pedal p8 is fully pedaled, i.e., when the brake pedal p8 is in a maximum pedaling position. In such state, the angle of the target p20 with respect to the circuit board p10 is set to, for example, X degrees. Therefore, when the brake pedal p8 rotates from the initial position to the maximum pedaling position, the target p20 rotates in a range from 0 degree to X degrees.

In the following description, when the driver's pedaling force on the brake pedal p8 increases, the direction in which the target p20 rotates relative to the circuit board p10 according to the pedaling operation of the brake pedal p8 is referred to as "one rotation direction." On the other hand, when the driver's pedaling force on the brake pedal p8 is reduced or released, the direction in which the target 20 rotates relative to the circuit board p10 according to a return motion of the brake pedal p8 is referred to as "other rotation direction."

In FIGS. 46 and 47, an area on the circuit board p10 where the first transceiver coil p31 is implemented is hatched with one-dot chain lines, although it is not a cross-section, and an area where the second transceiver coil p32 is implemented thereon is hatched with broken lines, although it is not a cross-section. It should be noted that the one-dot chain line hatching and broken line hatching are not used in the areas where the transceiver coil p30 and the target p20 overlap in the axial direction. The same applies to the twenty-ninth embodiment and the second and third comparative examples described below.

As shown in FIGS. 46 and 47, in the twenty-eighth embodiment, a range in which the first transceiver coil p31 is implemented on the circuit board p10 is larger in one and other rotation directions of the first target p21 than a rotation range of the first target p21 (i.e., 0 degree to X degrees). Further, a range in which the second transceiver coil p32 is implemented on the circuit board p10 is larger in one and other rotation directions of the second target 22 than the rotation range of the second target 22 (i.e., 0 degree to X degrees).

Specifically, as shown in FIG. 46, when the first target p21 is at 0 degree, a distance pA between an end p218 of the first target p21 in other rotation direction and an end p315 of the first transceiver coil p31 in one rotation direction is greater than a predetermined distance pD1. The predetermined distance pD1 is a distance that the first target p21 may move relative to the circuit board p10 due to rattling between the bearings p61, p62 of the housing p6 and the rotating shaft p7. Further, when the second target p22 is at 0 degree, a distance pB between an end p228 of the second target p22 in other rotation direction and an end p325 of the second transceiver coil p32 in one rotation direction is greater than a predetermined distance pD2. The predetermined distance pD2 is a distance that the second target p22 may move relative to the circuit board p10 due to rattling between the bearings p61, p62 of the housing p6 and the rotating shaft p7.

Further, as shown in FIG. 47, when the first target p21 is at X degrees, a distance pC between an end p219 of the first target p21 in one rotation direction and an end p316 of the first transceiver coil p31 on in other rotation direction is greater than a predetermined distance pD3. The predetermined distance pD3 is a distance that the first target p21 may move relative to the circuit board p10 due to rattling between the bearings p61, p62 of the housing p6 and the rotating shaft p7. Further, when the second target p22 is at X degrees, a distance pD between an end p229 of the second target p22 on in one rotation direction and an end p326 of the second transceiver coil p32 in other rotation direction is greater than a predetermined distance pD4. The predetermined distance pD4 is a distance that the second target p22 may move relative to the circuit board p10 due to rattling between the bearings p61, p62 of the housing p6 and the rotating shaft p7.

Here, for comparison with the configuration described in the twenty-eighth embodiment, an inductive sensor and a brake pedal device of a second comparative example will be described.

Figure 48:
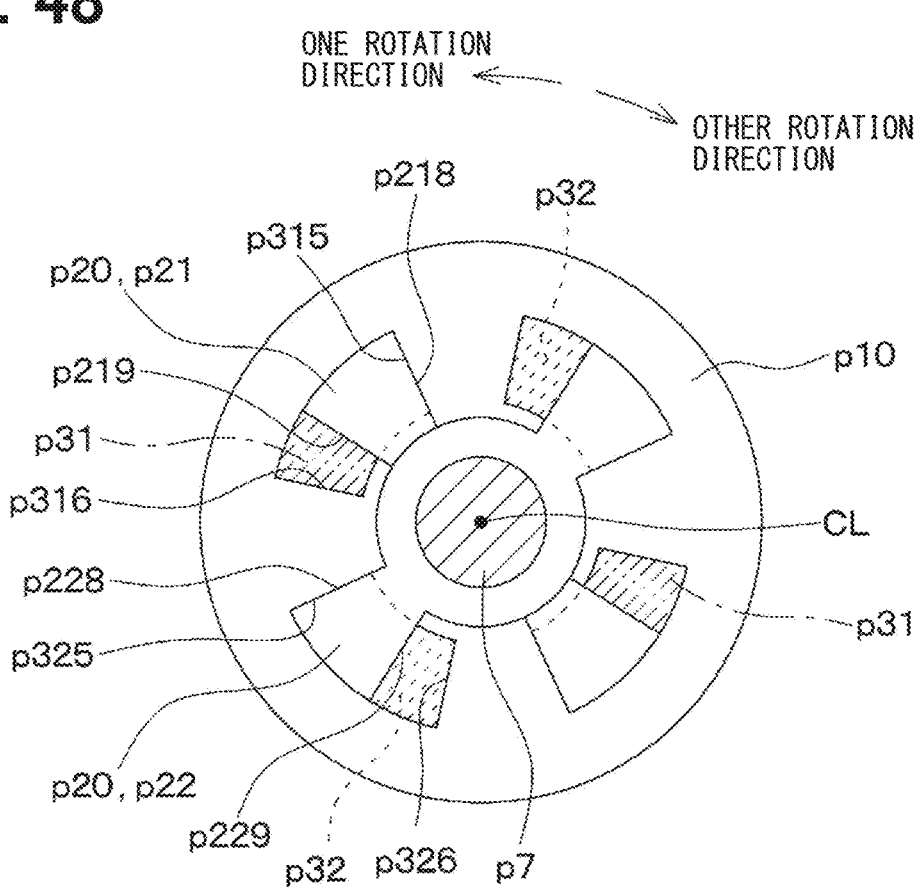
FIG. 48 is a cross-sectional view showing a portion corresponding to FIG. 43 in a brake pedal device having an inductive sensor of a second comparative example, showing the state of the inductive sensor when the brake pedal is in the initial position.

FIG. 48 shows a state of the inductive sensor when the centers of the bearings p61, p62 of the housing p6 and the axis line CL of the rotating shaft p7 are in the same position and the brake pedal p8 is in the initial position. As shown in FIG. 48, in the second comparative example, when the first target p21 is at 0 degree, an end p218 of the first target p21 in other rotation direction and an end p315 of the first transceiver coil p31 in other rotation direction are in an overlapping position when viewed from the axial direction. Further, when the second target p22 is at 0 degree, an end p228 of the second target p22 in other rotation direction and an end p325 of the second transceiver coil p32 in other rotation direction are in an overlapping position when viewed from the axial direction.

In the second comparative example, the case where the centers of the bearings 61, 62 of the housing 6 and the axis line CL of the shaft 7 are at the same position and the first target 21 and the second target 22 are at X degrees is omitted from the illustration. In such case, in the second comparative example, the end p219 of the first target p21 in one rotation direction and the end p316 of the first transceiver coil p31 in other rotation direction are positioned to overlap when viewed from the axial direction. Further, in such case, in the second comparative example, the end p229 of the second target p22 in one rotation direction and the end p326 of the second transceiver coil p32 in other rotation direction are positioned to overlap when viewed from the axial direction.

Figure 49:
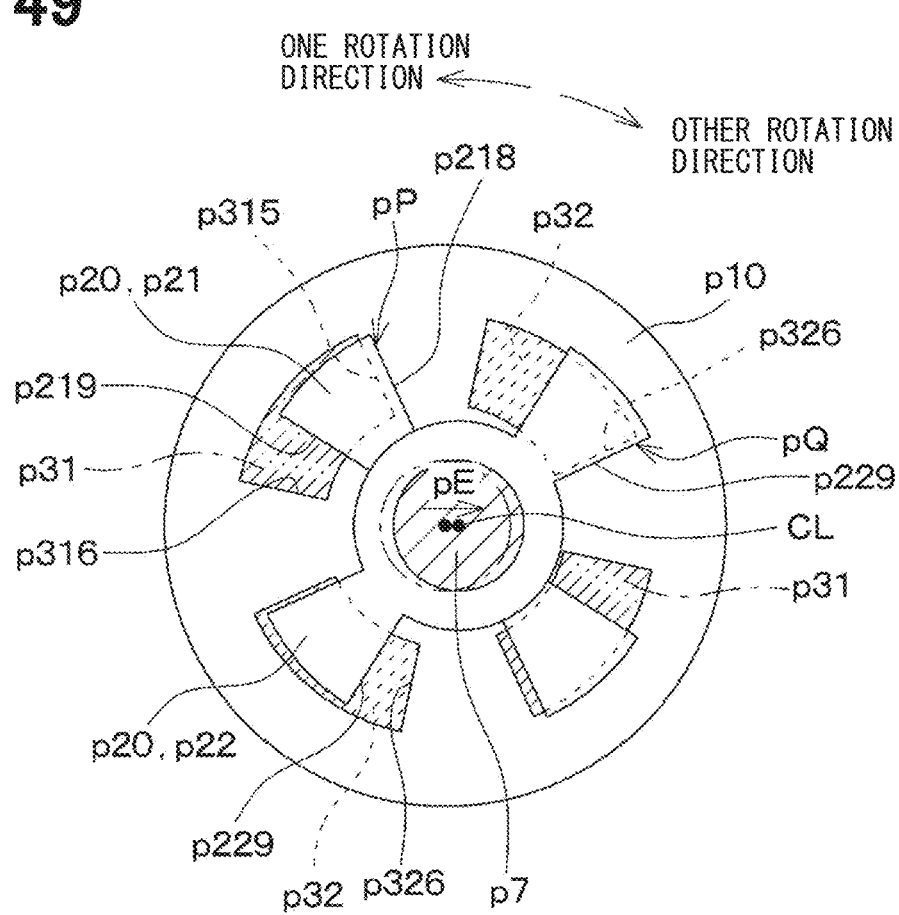
FIG. 49 is a cross-sectional view showing a portion corresponding to FIG. 42 in a brake pedal device having an inductive sensor of the second comparative example, and showing a state in which the rotating shaft is eccentric when the brake pedal is in the initial position.

FIG. 49 shows a state in the second comparative example where, when the brake pedal p8 is in the initial position, the rotating shaft p7 becomes eccentric due to rattling between the bearings p61, p62 of the housing p6 and the rotating shaft p7, and the target p20 moves in a direction indicated by an arrow pE relative to the circuit board p10. In the second comparative example, a portion pP of the first target p21 at an upper left in FIG. 49 is outside an implementation range of the first transceiver coil p31. Further, a portion pQ of the second target p22 at an upper right in FIG. 49 is also outside the implementation range of the second transceiver coil p32.

Therefore, in the second comparative example, if the rotating shaft p7 becomes eccentric when the brake pedal p8 is in the initial position, an area size of overlap between the first target p21 and the first transceiver coil p31 in the axial direction changes significantly. Further, an area size of overlap between the second target p22 and the second transceiver coil p32 in the axial direction also changes significantly. Therefore, an amplitude of the signal output from the inductive sensor changes significantly.

Although not shown in the figure, in the second comparative example, even if the rotating shaft p7 becomes eccentric when the brake pedal p8 is in the maximum pedaling position, the area size of overlap between the first target p21 and the first transceiver coil p31 in the axial direction changes significantly. Further, an area size of overlap between the second target p22 and the second transceiver coil p32 in the axial direction also changes significantly. Therefore, an amplitude of the signal output from the inductive sensor changes significantly.

Compared to the above-mentioned second comparative example, the inductive sensor p1 and brake pedal device p2 of the twenty-eighth embodiment have the following configuration and resulting effects further to the effects described in the twentieth embodiment, and the like.

In the twenty-eighth embodiment, the implementation range in which the first transceiver coil p31 is implemented on the circuit board p10 is larger in one and other rotation directions of the first target p21 than a movable range of the first target p21. Further, the implementation range in which the second transceiver coil p32 is implemented on the circuit board p10 is larger in one and other rotation directions of the second target p22 than a movable range of the second target p22.

According to the above, even if the first target p21 and the second target p22 become eccentric with respect to the circuit board p10, for example, due to rattling between the bearings p61, p62 of the housing p6 and the rotating shaft p7, the first target p21 is always positioned within the range of the first transceiver coil p31. Further, the second target p22 is always positioned within the range of the second transceiver coil p32. Therefore, the area size of overlap between the first transceiver coil p31 and the first target p21 in the axial direction does not change significantly due to eccentricity between the first target p21 and the second target p22. The area size of overlap between the second transceiver coil p32 and the second target p22 in the axial direction does not change significantly. Therefore, the amplitude of the signal output from the inductive sensor p1 does not change significantly.

Twenty-Ninth Embodiment

The twenty-ninth embodiment will now be described. The twenty-ninth embodiment is a modification of the twenty-third to twenty-eighth embodiments in terms of the size of the target p20.

Figure 50:
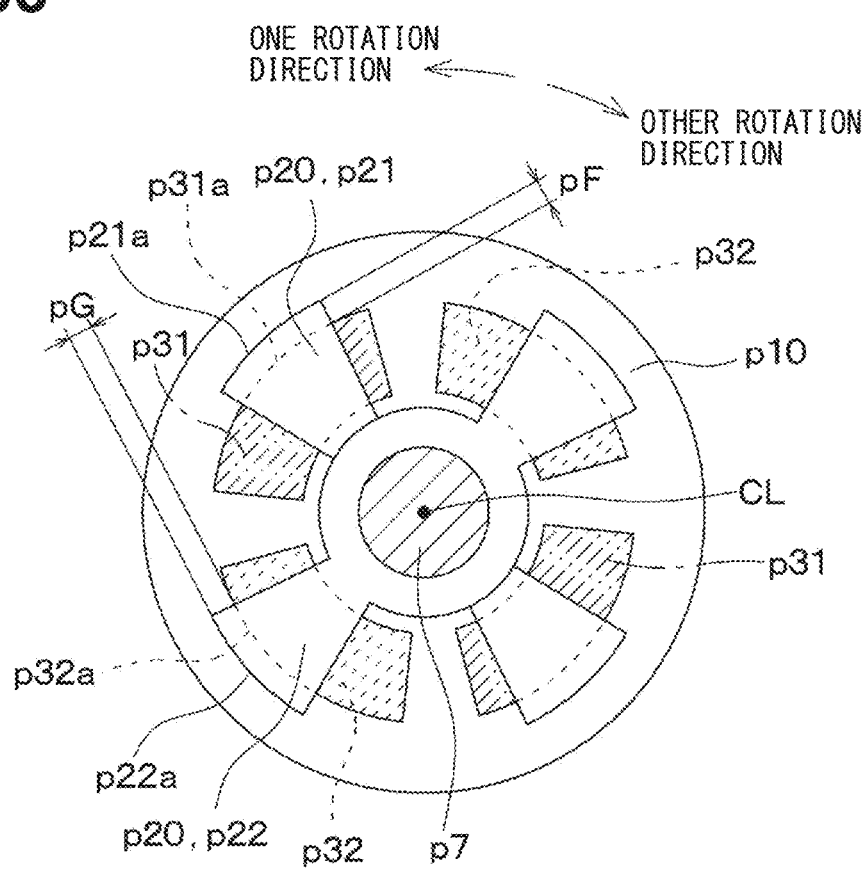
FIG. 50 is a cross-sectional view showing a portion corresponding to FIG. 42 in a brake pedal device having an inductive sensor of a twenty-ninth embodiment, and showing a state of the inductive sensor when the brake pedal is in the initial position.

FIG. 50 shows a state of an inductive sensor p1 when the centers of bearings p61, p62 of a housing p6 and an axis line CL of a rotating shaft p7 are in the same position and a brake pedal p8 is in the initial position. As shown in FIG. 50, in the twenty-ninth embodiment, a first target p21 is larger radially outward than a range in which a first transceiver coil p31 is implemented on a circuit board p10. Further, a second target p22 is larger radially outward than a range in which a second transceiver coil p32 is implemented on the circuit board p10.

Specifically, a distance pF between a radially-outward end p21*a* of the first target p21 and a radially-outward end p31*a* of the first transceiver coil p31 is greater than a predetermined distance pD7. The predetermined distance pD7 is a distance that the first target p21 may possibly move relative to the circuit board p10 due to rattling between the bearings p61, p62 of the housing p6 and the rotating shaft p7. Further, a distance pG between a radially-outward end p22*a* of the second target p22 and a radially-outward end p32*a* of the second transceiver coil p32 is greater than a predetermined distance. The predetermined distance is a distance that the second target p22 may possibly move relative to the circuit board p10 due to rattling between the bearings p61, p62 of the housing p6 and the rotating shaft p7.

Figure 51:
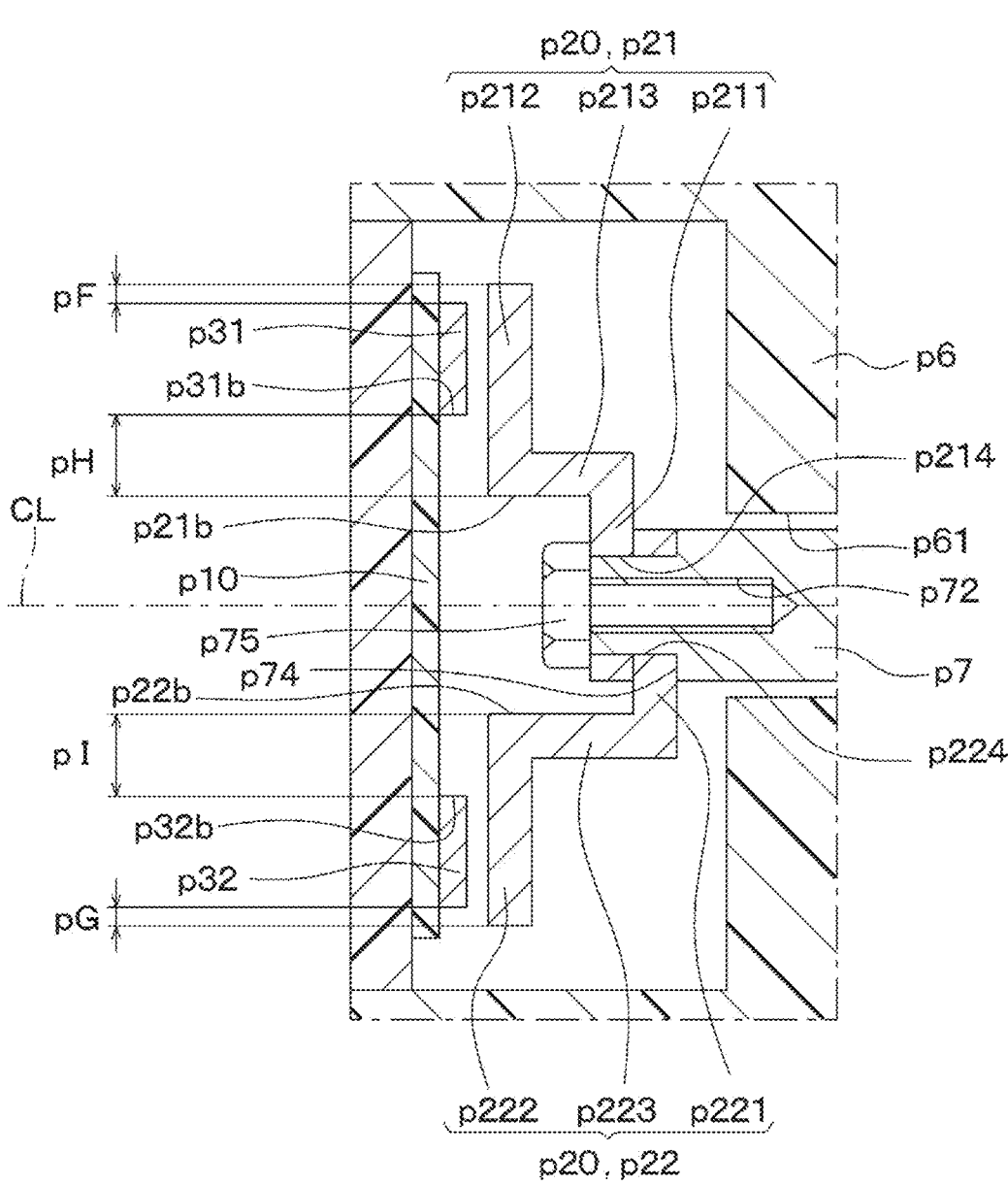
FIG. 51 is a cross-sectional view showing a portion corresponding to FIG. 28 in a brake pedal device provided with an inductive sensor according to the twenty-ninth embodiment.

Further, as shown in FIG. 51, in the twenty-ninth embodiment, a blade portion p212 of the first target p21 is larger radially inward than a range in which the first transceiver coil p31 is implemented on the circuit board p10. Further, a blade portion p222 of the second target p22 is larger radially inward than a range in which the second transceiver coil p32 is implemented on the circuit board p10.

Specifically, a distance pH between a radially-inward end p21*b* of the blade portion p212 of the first target p21 and a radially-inward end p31*b* of the first transceiver coil p31 is greater than a predetermined distance pD8. The predetermined distance pD8 is a distance that the first target p21 may possibly move relative to the circuit board p10 due to rattling between the bearings p61, p62 of the housing p6 and the rotating shaft p7. Further, a distance p1 between a radially-inward end p22*b* of the blade portion p222 of the second target p22 and a radially-inward end p32*b* of the second transceiver coil p32 is greater than a predetermined distance pD9. The predetermined distance pD9 is a distance that the second target p22 may possibly move relative to the circuit board p10 due to rattling between the bearings p61, p62 of the housing p6 and the rotating shaft p7.

Here, for comparison with the configuration described in the twenty-ninth embodiment, an inductive sensor and a brake pedal device of a third comparative example will be described.

Figure 52:
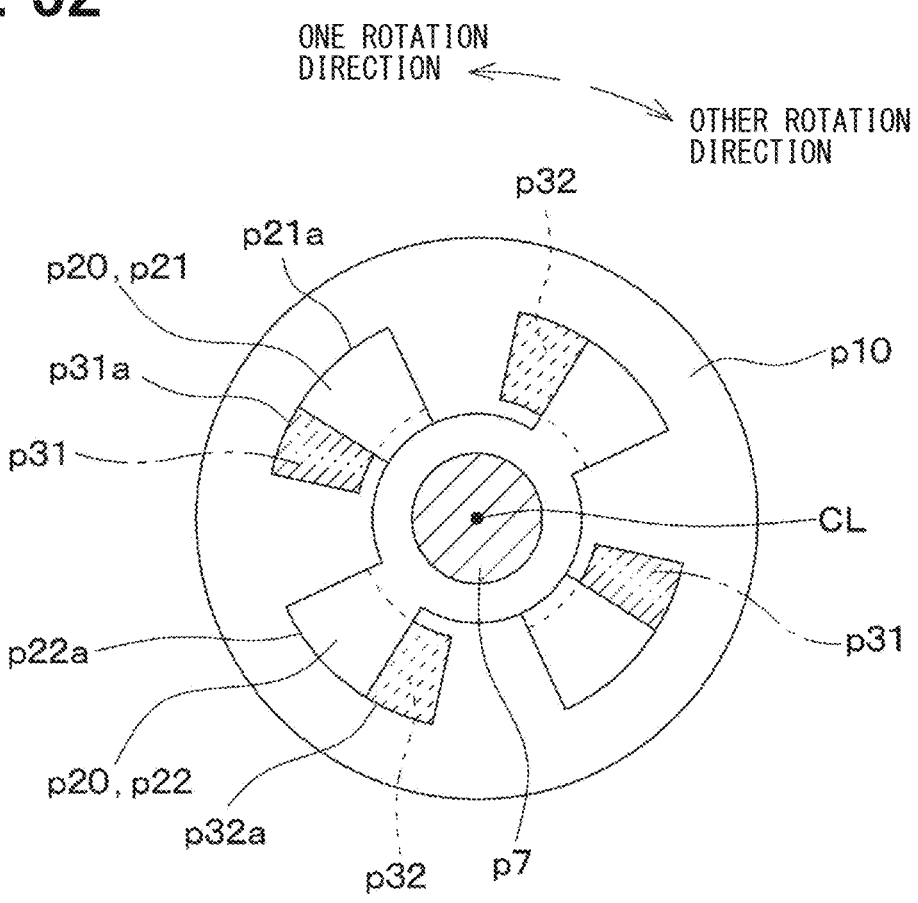
FIG. 52 is a cross-sectional view showing a portion corresponding to FIG. 42 in a brake pedal device having an inductive sensor of a third comparative example, and showing a state of the inductive sensor when the brake pedal is in the initial position.

FIG. 52 shows a state of an inductive sensor when the centers of the bearings p61, p62 of the housing p6 and the axis line CL of the rotating shaft p7 are in the same position and the brake pedal p8 is in the initial position. As shown in FIG. 52, in the third comparative example, a radially-outward end p21*a* of the first target p21 and a radially-outward end p31*a* of the first transceiver coil p31 are positioned to overlap when viewed from the axial direction. Further, a radially-outward end p22*a* of the second target p22 and a radially-outward end p32*a* of the second transceiver coil p32 are positioned to overlap when viewed from the axial direction.

Figure 53:
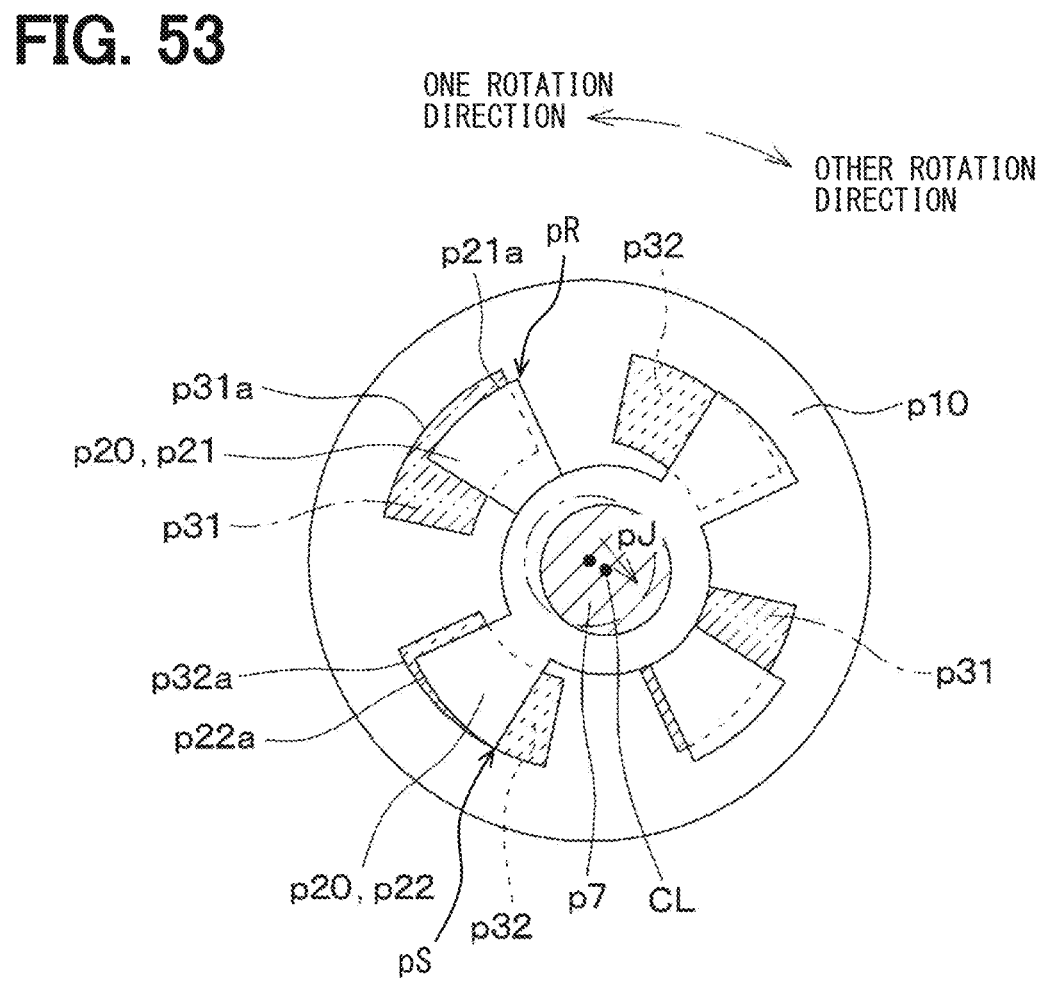

FIG. 53 shows a state in which the rotating shaft p7 is eccentric due to rattling between the bearings p61, p62 of the housing p6 and the rotating shaft p7, and the target p20 moves in the direction indicated by an arrow pJ relative to the circuit board p10. In the third comparative example, a portion pR of the first target p21 at an upper right in FIG. 53 is outside an implementation range of the first transceiver coil p31. Further, a portion pS of the second target p22 at a lower left in FIG. 53 is also outside an implementation range of the second transceiver coil p32. Therefore, in the third comparative example, when the rotating shaft p7 is eccentric, the area where the first target p21 and the first transceiver coil p31 overlap in the axial direction changes significantly. Further, an area size of overlap between the second target p22 and the second transceiver coil p32 in the axial direction also changes significantly. Therefore, an amplitude of the signal output from the inductive sensor changes significantly.

Compared to the above-mentioned third comparative example, the inductive sensor p1 and the brake pedal device p2 of the twenty-ninth embodiment have the following configuration and resulting effects further to the effects described in the twentieth embodiment, and the like.

In the twenty-ninth embodiment, the first target p21 is larger radially outward and radially inward than the implementation range in which the first transceiver coil p31 is implemented on the circuit board p10. Further, the second target p22 is larger radially outward and radially inward than the implementation range in which the second transceiver coil p32 is implemented on the circuit board p10.

According to the above, even if the first target p21 and the second target p22 become eccentric with respect to the circuit board p10, for example, due to rattling between the bearings p61, p62 of the housing p6 and the rotating shaft p7, the first target p21 is always positioned within the range of the first transceiver coil p31. Further, the second target p22 is always positioned within the range of the second transceiver coil p32. Therefore, the area size of overlap between the first transceiver coil p31 and the first target p21 in the axial direction does not change significantly due to eccentricity between the first target p21 and the second target p22. Further, the area size where the second transceiver coil p32 and the second target p22 overlap in the axial direction does not change significantly. Therefore, the amplitude of the signal output from the inductive sensor p1 does not change significantly.

Thirtieth Embodiment

Figure 54:
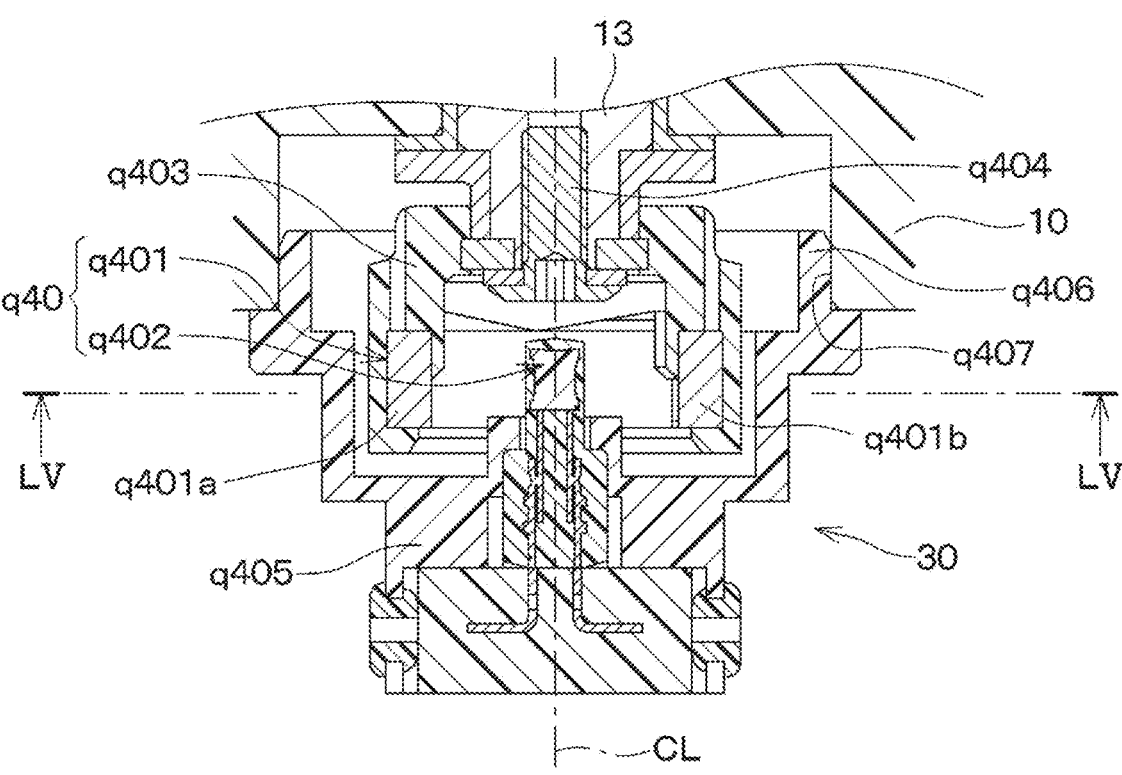
FIG. 54 is a partial cross-sectional view in a section similar to that of FIG. 3 according to a thirtieth embodiment.
Figure 55:
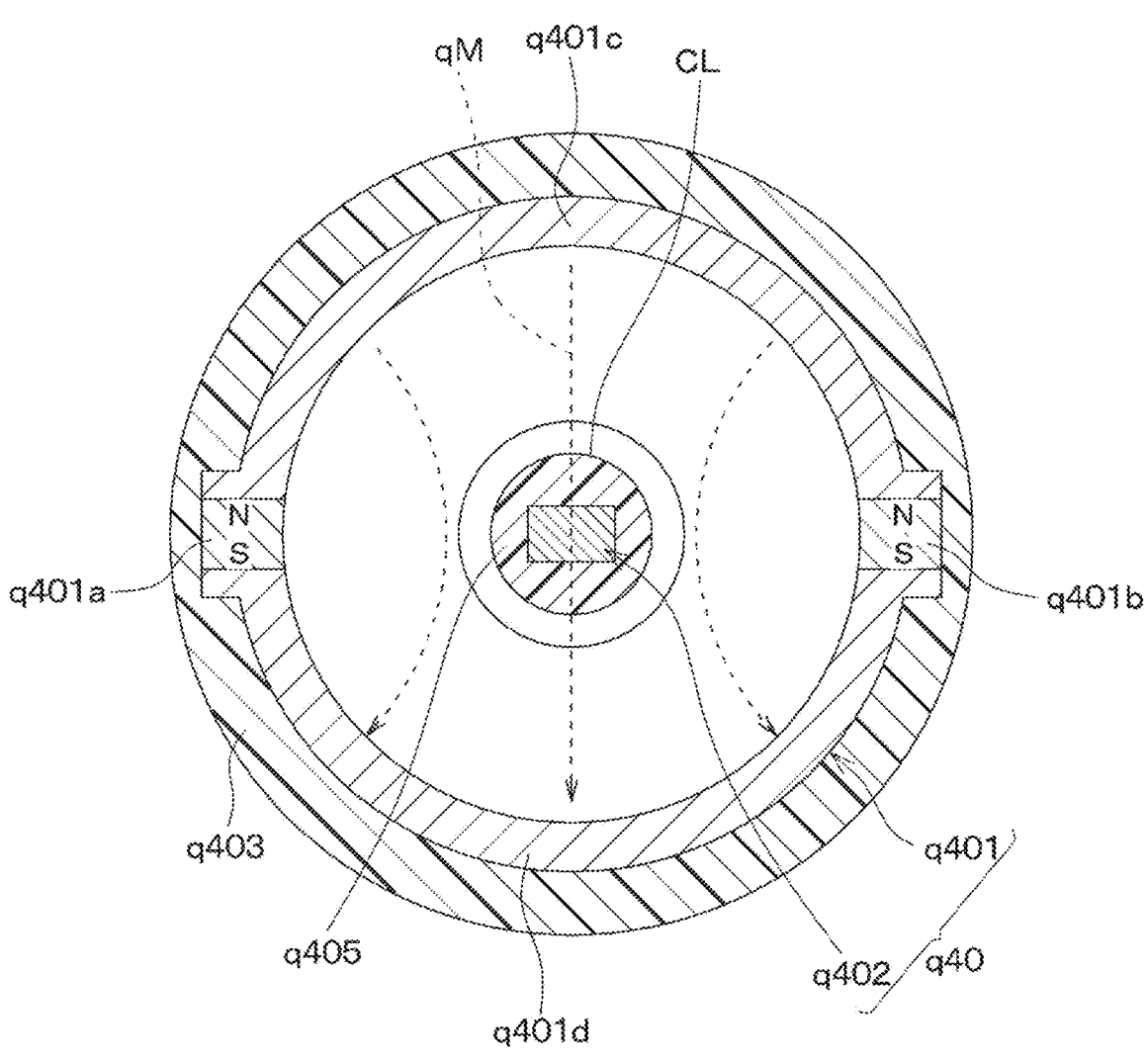
FIG. 55 is a cross-sectional view taken along a LV-LV line in FIG. 54.

Next, the thirtieth embodiment will be described. In the present embodiment, the configuration of the second sensing unit 30, which corresponds to the Hall sensor in the first embodiment, is changed. As shown in FIGS. 54 and 55, a single magnetic sensor q40 includes a magnetic circuit q401 fixed to an end of a rotating shaft 13 that operates with a pedal arm 12, and a magnetic detector q402 that detects changes in the magnetic field generated in the magnetic circuit q401. The magnetic sensor q40 also detects a rotation angle of the pedal arm 12 relative to a housing 10. As described above, the rotation angle of the pedal arm 12 is included in the amount of pedal operation. FIG. 54 is a diagram tilted by 90 degrees around an axis perpendicular to the paper surface of FIG. 3.

Specifically, the magnetic circuit q401 is formed in a cylindrical shape by two permanent magnets q401*a*, q401*b* and two arc-shaped yokes q401*c*, q401*d*, and is disposed around an axis line CL of the rotating shaft 13. The magnetic circuit q401 forms a closed magnetic circuit. Here, the closed magnetic circuit means a circuit in which the permanent magnets q401*a*, q401*b* and the yokes q401*c*, q401*d* are in contact with each other, and a loop through which magnetic flux flows is closed.

The two permanent magnets q401*a*, q401*b* are disposed on one side and the other side in the radial direction with the axis line CL interposed therebetween. In the following description, among the two permanent magnets q401*a*, q401*b*, the magnet disposed on one side in the radial direction across the axis line CL will be referred to as a first magnet q401a, and the magnet disposed on the other side in the radial direction will be referred to as a second magnet q401b. Further, one of the two yokes q401c, q401d is called as a first yoke q401c, and the other yoke is called as a second yoke q401d.

The first yoke q401c has one circumferential end connected to the N pole of the first magnet q401a, and the other circumferential end connected to the N pole of the second magnet q401b. The second yoke q401d has one circumferential end connected to the S pole of the first magnet q401a, and the other circumferential end connected to the S pole of the second magnet q401b. Therefore, as indicated by a broken line arrow qM in FIG. 55, a magnetic field is formed in a radial inside area of the magnetic circuit q401, in which magnetic flux flies in a direction intersecting the axis line CL from the first yoke q401c to the second yoke q401d.

The magnetic circuit q401 is insert molded inside a resin portion q403. The resin portion q403 is fixed to one end of the rotating shaft 13 by a bolt q404 or the like. In such state, the center of the magnetic circuit q401 coincides with the axis line CL. The magnetic circuit q401 rotates together with the rotating shaft 13 about the axis line CL. When the magnetic circuit q401 rotates about the axis line CL together with the rotating shaft 13, the direction of the magnetic field formed in the radial inside area of the magnetic circuit q401 changes. The magnetic detector q402 is provided in the radial inside area of the magnetic circuit q401.

The magnetic detector q402 is integrally provided by insert molding into the resin that constitutes a sensor holder q405. The sensor holder q405 is fixed to the housing 10. The sensor holder q405 and the housing 10 are positioned by engaging a projection q406 provided on an outer periphery of the sensor holder q405 with an inner wall surface q407 of an opening provided in the housing 10. In such state, it is possible to prevent misalignment between the magnetic detector q402 provided on the sensor holder q405 and the axis line CL.

The magnetic detector q402 is composed of a magnetoresistive element (i.e., MR element) or a Hall element that outputs a signal corresponding to the magnetic field of the magnetic circuit q401. The MR element is an element whose electrical resistance value changes according to an angle of the magnetic field in the horizontal direction with respect to the magnetic sensing surface. The Hall element is an element that outputs a Hall voltage according to a strength of a magnetic field perpendicular to a magnetic sensing surface.

When the driver performs a pedaling operation on a pedal 11, the pedal 11, the pedal arm 12, the rotating shaft 13, and the magnetic circuit q401 all rotate about the axis line CL. The magnetic detector q402 outputs a signal corresponding to the rotation angle of the magnetic circuit q401. The rotation angle of the magnetic circuit q401 is the same as a swing angle of the pedal arm 12. Therefore, the magnetic sensor q40 outputs a signal corresponding to the rotation angle of the pedal arm 12 relative to the housing 10 as the amount of operation of the pedal arm 12.

In the present embodiment, the magnetic detector q402 corresponds to a sensor element 32b, and the magnetic circuit q401 corresponds to a target 31b. Further, the modifications made to the first embodiment as shown in the present embodiment can be similarly applicable to the Hall sensors of the second to nineteenth embodiments.

Thirty-First Embodiment

Figure 56:
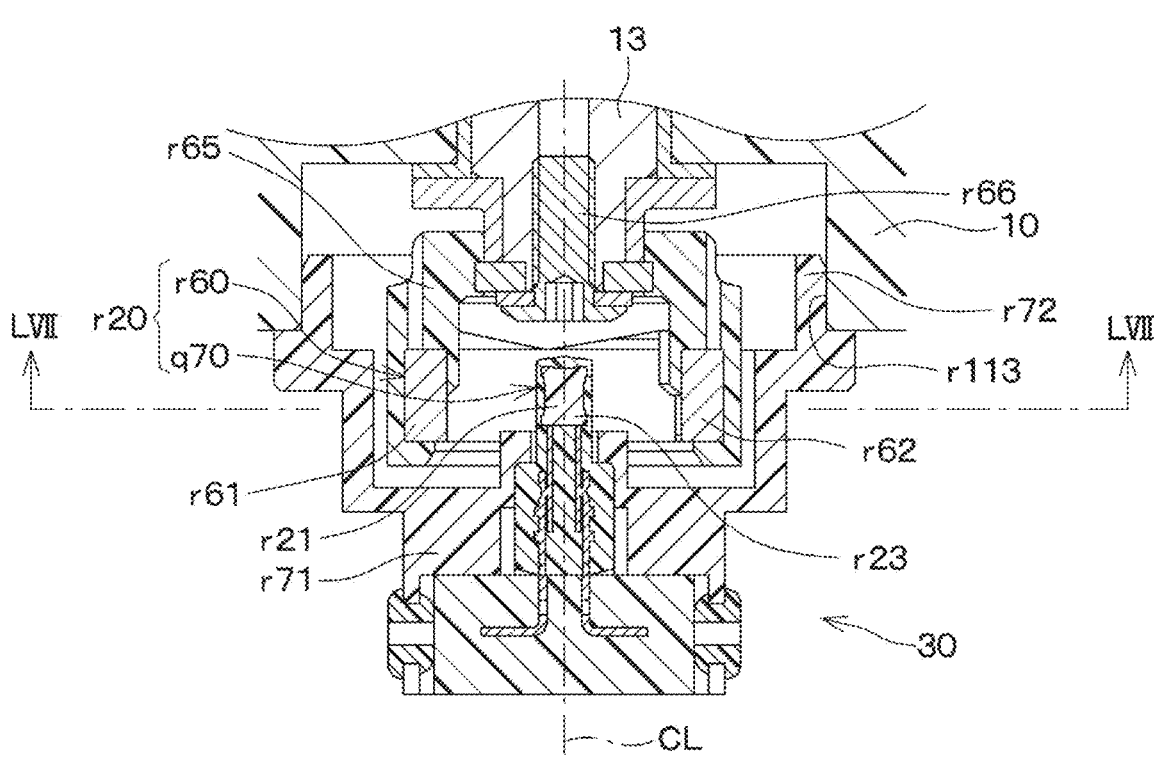
FIG. 56 is a partial cross-sectional view in a section similar to that of FIG. 3 according to the thirty-first embodiment.
Figure 57:
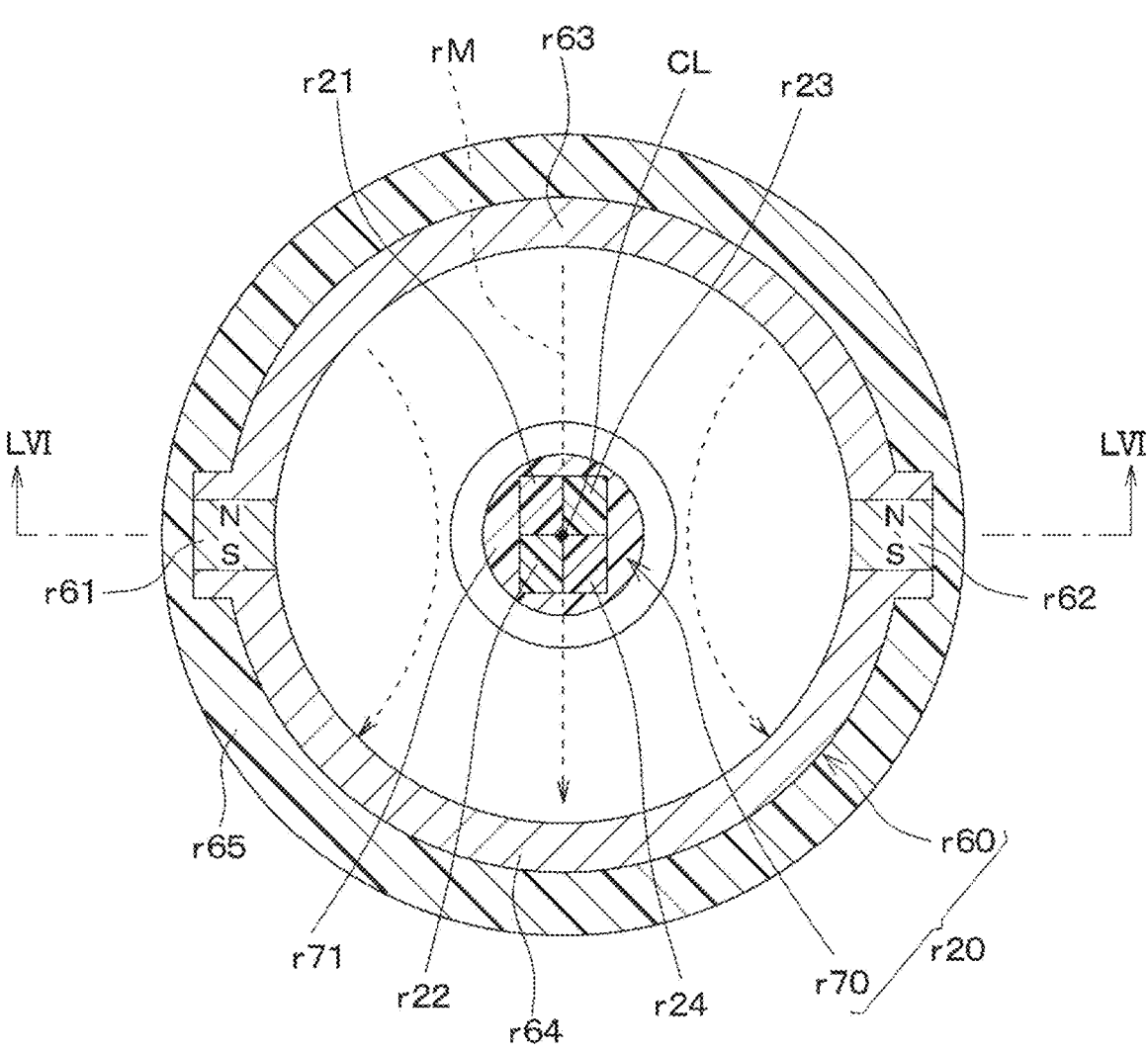
FIG. 57 is a cross-sectional view of the position detection device taken along a LVII-LVII line in FIG. 56.

Next, the thirty-first embodiment will be described. In the present embodiment, the configuration of the second sensing unit 30, which corresponds to the Hall sensor in the first embodiment, is changed. As shown in FIGS. 56 and 57, in the present embodiment, a position detection device r20 that constitutes a second sensing unit 30 is configured as a magnet-type rotation angle sensor having a cylindrical magnetic circuit r60 fixed to an end of a rotating shaft 13, and a magnetic detector r70 provided radially inside the cylindrical magnetic circuit r60. FIG. 56 is a diagram tilted by 90 degrees around an axis perpendicular to the paper surface of FIG. 3.

The magnetic circuit r60 is formed in a cylindrical shape by two permanent magnets r61 and r62 and two arc-shaped yokes r63 and r64, and is disposed around an axis line CL of the rotating shaft 13. The magnetic circuit r60 forms a closed magnetic circuit. The closed magnetic circuit means a circuit in which the permanent magnets r61, r62 and the yokes r63, r64 are in contact with each other and a loop through which the magnetic flux flows is closed.

The two permanent magnets r61 and r62 are disposed on one side and the other side in the radial direction with the axis line CL interposed therebetween. In the following description, among the two permanent magnets r61, r62, the magnet disposed on one side in the radial direction across the axis line CL will be referred to as a first magnet r61, and the magnet disposed on the other side in the radial direction will be referred to as a second magnet r62. Further, one of the two yokes r63, r64 is referred to as a first yoke r63, and the other yoke is referred to as a second yoke r64.

The first yoke r63 has one circumferential end connected to the N pole of the first magnet r61, and the other circumferential end connected to the N pole of the second magnet r62. The second yoke r64 has one circumferential end connected to the S pole of the first magnet r61, and the other circumferential end connected to the S pole of the second magnet r62. Therefore, as indicated by a broken line arrow rM in FIG. 57, a magnetic field is formed in the radial inside area of the magnetic circuit r60, in which magnetic flux flies in a direction intersecting the axis line CL from the first yoke r63 to the second yoke r64.

The magnetic circuit r60 is insert molded inside a resin portion r65. The resin portion r65 is fixed to one end of the rotating shaft 13 by a bolt r66 or the like. In such state, the center of the magnetic circuit r60 coincides with the axis line CL. The magnetic circuit r60 rotates together with the rotating shaft 13 about the axis line CL. When the magnetic circuit r60 rotates about the axis line CL together with the rotating shaft 13, the direction of the magnetic field formed in the radial inside area of the magnetic circuit r60 changes. The magnetic detector r70 is provided in the radial inside area of the magnetic circuit r60.

The magnetic detector r70 is composed of first to fourth sensors r21 to r24, and is provided to have a single body by insert molding into the resin that constitutes a sensor holder r71. The sensor holder r71 is fixed to the housing 10. Therefore, the sensor holder r71 corresponds to an example of a fixed body that is fixed to the vehicle. The sensor holder r71 and the housing 10 are positioned by engaging a projection r72 provided on an outer periphery of the sensor holder r71 with an inner wall surface r113 of an opening provided in the housing 10. In such state, it is possible to prevent misalignment between the magnetic detector r70 provided on the sensor holder r71 and the axis line CL.

The first to fourth sensors r21 to r24 that configure the magnetic detector r70 are four rotation angle sensors that have a magnetoresistive element (i.e., an MR element) or a Hall element that outputs a signal in response to the magnetic field of the magnetic circuit r60. The MR element is an element whose electrical resistance value changes according to an angle of the magnetic field in the horizontal direction with respect to the magnetic sensing surface. The Hall element is an element that outputs a Hall voltage according to a strength of a magnetic field perpendicular to a magnetic sensing surface.

When the driver performs a pedaling operation on a pedal 11, the pedal 11, a pedal arm 12, the rotating shaft 13, and the magnetic circuit r60 all rotate about the axis line CL. The first to fourth sensors r21 to r24 constituting the magnetic detector r70 output signals according to a swing angle of the magnetic circuit r60. The rotation angle of the magnetic circuit r60 is the same as the rotation angle of the pedal arm 12 and the rotating shaft 13. Therefore, the first to fourth sensors r21 to r24 each output a signal according to the angle by which the pedal arm 12 and the rotating shaft 13 rotate about a predetermined axis line CL as the amount of operation of the pedal 11.

The output signals of the four sensors r21 to r24 are input to a first ECU and a second ECU via first to fourth signal lines. In such manner, in the present embodiment, a first ECU and a second ECU may be used instead of an ECU. The first sensor r21 and the first ECU are electrically connected by a first signal line, and the second sensor r22 and the first ECU are electrically connected by a second signal line. Therefore, the output signals of the first sensor r21 and the second sensor r22 are input to the first ECU in a distinguishable manner that enables distinction of the input signals from each other.

Further, the third sensor r23 and the second ECU are electrically connected by a third signal line, and the fourth sensor r24 and the second ECU are electrically connected by a fourth signal line. Therefore, the output signals of the third sensor r23 and the fourth sensor r24 are input to the second ECU in a distinguishable manner that enables distinction of the input signals from each other. The first to fourth signal lines are formed, for example, by a wire harness or a predetermined in-vehicle LAN (Local Area Network).

Both the first ECU and the second ECU are composed of a microcomputer including a processor that performs control processing and arithmetic processing, a storage unit such as a ROM and a RAM that stores programs, data, etc., and peripheral circuits. The storage unit includes non-transitory, tangible storage media. The first ECU and the second ECU each perform various control processing and arithmetic processing based on a program stored in the storage unit, and control an operation of each device connected to an output port. Specifically, the first ECU and the second ECU detect an amount of the pedal operation based on the output signals of the first to fourth sensors r21 to r24, and control a brake actuator to apply a braking force to wheels of the vehicle according to the rotational position of the rotating shaft 13.

The first ECU and the second ECU are connected to each other via an in-vehicle LAN using, for example, CAN (Controller Area Network) communication as a signal transmission unit, so that they can transmit information to each other. Therefore, the output signals of the first sensor r21 and the second sensor r22 input to the first ECU are transmitted to the second ECU via the signal transmission unit in a distinguishable manner. Further, the output signals of the third sensor r23 and the fourth sensor r24 input to the second ECU are transmitted to the first ECU via the signal transmission unit in a distinguishable manner. Therefore, both the first ECU and the second ECU can acquire the output signals of the first to fourth sensors r21 to r24 in a distinguishable manner.

The first ECU and the second ECU are configured to be capable of responding to (i) failures of the first to fourth sensors r21 to r24, (ii) breaks or short circuits in the first to fourth signal lines, and the like. Specifically, when an output signal indicating an abnormal value is present among the output signals of the first to fourth sensors r21 to r24, the first ECU and the second ECU are capable of identifying the output signal indicating an abnormal value by comparing the output signals of the first to fourth sensors r21 to r24. For example, the first ECU and the second ECU calculate the difference between the output signals of the first to fourth sensors r21 to r24, and if the difference (i.e., the inspection value) is greater than 0 or a predetermined threshold, an output signal indicating an abnormality is generated. Then, the first ECU and the second ECU detect the amount of pedal operation based on multiple normal output signals excluding the output signal indicating the abnormal value, and control the brake actuator to apply a braking force to the wheels of the vehicle according to the rotational position of the rotating shaft 13.

There are various possible methods for identifying abnormal values based on the multiple outputs of the first to fourth sensors r21 to r24. For example, a value obtained by comparing two output differences of the first to fourth sensors r21 to r24 is calculated, and a determination is made based on a threshold value to detect whether the sensor is normal or abnormal. In such manner, a correct sensor signal determination is performable even if the sensor signal fluctuates due to disturbance. Brake control can then be performed using correct sensor signals.

The same concept as described above can be used when calculating the value obtained by comparing the two output differences of two sensors other than the first and second sensors r21 and r22 among the first to fourth sensors r21 to r24.

Alternatively, as another method, when the first ECU and the second ECU are provided, as described above, a relationship between the output signals of the first to fourth sensors r21 to r24 and the amount of operation of the pedal 11 (i.e., the amount of pedal operation) is stored. Based on such information, the first ECU and the second ECU derive four amounts of pedal operation corresponding to the output signals of the first to fourth sensors r21 to r24, respectively. Then, an output signal indicating an operation amount different from the same operation amount derived most frequently among the four amounts of pedal operations is identified as an output signal indicating an abnormal value. In such manner, it is possible to identify up to two abnormal values by majority decision from the signals of the four sensors r21 to r24.

The brake pedal device 1 of the thirty-first embodiment described above provides the following effects and advantages.

(1) The first to fourth sensors r21 to r24 of the position detection device r20 are all rotation angle sensors that output a signal according to the angle by which the pedal arm 12 rotates about the axis line CL as the amount of operation of the pedal 11. According to the above, by providing four rotation angle sensors around the axis line CL of rotation of the pedal arm 12, the configuration can be simplified, and the number of parts, assembly steps, and costs are reducible.

(2) The position detection device r20 is a magnet-type rotation angle sensor having a single magnetic circuit r60 that generates a magnetic field and four magnetic detectors r70 that serve as rotation angle sensors that detect the magnetic field of the magnetic circuit r60.

According to the above, it is possible to use a common magnetic circuit r60 (i.e., a single magnetic circuit r60) that generates a magnetic field detected by the magnetic detector r70 (e.g., a Hall element or an MR element). Therefore, the size of the magnet-type rotation angle sensor having four rotation angle sensors can be reduced in size, and the number of parts, assembly man-hours, and cost are reducible.

In the present embodiment, the magnetic detector r70 corresponds to a sensor element 32*b*, and the magnetic circuit r60 corresponds to a target 31*b*. Further, the modifications made to the first embodiment as shown in the present embodiment can be similarly applicable to the Hall sensors of the second to nineteenth embodiments.

Other Embodiments

The present disclosure is not limited to the above-described embodiments, and can be appropriately modified. Each of the above embodiments, which are relevant to each other, is combinable to the other one unless such combination is clearly difficult. The constituent element(s) of each of the above embodiments is/are not necessarily essential unless it is specifically stated that the constituent element(s) is/are essential in the above embodiments, or unless the constituent element(s) is/are obviously essential in principle. A quantity, a value, an amount, a range, or the like referred to in the description of the above embodiments is not necessarily limited to the described specific value, amount, range or the like unless it is specifically described as essential or understood as being essential in principle. When multiple values are exemplified for a certain quantity, it is also possible to adopt a value between the multiple values unless an exception statement is made or when it is clearly impossible in principle. A shape, positional relationship or the like of a structural element, which is referred to in the embodiments described above, is not limited to the described shape, positional relationship or the like, unless it is specifically described or obviously necessary to be limited in principle. Further, the present disclosure also allows the following modifications and modifications within an equivalent range from each of the above-described embodiments.

Modification 1

In the above-described embodiment, the inductive sensors and the Hall sensors are used as the multiple sensors that detect the rotation of the rotating shaft. However, other combinations of sensors for detecting rotation of the rotating shaft may be used. For example, only multiple inductive sensors may be used, or only multiple Hall sensors may be used. Further, for example, one of the multiple sensors may be a rotary encoder. Further, when there are three or more sensors that detect the rotation of the rotating shaft, sensor elements of all of the three or more sensors may detect the rotation of the target using detection principles different from one another.

Modification 2

In the above-described embodiment, the brake pedal device 1 is shown as an example of a control pedal device, but the control pedal device may be a pedal device other than the brake pedal device that receives an operation for controlling the behavior of the vehicle. For example, an accelerator pedal device that receives an operation for accelerating a vehicle may have the features as shown in each of the above-described embodiments.

Modification 3

In the above-described embodiment, the sensor elements 22*b*, 32*b*, 42*b*, and 52*b* are positioned above the portion of the reaction force generating mechanism 15 where sliding occurs in the vehicle top-bottom direction. However, even if the sensor elements 22*b*, 32*b*, 42*b*, and 52*b* are positioned at the same position in the vehicle top-bottom direction relative to the portion of the reaction force generating mechanism 15 where sliding occurs, roughly the same effects can be obtained. For example, the phrase "when the sensor element is positioned at the same position in the vehicle top-bottom direction relative to the portion where sliding occurs" means, for example, a situation in which the range of the sensor element partially overlaps with the range of the portion where sliding occurs, or the range of the sensor element completely overlaps with the range of the portion where sliding occurs.

Modification 4

In the above-described embodiment, the space between the rotating shaft 13 and the surrounding portions 10*a*, 10*b* is positioned above, in the vehicle top-bottom direction, the portion of the reaction force generating mechanism 15 where sliding occurs. However, even if such space is positioned at the same position in the vehicle top-bottom direction relative to the portion of the reaction force generating mechanism 15 where sliding occurs, roughly the same effects can be obtained. For example, the phrase "when the space is positioned at the same position in the vehicle top-bottom direction as the portion where sliding occurs" means, for example, a situation in which the range of the space partially overlaps with the range of the portion where sliding occurs, or the range of the space completely overlaps with the range of the portion where sliding occurs.

VARIOUS VIEWPOINTS

Viewpoint 1

A control pedal device for a vehicle includes: a pedal (11) configured to receive an operation; a pedal arm (12) attached to the pedal to be movable with the pedal; a rotating shaft (13) fixed to the pedal arm; a reaction force generating mechanism (15) configured to exert a reaction force against the operation of the pedal; multiple targets (21, 31*b*, 41, 51*b*) attached to the rotating shaft and rotating together with the rotating shaft; and multiple sensor elements (22*b*, 32*b*, 42*b*, 52*b*) configured to detect a rotation of the targets.

Viewpoint 2

In control pedal device according to viewpoint 1, in a state that the control pedal device is attached to the vehicle, the multiple targets and the multiple sensor elements are positioned above or at a same position in a vehicle top-bottom direction, with respect to a sliding portion of the reaction force generating mechanism where a sliding occurs.

Viewpoint 3

The control pedal device according to viewpoint 1 or 2 further includes a housing (10) defining (i) a sensor chamber (R1, R2) in which at least one of the multiple sensor elements or at least one of the multiple targets is disposed and (ii) a mechanism chamber (R3) in which the reaction force generating mechanism is disposed. The mechanism chamber (R3) and the sensor chamber (R1, R2) are separated from each other by a bearing portion (10a, 10b, 14a, 14b, 14ba, 14bb) that rotatably supports the rotating shaft, and a space in the mechanism chamber and a space in the sensor chamber are made in communication with each other via a space between the bearing portion and the rotating shaft.

Viewpoint 4

The control pedal device according to viewpoint 1 or 2 further includes a housing (10) defining (i) a sensor chamber (R1, R2, R4) in which at least one of the multiple sensor elements or at least one of the multiple targets is disposed, and (ii) a mechanism chamber (R3) in which the reaction force generating mechanism is disposed. The mechanism chamber and the sensor chamber are separated from each other by a surrounding portion (10a, 10b) that rotatably surrounds the rotating shaft, and a space in the mechanism chamber and a space in the sensor chamber are made in communication with each other via a space between the surrounding portion and the rotating shaft. In addition, the space between the surrounding portion and the rotating shaft is narrowed relative to the space in the mechanism chamber and the space in the sensor chamber.

Viewpoint 5

In the control pedal device according to viewpoint 4, the surrounding portion is a bearing portion that rotatably supports the rotating shaft.

Viewpoint 6

The control pedal device according to viewpoint 1 or 2 further includes a housing (10) that defines therein (i) a sensor chamber (R1, R2) in which at least one of the multiple sensor elements or at least one of the multiple targets is disposed, and (ii) a mechanism chamber (R3) in which the reaction force generating mechanism is disposed. In addition, the mechanism chamber and the sensor chamber are separated from each other by a surrounding portion (10a, 10b) that rotatably surrounds the rotating shaft, and a space between the surrounding portion and the rotating shaft is sealed.

Viewpoint 7

In the control pedal device according to any one of viewpoints 4 to 6, a labyrinth structure is configured by the rotating shaft and the surrounding portion in a path from the mechanism chamber to the sensor chamber passing through the space between the rotating shaft and the surrounding portion.

Viewpoint 8

The control pedal device according to any one of viewpoints 4 to 6 further includes a partition member (10x, 17, 18) provided at a position between the reaction force generating mechanism and the surrounding portion in the mechanism chamber.

Viewpoint 9

The control pedal device according to viewpoint 8, further includes a rod (16) disposed at a position between the reaction force generating mechanism and the pedal arm, to transmit a reaction force generated by the reaction force generating mechanism to the pedal arm.

Viewpoint 10

In the control pedal device according to viewpoint 8, the partition member is a cover (17) that extends from the housing to the pedal arm in the mechanism chamber and that expands and contracts in response to displacement of the pedal arm.

Viewpoint 11

In the control pedal device according to in any one of viewpoints 4 to 10, in a state that the control pedal device is attached to the vehicle, the space between the rotating shaft and the surrounding portion is positioned above or at a same position in a vehicle top-bottom direction with respect to a sliding portion of the reaction force generating mechanism, where a sliding occurs.

Viewpoint 12

In the control pedal device according to any one of viewpoints 1 to 11, at least two of the multiple sensor elements are configured to detect a rotation of the multiple targets using respective detection principles different from each other.

Viewpoint 13

In the control pedal device according to any one of viewpoints 1 to 12, the multiple sensor elements include a sensor element (32b) in a Hall sensor and a sensor element (22b) in an inductive sensor.

Viewpoint 14

In the control pedal device according to any one of viewpoints 1 to 13, the operation received by the pedal is a brake operation for braking the vehicle.

Viewpoint 15

The control pedal device according to viewpoint 1 or 2 further includes a housing (10) defining a sensor chamber (R1, R2) in which at least one of the multiple sensor elements or at least one of the multiple targets is disposed, and a space between an outside of the housing and the sensor chamber is sealed.

Viewpoint 16

The control pedal device according to viewpoint 1 or 2 further includes a housing (10) defining a sensor chamber (R1, R2) in which at least one of the multiple sensor elements or at least one of the multiple targets is disposed, and a labyrinth structure is formed in a space from an outside of the housing to the sensor chamber.

Viewpoint 17

The control pedal device according to viewpoint 1 or 2 further includes: a housing (10) defining (i) a sensor chamber (R1, R2) in which at least one of the multiple sensor elements or at least one of the multiple targets is disposed, and (ii) a mechanism chamber (R3) in which the reaction force generating mechanism is disposed; and a bearing portion (14b) rotatably supporting the rotating shaft. In addition, the mechanism chamber and the sensor chamber are separated from each other by a surrounding portion (10a, 10b) that rotatably surrounds the rotating shaft. The bearing portion includes (i) a first sub-bearing portion (14ba) interposed between the surrounding portion and the rotating shaft to rotatably support the rotating shaft, and (ii) a second sub-bearing portion (14bb) interposed between the surrounding portion and the rotating shaft to rotatably support the rotating shaft. Furthermore, the first sub-bearing portion and the second sub-bearing portion are disposed side by side with a space interposed therebetween along an axis line (CL) of the rotating shaft.

Viewpoint 18

In the control pedal device according to any one of viewpoints 1 to 17, a part of the sensor elements among the multiple sensor elements and a part of the targets among the multiple targets are respectively sensor elements (p31, p32) in an inductive sensor (p1) and targets (p21, p22) in the inductive sensor; the target in the inductive sensor has multiple blade portions (p212, p222) disposed at positions opposite to each other with respect to the axis line (CL) of the rotating shaft; the sensor element in the inductive sensor is disposed at both of positions in opposite directions relative to the axis line (CL); and the sensor element in the inductive sensor is configured to be capable of detecting the multiple blade portions.

Viewpoint 19

In the control pedal device according to any one of viewpoints 1 to 18, a part of the multiple sensor elements are sensor elements (p31, p32) in an inductive sensor (p1), which are disposed along an entire circumference and centered on the axis line (CL) of the rotating shaft.

Viewpoint 20

A control pedal device for a vehicle includes: a pedal (11) configured to receive an operation; a pedal arm (12) attached to the pedal to be movable with the pedal; a rotating shaft (13) fixed to the pedal arm; a reaction force generating mechanism (15) configured to exert a reaction force against the operation of the pedal; a sensing member (20, 30) including (i) multiple targets (21, 31b) attached to the rotating shaft and rotating together with the rotating shaft, and (ii) multiple sensor elements (22b, 32b) configured to detect a rotation of the multiple targets; and an attachable structure (13a, 13b, 70, 80) to which the sensing member is attachable.

What is claimed is:

1. A control pedal device for a vehicle, comprising:
a pedal configured to receive an operation;
a pedal arm attached to the pedal to be movable with the pedal;
a rotating shaft fixed to the pedal arm;
a reaction force generating mechanism configured to exert a reaction force against the operation of the pedal;
multiple targets attached to the rotating shaft and rotating together with the rotating shaft; and
multiple sensor elements configured to detect a rotation of the targets;

wherein at least two of the multiple sensor elements are configured to detect a rotation of the multiple targets using respective detection principles different from each other.

2. The control pedal device according to claim 1, wherein
in a state that the control pedal device is attached to the vehicle, the multiple targets and the multiple sensor elements are positioned above or at a same position in a vehicle top-bottom direction, with respect to a sliding portion of the reaction force generating mechanism where a sliding occurs.

3. A control pedal device for a vehicle, comprising:
a pedal configured to receive an operation;
a pedal arm attached to the pedal to be movable with the pedal;
a rotating shaft fixed to the pedal arm;
a reaction force generating mechanism configured to exert a reaction force against the operation of the pedal;
multiple targets attached to the rotating shaft and rotating together with the rotating shaft;
multiple sensor elements configured to detect a rotation of the targets; and
a housing defining (i) a sensor chamber in which at least one of the multiple sensor elements or at least one of the multiple targets is disposed and (ii) a mechanism chamber in which the reaction force generating mechanism is disposed, wherein
the mechanism chamber and the sensor chamber are separated from each other by a bearing portion that rotatably supports the rotating shaft, and
a space in the mechanism chamber and a space in the sensor chamber are made in communication with each other via a space between the bearing portion and the rotating shaft.

4. The control pedal device according to claim 1, further comprising:
a housing defining (i) a sensor chamber in which at least one of the multiple sensor elements or at least one of the multiple targets is disposed, and (ii) a mechanism chamber in which the reaction force generating mechanism is disposed, wherein
the mechanism chamber and the sensor chamber are separated from each other by a surrounding portion that rotatably surrounds the rotating shaft,
a space in the mechanism chamber and a space in the sensor chamber are made in communication with each other via a space between the surrounding portion and the rotating shaft, and
the space between the surrounding portion and the rotating shaft is narrowed relative to the space in the mechanism chamber and the space in the sensor chamber.

5. The control pedal device according to claim 4, wherein
the surrounding portion is a bearing portion that rotatably supports the rotating shaft.

6. The control pedal device according to claim 1, further comprising:
a housing that defines (i) a sensor chamber in which at least one of the multiple sensor elements or at least one of the multiple targets is disposed, and (ii) a mechanism chamber in which the reaction force generating mechanism is disposed, wherein
the mechanism chamber and the sensor chamber are separated from each other by a surrounding portion that rotatably surrounds the rotating shaft, and
a space between the surrounding portion and the rotating shaft is sealed.

7. The control pedal device according to claim 4, wherein a labyrinth structure is configured by the rotating shaft and the surrounding portion in a path from the mechanism chamber to the sensor chamber passing through the space between the rotating shaft and the surrounding portion.

8. The control pedal device according to claim 4, further comprising:

a partition member provided at a position between the reaction force generating mechanism and the surrounding portion in the mechanism chamber.

9. The control pedal device according to claim 8, further comprising:

a rod disposed at a position between the reaction force generating mechanism and the pedal arm, to transmit a reaction force generated by the reaction force generating mechanism to the pedal arm.

10. The control pedal device according to claim 8, wherein the partition member is a cover that extends from the housing to the pedal arm in the mechanism chamber, to expand and contract in response to a displacement of the pedal arm.

11. The control pedal device according to claim 4, wherein in a state that the control pedal device is attached to the vehicle, the space between the rotating shaft and the surrounding portion is positioned above or at a same position in a vehicle top-bottom direction with respect to a sliding portion of the reaction force generating mechanism, where a sliding occurs.

12. The control pedal device according to claim 1, wherein the multiple sensor elements include a sensor element in a Hall sensor and a sensor element in an inductive sensor.

13. The control pedal device according to claim 1, wherein the operation received by the pedal is a brake operation for braking the vehicle.

14. The control pedal device according to claim 1, further comprising:

a housing defining a sensor chamber in which at least one of the multiple sensor elements or at least one of the multiple targets is disposed, wherein a space between an outside of the housing and the sensor chamber is sealed.

15. The control pedal device according to claim 1, further comprising:

a housing defining a sensor chamber in which at least one of the multiple sensor elements or at least one of the multiple targets is disposed, wherein a labyrinth structure is formed in a space from an outside of the housing to the sensor chamber.

16. The control pedal device according to claim 1, further comprising:

a housing defining (i) a sensor chamber in which at least one of the multiple sensor elements or at least one of the multiple targets is disposed, and (ii) a mechanism chamber in which the reaction force generating mechanism is disposed; and a bearing portion rotatably supporting the rotating shaft, wherein the mechanism chamber and the sensor chamber are separated from each other by a surrounding portion that rotatably surrounds the rotating shaft, the bearing portion includes (i) a first sub-bearing portion interposed between the surrounding portion and the rotating shaft to rotatably support the rotating shaft, and (ii) a second sub-bearing portion interposed between the surrounding portion and the rotating shaft to rotatably support the rotating shaft, and the first sub-bearing portion and the second sub-bearing portion are disposed side by side with a space interposed therebetween along an axis line of the rotating shaft.

17. The control pedal device according to claim 1, wherein a part of the sensor elements among the multiple sensor elements and a part of the targets among the multiple targets are respectively sensor elements in an inductive sensor and targets in the inductive sensor, the target in the inductive sensor has multiple blade portions disposed at positions opposite to each other with respect to the axis line of the rotating shaft, the sensor element in the inductive sensor is disposed at both of positions in opposite directions relative to the axis line, and the sensor element in the inductive sensor is configured to be capable of detecting the multiple blade portions.

18. The control pedal device according to claim 1, wherein a part of the multiple sensor elements are sensor elements in an inductive sensor, which are disposed along an entire circumference and centered on the axis line of the rotating shaft.

19. A control pedal device for a vehicle comprising:

a pedal configured to receive an operation;

a pedal arm attached to the pedal to be movable with the pedal;

a rotating shaft fixed to the pedal arm;

a reaction force generating mechanism configured to exert a reaction force against the operation of the pedal;

a sensing member including (i) multiple targets attached to the rotating shaft and rotating together with the rotating shaft, and (ii) multiple sensor elements configured to detect a rotation of the multiple targets; and an attachable structure to which the sensing member is attachable;

wherein at least two of the multiple sensor elements are configured to detect a rotation of the multiple targets using respective detection principles different from each other.

* * * * *